United States Patent
Pazmino et al.

(10) Patent No.: US 12,449,656 B2
(45) Date of Patent: Oct. 21, 2025

(54) METHODS AND APPARATUSES FOR PROVIDING INPUT FOR HEAD-WORN IMAGE DISPLAY DEVICES

(71) Applicant: MAGIC LEAP, INC., Plantation, FL (US)

(72) Inventors: Lorena Pazmino, Wilton Manors, FL (US); Andrea Isabel Montoya, Plantation, FL (US); Savannah Niles, Fort Lauderdale, FL (US); Alexander Rocha, Boca Raton, FL (US); Mario Antonio Bragg, Lake Worth, FL (US); Parag Goel, Coral Springs, FL (US); Jeffrey Scott Sommers, Mountain View, CA (US); David Charles Lundmark, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/312,886

(22) Filed: May 5, 2023

(65) Prior Publication Data
US 2023/0273431 A1 Aug. 31, 2023

Related U.S. Application Data

(63) Continuation of application No. 16/448,452, filed on Jun. 21, 2019, now abandoned.
(Continued)

(51) Int. Cl.
*G02B 27/01* (2006.01)
*G06F 3/01* (2006.01)
(Continued)

(52) U.S. Cl.
CPC ............ *G02B 27/017* (2013.01); *G06F 3/011* (2013.01); *G06F 3/016* (2013.01); *G06F 3/017* (2013.01);
(Continued)

(58) Field of Classification Search
CPC .......... G06F 3/013; G06F 3/016; G06F 3/017; G06F 3/011; G06F 3/012; G06F 3/04883;
(Continued)

(56) References Cited

U.S. PATENT DOCUMENTS 8,046,719 B2  10/2011  Skourup et al.
9,791,700 B2  10/2017  Schowengerdt
(Continued)

FOREIGN PATENT DOCUMENTS

JP   2016-115039   6/2016
JP   2016224595    12/2016
(Continued)

OTHER PUBLICATIONS

Foreign NOA for JP Patent Appln. No. 2020-570463 dated Oct. 11, 2023.
(Continued)

*Primary Examiner* — Xiao M Wu
*Assistant Examiner* — Scott E Sonners
(74) *Attorney, Agent, or Firm* — Vista IP Law Group, LLP

(57) ABSTRACT

An apparatus for use with an image display device configured for head-worn by a user, includes: a screen; and a processing unit configured to assign a first area of the screen to sense finger-action of the user; wherein the processing unit is configured to generate an electronic signal to cause a change in a content displayed by the display device based on the finger-action of the user sensed by the assigned first area of the screen of the apparatus.

20 Claims, 32 Drawing Sheets

Related U.S. Application Data

(60) Provisional application No. 62/688,108, filed on Jun. 21, 2018.

(51) Int. Cl.
  *G06F 3/04812* (2022.01)
  *G06F 3/04886* (2022.01)
  *G06T 19/00* (2011.01)

(52) U.S. Cl.
  CPC ........ *G06F 3/04812* (2013.01); *G06T 19/006* (2013.01); *G02B 2027/0138* (2013.01); *G02B 2027/014* (2013.01); *G02B 2027/0178* (2013.01); *G06F 3/012* (2013.01); *G06F 3/04886* (2013.01); *G06F 2203/0381* (2013.01); *G06F 2203/04808* (2013.01)

(58) Field of Classification Search
  CPC ........ G06F 3/0488; G06F 1/163; G06F 3/041; G06F 3/0482; G06F 3/04845; G06F 3/167; G06F 3/0346; G06F 2203/014; G06F 3/04886; G06F 3/0414; G06F 3/0416; G06F 1/1647; G06F 1/1692; G06F 2203/013; G06F 3/0304; G06F 3/03547; G06F 3/048; G06T 19/006; G06T 19/20; G06T 11/60; G06T 2207/30201; G02B 27/017; G02B 2027/014; H04N 21/42204; H04N 21/4222; H04N 21/42224; A63F 13/285
  See application file for complete search history.

(56) References Cited

U.S. PATENT DOCUMENTS

| | | | |
|---|---|---|---|
| 2013/0127980 | A1 | 5/2013 | Haddick et al. |
| 2013/0325438 | A1 | 12/2013 | Griffin et al. |
| 2014/0240245 | A1* | 8/2014 | Kim .................. G06F 3/013 345/173 |
| 2014/0285352 | A1 | 9/2014 | Cho et al. |
| 2015/0363980 | A1 | 12/2015 | Dorta et al. |
| 2015/0379963 | A1* | 12/2015 | Holmanu .............. G06F 3/1454 345/173 |
| 2016/0085403 | A1 | 3/2016 | Koga |
| 2016/0093108 | A1 | 3/2016 | Mao et al. |
| 2017/0031502 | A1 | 2/2017 | Rosenberg et al. |
| 2017/0054791 | A1 | 2/2017 | Hadfield et al. |
| 2017/0061700 | A1 | 3/2017 | Urbach et al. |
| 2017/0076502 | A1* | 3/2017 | Chen .................. G06F 3/011 |
| 2017/0256144 | A1 | 9/2017 | Khoshkava et al. |
| 2017/0293351 | A1 | 10/2017 | Li |
| 2017/0322622 | A1 | 11/2017 | Hong et al. |
| 2017/0322623 | A1 | 11/2017 | McKenzie et al. |
| 2017/0329419 | A1 | 11/2017 | Dearman et al. |
| 2017/0345218 | A1 | 11/2017 | Bedikian et al. |
| 2018/0314406 | A1 | 11/2018 | Powderly et al. |
| 2018/0315248 | A1 | 11/2018 | Bastov et al. |
| 2019/0034076 | A1 | 1/2019 | Vinayak et al. |
| 2019/0064997 | A1 | 2/2019 | Wang et al. |
| 2019/0065026 | A1 | 2/2019 | Kiemele et al. |
| 2019/0197785 | A1 | 6/2019 | Tate-Gans et al. |

FOREIGN PATENT DOCUMENTS

| | | |
|---|---|---|
| JP | 2017045472 | 3/2017 |
| JP | 2017062559 | 3/2017 |
| WO | WO 2017/048519 | 3/2017 |
| WO | WO 2017/222997 | 12/2017 |
| WO | WO 2018/106299 | 6/2018 |

OTHER PUBLICATIONS

Foreign Response for JP Patent Appln. No. 2020-570463 dated Jul. 13, 2023.
Non-Final Office Action for U.S. Appl. No. 16/448,452 dated Oct. 29, 2020.
Non-Final Office Action for U.S. Appl. No. 16/448,452 dated Nov. 29, 2021.
Non-Final Office Action for U.S. Appl. No. 16/448,452 dated Aug. 9, 2022.
Final Office Action for U.S. Appl. No. 16/448,452 dated Apr. 30, 2021.
Final Office Action for U.S. Appl. No. 16/448,452 dated Apr. 20, 2022.
Final Office Action for U.S. Appl. No. 16/448,452 dated Feb. 17, 2023.
Amendment Response to NFOA for U.S. Appl. No. 16/448,452 dated Nov. 9, 2022.
Amendment Response to NFOA for U.S. Appl. No. 16/448,452 dated Feb. 28, 2022.
Amendment Response to NFOA for U.S. Appl. No. 16/448,452 dated Jan. 28, 2021.
Amendment Response to FOA for U.S. Appl. No. 16/448,452 dated Jul. 20, 2022.
Amendment Response to FOA for U.S. Appl. No. 16/448,452 dated Jun. 20, 2022.
Amendment Response to FOA for U.S. Appl. No. 16/448,452 dated Jul. 29, 2021.
PCT International Search Report and Written Opinion for International Appln. No. PCT/US19/38462, Applicant Magic Leap, Inc., dated Sep. 30, 2019 (9 pages).
Extended European Search Report for EP Patent Appln. No. 19823120.1 dated Jul. 7, 2021.
PCT International Preliminary Report on Patentability for International Appln. No. PCT/US2019/038462 dated Dec. 22, 2020.
Foreign Response for EP Patent Appln. No. 19823120.1 dated Feb. 3, 2022.
Foreign Response for EP Patent Appln. No. 19823120.1 dated Mar. 20, 2023.
Foreign OA for JP Patent Appln. No. 2020-570463 dated Apr. 19, 2023 (with English translation).
Foreign OA for CN Patent Appln. 201980054294.7 dated Dec. 25, 2023 (with English translation).
Extended European Search Report for EP Patent Appln. No. 23218626.2 dated Mar. 12, 2024.
Foreign Response for CN Patent Appln. No. 201980054294.7 dated Apr. 22, 2024.
Foreign NOA for CN Patent Appln. No. 201980054294.7 dated Sep. 24, 2024.
Foreign Response for EP Patent Appln. No. 23218626.2 dated Oct. 10, 2024.
Foreign OA for JP Patent Appln. No. 2023-189938 dated Oct. 22, 2024 (with English translation).
Foreign Response for JP Patent Appln. No. 2023-189938 dated Jan. 21, 2025.
Foreign NOA for JP Patent Appln. No. 2023-189938 dated Mar. 26, 2025.
Foreign NOA for EP Patent Appln. No. 23218626.2 dated Mar. 21, 2025.

* cited by examiner

METHODS AND APPARATUSES FOR PROVIDING INPUT FOR HEAD-WORN IMAGE DISPLAY DEVICES

CROSS-REFERENCE TO RELATED APPLICATION(S)

The present application is a continuation of U.S. patent application Ser. No. 16/448,452 filed on Jun. 21, 2019, under and entitled "METHODS AND APPARATUSES FOR PROVIDING INPUT FOR HEAD-WORN IMAGE DISPLAY DEVICES", which claims the benefit of U.S. Provisional Patent Application Ser. No. 62/688,108 filed on Jun. 21, 2018, under and entitled "METHODS AND APPARATUSES FOR PROVIDING INPUT FOR HEAD-WORN IMAGE DISPLAY DEVICES". The present application is related to U.S. patent application Ser. No. 15/968,673 filed on May 1, 2018, now U.S. patent Ser. No. 10/930,076, U.S. patent application Ser. No. 15/965,702 filed on Apr. 27, 2018, now U.S. patent Ser. No. 11/163,416, U.S. Provisional Patent Application Ser. No. 62/610,101 filed on Dec. 22, 2017, U.S. patent application Ser. No. 16/224,719 filed on Dec. 18, 2018, now U.S. patent Ser. No. 11/024,086, U.S. Design Patent Application Ser. No. 29/654,222, filed on Jun. 21, 2018, under, now U.S. Patent Serial No. D891,460 and entitled "DISPLAY PANEL OR PORTION THEREOF WITH A TRANSITIONAL GRAPHICAL USER INTERFACE", U.S. Design Patent Application Ser. No. 29/654,225 filed on Jun. 21, 2018, under, now U.S. Patent Serial No. D878,396 and entitled "DISPLAY PANEL OR PORTION THEREOF WITH A GRAPHICAL USER INTERFACE". The contents of the aforementioned U.S. provisional patent applications, U.S. patent applications, U.S. design patent applications, U.S. patents, and U.S. design patents are hereby explicitly and fully incorporated by reference in their entireties for all purposes, as though set forth in the present application in full.

FIELD OF THE INVENTION

The present application relates to head-worn image display devices, and methods and apparatus for providing input for such image display devices.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exists in the brains (e.g., the optical centers) of a user of the head-worn display device when stimulated by light beams directed to the eyes of the user.

Methods and apparatuses for providing input for head-worn image display devices (e.g., MR devices, AR devices, VR devices, etc.) are disclosed herein.

SUMMARY

An apparatus for use with an image display device configured for head-worn by a user, includes: a screen; and a processing unit configured to assign a first area of the screen to sense finger-action of the user; wherein the processing unit is configured to generate an electronic signal to cause a change in a content displayed by the image display device based on the finger-action of the user sensed by the assigned first area of the screen of the apparatus. As used in this specification, the term "finger-action" may include action performed by one or more fingers, and may include actions such as swiping, pinching, un-pinching, tapping, pressing, holding, twisting, turning, etc.

Optionally, the screen has a touch-sensitive region, and wherein the assigned first area is less than a total area of the touch-sensitive region.

Optionally, the assigned first area has a shape that corresponds with a shape of a screen of the image display device.

Optionally, the assigned first area has a dimension based on a brand and/or a model of the apparatus.

Optionally, the assigned first area has a dimension that is based on a feature of the apparatus and a feature of the image display device.

Optionally, the processing unit is configured to ignore input generated by the user using a portion of the touch-sensitive region that is not a part of the assigned first area, and that is not a part of an assigned button.

Optionally, the processing unit is also configured to operate a feedback component in response to the finger-action of the user.

Optionally, the first area has a boundary, and wherein the finger-action of the user comprises a finger of the user crossing, reaching, or moving to a location that is within a prescribed distance from, the boundary.

Optionally, the first area has one or more boundaries that at least partially surround a reference location, and wherein the processing unit is configured to operate the feedback component in response to a finger of the user reaching a prescribed distance from the reference location.

Optionally, the processing unit is configured to operate the feedback component to generate different types of feedback based on different respective spatial relationships between one or more finger(s) of the user with respect to the first area.

Optionally, the different types of feedback comprise a first haptic impulse with a first amplitude, and a second haptic impulse with a second amplitude that is different from the first amplitude.

Optionally, the different types of feedback comprise a first number of haptic impulse(s), and a second number of haptic impulse(s) that is different from the first number.

Optionally, the different types of feedback comprise a first series of haptic impulses with a first frequency, and a second series of haptic impulses with a second frequency that is different from the first frequency.

Optionally, the different respective spatial relationships comprise different distances between (1) one of the one or more finger(s), or a point that is between two fingers, of the user and (2) a reference location within the assigned first area.

Optionally, the reference location comprises a center of the assigned first area.

Optionally, the different distances exceed a threshold.

Optionally, the different respective spatial relationships comprise one of the one or more finger(s), or a point that is between two fingers, reaching different respective distances from a boundary of the assigned first area.

Optionally, the assigned first area has a first boundary and a second boundary; wherein the different types of the feedback comprise at least a first type of feedback and a second type of feedback; wherein the processing unit is configured to operate the feedback component to generate the first type of feedback when one or more finger(s) of the user crosses, reaches, or moves to a location that is within a prescribed distance from, the first boundary; and wherein the processing unit is configured to operate the feedback component to generate the second type of feedback when one or more finger(s) of the user crosses, reaches, or moves to a location that is within a prescribed distance from, the second boundary.

Optionally, the first boundary comprises a left or right boundary, and the second boundary comprises a top or bottom boundary, of the assigned first area.

Optionally, the processing unit is configured to operate the feedback component based on a swiping direction.

Optionally, the processing unit is configured to obtain an input signal associated with a pinching or un-pinching action performed on the assigned first area of the screen.

Optionally, the processing unit is configured to generate the electronic signal to cause a size of the content displayed by the image display device to change based on the input signal that is associated with the pinching or un-pinching action.

Optionally, the apparatus further includes an orientation sensor for sensing an orientation of the apparatus, wherein the processing unit is also configured to generate the electronic signal to cause the content displayed by the image display device to change based on the input signal associated with the pinching or un-pinching action and the sensed orientation of the apparatus.

Optionally, the processing unit is configured to generate the electronic signal to cause the content to contract or expand in a first plane if the pinching or un-pinching action is sensed by the apparatus while the apparatus is at a first orientation; and wherein the processing unit is configured to generate the electronic signal to cause the content to contract or expand in a second plane if the pinching or un-pinching action is sensed by the apparatus while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the processing unit is configured to obtain an input signal associated with a swiping action performed on the assigned first area of the screen.

Optionally, the processing unit is configured to generate the electronic signal to cause the content to change by moving the content in response to the input signal associated with the swiping action.

Optionally, the apparatus further includes an orientation sensor for sensing an orientation of the apparatus, wherein the processing unit is configured to generate the electronic signal to cause the content displayed by the image display device to change based on the input signal associated with the swiping action and the sensed orientation of the apparatus.

Optionally, the processing unit is configured to generate the electronic signal to cause the content to move in a first plane if the swiping action is sensed by the apparatus while the apparatus is at a first orientation; and wherein the processing unit is configured to generate the electronic signal to cause the content to move in a second plane if the swiping action is sensed by the apparatus while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the content is in a virtual three-dimensional environment, and wherein the processing unit is configured to generate the electronic signal to cause the content displayed by the image display device to change by moving the content closer to or further from the user when the swiping action is sensed by the apparatus while the orientation of the apparatus is approximately parallel to a horizontal plane.

Optionally, the content is in a virtual three-dimensional environment, and wherein the processing unit is configured to generate the electronic signal to cause the content displayed by the image display device to move in a vertical plane in the three-dimensional environment when the swiping action is sensed by the apparatus while the orientation of the apparatus is approximately perpendicular to a horizontal plane.

Optionally, the apparatus further includes an orientation sensor for sensing an orientation of the apparatus, wherein the processing unit is configured to generate the electronic signal based on the sensed orientation of the apparatus.

Optionally, the processing unit is configured to generate the electronic signal to cause the content to expand in one or more directions based on the sensed orientation of the apparatus.

Optionally, the processing unit is configured to generate the electronic signal to cause the content to rotate based on the sensed orientation of the apparatus.

Optionally, the processing unit is configured to generate the electronic signal to cause the content to move based on the sensed orientation of the apparatus.

Optionally, the apparatus further includes a movement sensor for sensing a movement of the apparatus, wherein the processing unit is configured to generate the electronic signal to cause the content displayed by the image display device to change based on the sensed movement of the apparatus.

Optionally, the processing unit is configured to generate the electronic signal to cause the content to change by moving the content based on the sensed movement of the apparatus.

Optionally, the apparatus is a handheld apparatus.

Optionally, the handheld apparatus comprises a cell phone, a smart phone, a personal-digital-assistant (PDA), or a tablet.

Optionally, the assigned first area of the screen has no displayed object while the assigned first area of the screen is sensing the finger-action of the user.

Optionally, the processing unit is configured to operate the screen to display a grid of dots in the assigned first area of the screen.

Optionally, the processing unit is also configured to change a feature of one or more of the dots in response to the user touching a part of the assigned first area of the screen where the one or more of the dots are displayed.

Optionally, the processing unit is also configured to assign a second area of the screen as a first button.

Optionally, the first button is a "HOME" button.

Optionally, the processing unit is also configured to assign a third area of the screen as a second button.

Optionally, the second button is a "TOGGLE" button.

Optionally, the processing unit is also configured to assign a fourth area of the screen as a third button.

Optionally, the third button is a "BUMPER" button.

Optionally, the processing unit is also configured to assign a second area of the screen as a keyboard activation button, and wherein the processing unit is configured to operate the screen to display a keyboard in response to the user touching the assigned second area of the screen.

Optionally, the apparatus further includes a wireless receiver for communication with the image display device.

Optionally, the apparatus further includes a connector for communication with the image display device via a cable.

Optionally, the apparatus further includes a non-transitory medium storing a set of instruction, an execution of which will cause the processing unit to assign the first area of the screen for sensing finger-action of the user.

Optionally, the change in the content comprises a change in a size of the content, a change in a position of the content, a change in a shape of the content, a change in a color of the content, a replacement of information in the content, an increase or decrease in a quantity of information in the content, or any combination of the foregoing.

A method includes: assigning a first area of a screen of an apparatus to sense finger-action of a user of an image display device, wherein the image display device is configured for head-worn by the user, and wherein the apparatus is different from the image display device; generating an electronic signal to cause a change in a content displayed by the image display device based on the finger-action of the user sensed by the assigned first area of the screen of the apparatus.

Optionally, the screen has a touch-sensitive region, and wherein the assigned first area is less than a total area of the touch-sensitive region.

Optionally, the assigned first area has a shape that corresponds with a shape of a screen of the image display device.

Optionally, the assigned first area has a dimension based on a brand and/or a model of the apparatus.

Optionally, the assigned first area has a dimension that is based on a feature of the apparatus and a feature of the image display device.

Optionally, the method further includes ignoring input generated by the user using a portion of the touch-sensitive region that is not a part of the assigned first area, and that is not a part of an assigned button.

Optionally, the method further includes generating a control signal to operate a feedback component in response to the finger-action of the user.

Optionally, the first area has a boundary, and wherein the finger-action of the user comprises a finger of the user crossing, reaching, or moving to a location that is within a prescribed distance from, the boundary.

Optionally, the first area has one or more boundaries that at least partially surround a reference location, and wherein the control signal is for operating the feedback component in response to a finger of the user reaching a prescribed distance from the reference location.

Optionally, the method further includes generating different control signals to operate a feedback component to generate different respective types of feedback based on different respective spatial relationships between one or more finger(s) of the user with respect to the first area.

Optionally, the different types of feedback comprise a first haptic impulse with a first amplitude, and a second haptic impulse with a second amplitude that is different from the first amplitude.

Optionally, the different types of feedback comprise a first number of haptic impulse(s), and a second number of haptic impulse(s) that is different from the first number.

Optionally, the different types of feedback comprise a first series of haptic impulses with a first frequency, and a second series of haptic impulses with a second frequency that is different from the first frequency.

Optionally, the different respective spatial relationships comprise different distances between (1) one of the one or more finger(s), or a point that is between two fingers, of the user and (2) a reference location within the assigned first area.

Optionally, the reference location comprises a center of the assigned first area.

Optionally, the different distances exceed a threshold.

Optionally, the different respective spatial relationships comprise one of the one or more finger(s), or a point that is between two fingers, reaching different respective distances from a boundary of the assigned first area.

Optionally, the assigned first area has a first boundary and a second boundary; wherein the different types of the feedback comprise at least a first type of feedback and a second type of feedback; wherein the feedback component is operated to generate the first type of feedback when one or more finger(s) of the user crosses, reaches, or moves to a location that is within a prescribed distance from, the first boundary; and wherein the feedback component is operated to generate the second type of feedback when one or more finger(s) of the user crosses, reaches, or moves to a location that is within a prescribed distance from, the second boundary.

Optionally, the first boundary comprises a left or right boundary, and the second boundary comprises a top or bottom boundary, of the assigned first area.

Optionally, the control signal for operating the feedback component is based on a swiping direction.

Optionally, the method further includes receiving an input signal associated with a pinching or un-pinching action performed by the user on the assigned first area of the screen.

Optionally, the electronic signal is for changing a size of the content displayed by the image display device in response to the input signal that is associated with the pinching or un-pinching action.

Optionally, the method further includes obtaining an orientation of the apparatus from an orientation sensor, wherein the electronic signal is for changing the content displayed by the image display device based on the input signal that is associated with the pinching or un-pinching action and the orientation of the apparatus.

Optionally, the content is changed by contracting or expanding the content in a first plane if the pinching or un-pinching action is sensed by the assigned first area while the apparatus is at a first orientation; and wherein the content is changed by contracting or expanding the content in a second plane if the pinching or un-pinching action is sensed by the assigned first area while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the method further includes receiving an input signal associated with a swiping action performed by the user on the assigned first area of the screen.

Optionally, the electronic signal is for moving the content displayed by the image display device in response to the sensed swiping action.

Optionally, the method further includes obtaining an orientation of the apparatus from an orientation sensor, wherein the electronic signal is for changing the content displayed by the image display device based on the input signal that is associated with the swiping action and the orientation of the apparatus.

Optionally, the content is changed by moving the content in a first plane if the swiping action is sensed by the assigned first area while the apparatus is at a first orientation; and wherein the content is changed by moving the content in a second plane if the swiping action is sensed by the assigned first area while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the content is in a virtual three-dimensional environment, and wherein the electronic signal is for causing the content displayed by the image display device to move closer to or further from the user when the swiping action is sensed by the assigned first area while the orientation of the apparatus is approximately parallel to a horizontal plane.

Optionally, the content is in a virtual three-dimensional environment, and wherein the electronic signal is for causing the content displayed by the image display device to move in a vertical plane in the three-dimensional environment when the swiping action is sensed by the assigned first area while the orientation of the apparatus is approximately perpendicular to a horizontal plane.

Optionally, the method further includes obtaining a sensor input indicating a sensed orientation of the apparatus, wherein the electronic signal is for changing the content displayed by the image display device based on the sensor input indicating the sensed orientation of the apparatus.

Optionally, the electronic signal is for changing the content by expanding the content in one or more directions based on the sensor input indicating the sensed orientation of the apparatus.

Optionally, the electronic signal is for changing the content by rotating the content based on the sensor input indicating the sensed orientation of the apparatus.

Optionally, the electronic signal is for changing the content by moving the content based on the sensor input indicating the sensed orientation of the apparatus.

Optionally, the method further includes obtaining a sensor input indicating a sensed movement of the apparatus, wherein the electronic signal is for changing the content displayed by the image display device based on the sensor input indicating the sensed movement of the apparatus.

Optionally, the electronic signal is for changing the content by moving the content based on the sensor input indicating the sensed movement of the apparatus.

Optionally, the apparatus is a handheld apparatus.

Optionally, the handheld apparatus comprises a cell phone, a smart phone, a personal-digital-assistant (PDA), or a tablet.

Optionally, the assigned first area of the screen has no displayed object while the assigned first area of the screen is sensing the finger-action of the user.

Optionally, the method further includes operating the screen to display a grid of dots in the assigned first area of the screen.

Optionally, the method further includes changing a feature of one or more of the dots in response to the user touching a part of the assigned first area of the screen where the one or more of the dots are displayed.

Optionally, the method further includes assigning a second area of the screen as a first button.

Optionally, the first button is a "HOME" button.

Optionally, the method further includes assigning a third area of the screen as a second button.

Optionally, the second button is a "TOGGLE" button.

Optionally, the method further includes assigning a fourth area of the screen as a third button.

Optionally, the third button is a "BUMPER" button.

Optionally, the method further includes: assigning a second area of the screen as a keyboard activation button, and operating the screen to display a keyboard in response to the user touching the assigned second area of the screen.

Optionally, the method further includes wirelessly communicating with the image display device.

Optionally, the method further includes communicating with the image display device via a cable.

Optionally, the apparatus comprises a non-transitory medium storing an instruction, and wherein the act of assigning the first area of the screen for sensing finger-action of the user is performed based on the instruction.

Optionally, the change in the content comprises a change in a size of the content, a change in a position of the content, a change in a shape of the content, a change in a color of the content, a replacement of information in the content, an increase or decrease in a quantity of information in the content, or any combination of the foregoing.

A product includes a non-transitory medium storing a set of instructions, an execution of which will cause a method to be performed, the method comprising:

assigning a first area of a screen of an apparatus to sense finger-action of a user of an image display device, wherein the image display device is configured for head-worn by the user, and wherein the apparatus is different from the image display device; generating an electronic signal to cause a change in a content displayed by the image display device based on the finger-action of the user sensed by the assigned first area of the screen of the apparatus.

Optionally, the screen has a touch-sensitive region, and wherein the assigned first area is less than a total area of the touch-sensitive region.

Optionally, the assigned first area has a shape that corresponds with a shape of a screen of the image display device.

Optionally, the assigned first area has a dimension based on a brand and/or a model of the apparatus.

Optionally, the assigned first area has a dimension that is based on a feature of the apparatus and a feature of the image display device.

Optionally, the method further comprises ignoring input generated by the user using a portion of the touch-sensitive region that is not a part of the assigned first area, and that is not a part of an assigned button.

Optionally, the method further comprises generating a control signal to operate a feedback component in response to the finger-action of the user.

Optionally, the first area has a boundary, and wherein the finger-action of the user comprises a finger of the user crossing, reaching, or moving to a location that is within a prescribed distance from, the boundary.

Optionally, the first area has one or more boundaries that at least partially surround a reference location, and wherein the control signal is for operating the feedback component in response to a finger of the user reaching a prescribed distance from the reference location.

Optionally, the method further comprises generating different control signals to operate a feedback component to generate different respective types of feedback based on different respective spatial relationships between one or more finger(s) of the user with respect to the first area.

Optionally, the different types of feedback comprise a first haptic impulse with a first amplitude, and a second haptic impulse with a second amplitude that is different from the first amplitude.

Optionally, the different types of feedback comprise a first number of haptic impulse(s), and a second number of haptic impulse(s) that is different from the first number.

Optionally, the different types of feedback comprise a first series of haptic impulses with a first frequency, and a second series of haptic impulses with a second frequency that is different from the first frequency.

Optionally, the different respective spatial relationships comprise different distances between (1) one of the one or more finger(s), or a point that is between two fingers, of the user and (2) a reference location within the assigned first area.

Optionally, the reference location comprises a center of the assigned first area.

Optionally, the different distances exceed a threshold.

Optionally, the different respective spatial relationships comprise one of the one or more finger(s), or a point that is between two fingers, reaching different respective distances from a boundary of the assigned first area.

Optionally, the assigned first area has a first boundary and a second boundary; wherein the different types of the feedback comprise at least a first type of feedback and a second type of feedback; wherein the feedback component is operated to generate the first type of feedback when one or more finger(s) of the user crosses, reaches, or moves to a location that is within a prescribed distance from, the first boundary; and wherein the feedback component is operated to generate the second type of feedback when one or more finger(s) of the user crosses, reaches, or moves to a location that is within a prescribed distance from, the second boundary.

Optionally, the first boundary comprises a left or right boundary, and the second boundary comprises a top or bottom boundary, of the assigned first area.

Optionally, the control signal for operating the feedback component is based on a swiping direction.

Optionally, the method further comprises receiving an input signal associated with a pinching or un-pinching action performed by the user on the assigned first area of the screen.

Optionally, the electronic signal is for changing a size of the content displayed by the image display device in response to the input signal that is associated with the pinching or un-pinching action.

Optionally, the method further comprises obtaining an orientation of the apparatus from an orientation sensor, wherein the electronic signal is for changing the content displayed by the image display device based on the input signal that is associated with the pinching or un-pinching action and the orientation of the apparatus.

Optionally, the content is changed by contracting or expanding the content in a first plane if the pinching or un-pinching action is sensed by the assigned first area while the apparatus is at a first orientation; and wherein the content is changed by contracting or expanding the content in a second plane if the pinching or un-pinching action is sensed by the assigned first area while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the method further comprises receiving an input signal associated with a swiping action performed by the user on the assigned first area of the screen.

Optionally, the electronic signal is for moving the content displayed by the image display device in response to the sensed swiping action.

Optionally, the method further comprises obtaining an orientation of the apparatus from an orientation sensor, wherein the electronic signal is for changing the content displayed by the image display device based on the input signal that is associated with the swiping action and the orientation of the apparatus.

Optionally, the content is changed by moving the content in a first plane if the swiping action is sensed by the assigned first area while the apparatus is at a first orientation; and wherein the content is changed by moving the content in a second plane if the swiping action is sensed by the assigned first area while the apparatus is at a second orientation different from the first orientation, the second plane being different from the first plane.

Optionally, the apparatus has the first orientation when a major axis of the apparatus forms an angle with a horizontal plane that is less than 45°.

Optionally, the apparatus has the second orientation when a major axis of the apparatus forms an angle with a vertical plane that is less than 45°.

Optionally, the first plane comprises a Y-Z plane in a virtual three-dimensional environment, and the second plane comprises a X-Y plane in the virtual three-dimensional environment.

Optionally, the first plane and the second plane are with respect to a virtual three-dimensional environment.

Optionally, the first plane is perpendicular to the second plane.

Optionally, the content is in a virtual three-dimensional environment, and wherein the electronic signal is for causing the content displayed by the image display device to move closer to or further from the user when the swiping action is sensed by the assigned first area while the orientation of the apparatus is approximately parallel to a horizontal plane.

Optionally, the content is in a virtual three-dimensional environment, and wherein the electronic signal is for causing the content displayed by the image display device to move in a vertical plane in the three-dimensional environment when the swiping action is sensed by the assigned first area while the orientation of the apparatus is approximately perpendicular to a horizontal plane.

Optionally, the method further comprises obtaining a sensor input indicating a sensed orientation of the apparatus, wherein the electronic signal is for changing the content displayed by the image display device based on the sensor input indicating the sensed orientation of the apparatus.

Optionally, the electronic signal is for changing the content by expanding the content in one or more directions based on the sensor input indicating the sensed orientation of the apparatus.

Optionally, the electronic signal is for changing the content by rotating the content based on the sensor input indicating the sensed orientation of the apparatus.

Optionally, the electronic signal is for changing the content by moving the content based on the sensor input indicating the sensed orientation of the apparatus.

Optionally, the method further comprises obtaining a sensor input indicating a sensed movement of the apparatus, wherein the electronic signal is for changing the content displayed by the image display device based on the sensor input indicating the sensed movement of the apparatus.

Optionally, the electronic signal is for changing the content by moving the content based on the sensor input indicating the sensed movement of the apparatus.

Optionally, the apparatus is a handheld apparatus.

Optionally, the handheld apparatus comprises a cell phone, a smart phone, a personal-digital-assistant (PDA), or a tablet.

Optionally, the assigned first area of the screen has no displayed object while the assigned first area of the screen is sensing the finger-action of the user.

Optionally, the method further comprises operating the screen to display a grid of dots in the assigned first area of the screen.

Optionally, the method further comprises changing a feature of one or more of the dots in response to the user touching a part of the assigned first area of the screen where the one or more of the dots are displayed.

Optionally, the method further comprises assigning a second area of the screen as a first button.

Optionally, the first button is a "HOME" button.

Optionally, the method further comprises assigning a third area of the screen as a second button.

Optionally, the second button is a "TOGGLE" button.

Optionally, the method further comprises assigning a fourth area of the screen as a third button.

Optionally, the third button is a "BUMPER" button.

Optionally, the method further comprises: assigning a second area of the screen as a keyboard activation button, and operating the screen to display a keyboard in response to the user touching the assigned second area of the screen.

Optionally, the method further comprises wirelessly communicating with the image display device.

Optionally, the method further comprises communicating with the image display device via a cable.

Optionally, the product includes instruction for assigning the first area of the screen for sensing finger-action of the user.

Optionally, the change in the content comprises a change in a size of the content, a change in a position of the content, a change in a shape of the content, a change in a color of the content, a replacement of information in the content, an increase or decrease in a quantity of information in the content, or any combination of the foregoing.

A computing device includes: a proximity-sensitive display; and one or more processors that are operatively coupled to the proximity-sensitive display and are communicatively coupled to a wearable computing system, the one or more processors configured to: receive, from the wearable computing system, data indicating whether the proximity-sensitive display is visible to a user of the wearable computing system; monitor the data that is received from the wearable computing system for changes in the user's visibility of the proximity-sensitive display; in response to a detection of a change in the user's visibility of the proximity-sensitive display, switch between: (i) a first presentation mode in which the one or more processors are configured to operate the proximity-sensitive display in a manner such that a first load is placed on a power supply of the computing device, and (ii) a second presentation mode in which the one or more processors are configured to operate the proximity-sensitive display in a manner such that a second load is placed on the power supply of the computing device, the second load being less than the first load.

Optionally, the first presentation mode is one in which the one or more processors are configured to present a graphical user interface on the proximity-sensitive display.

Optionally, the second presentation mode is one in which the one or more processors are configured to present a limited version of the graphical user interface on the proximity-sensitive display.

Optionally, the first presentation mode is one in which the one or more processors are configured to operate the proximity-sensitive display such that content is presented at a first level of brightness, and the second presentation mode is one in which the one or more processors are configured to operate the proximity-sensitive display such that content is presented at a second level of brightness that is lower than the first level of brightness.

Optionally, the computing device is configured to operate in a same or similar manner as one or more of the computing devices and/or apparatuses described herein.

Optionally, the computing device is configured to perform one or more of the operations described in one or both of the methods described immediately below.

A computer-implemented method includes: receiving, from a wearable computing system, a first set of data indicating whether a proximity-sensitive display is visible to a user of the wearable computing system at a first point in time; receiving, from the wearable computing system, a second set of data indicating whether the proximity-sensitive display is visible to the user of the wearable computing system at a second, later point in time; determining, based on receiving the first and second sets of data from the wearable computing system, that a change in the user's visibility of the proximity-sensitive display has occurred; and in response to determining that the change in the user's visibility of the proximity-sensitive display has occurred, switching between (i) a first presentation mode in which a graphical user interface is presented on the proximity-sensitive display, and (ii) a second presentation mode in which the proximity-sensitive display consumes less power than it does in the first presentation mode.

Optionally, determining, based on receiving the first and second sets of data from the wearable computing system, that a change in the user's visibility of the proximity-sensitive display has occurred comprises: determining, based on receiving the first and second sets of data from the wearable computing system, that the user has lost visibility of the proximity-sensitive display.

Optionally, in response to determining that the user has lost visibility of the proximity-sensitive display, the method comprises switching from the first presentation mode to the second presentation mode.

Optionally, determining, based on receiving the first and second sets of data from the wearable computing system, that a change in the user's visibility of the proximity-sensitive display has occurred comprises: determining, based on receiving the first and second sets of data from the wearable computing system, that the user has regained visibility of the proximity-sensitive display.

Optionally, in response to determining that the user has lost visibility of the proximity-sensitive display, the method comprises switching from the second presentation mode to the first presentation mode.

Optionally, the method may be performed by the computing device described immediately above and/or the computing device described immediately below.

A computing device includes: a proximity-sensitive display; a feedback component; and one or more processors that are operatively coupled to the proximity-sensitive display and the feedback component and are communicatively coupled to a wearable computing system, the one or more processors configured to: receive, from the wearable computing system, data indicating whether the proximity-sensitive display is visible to a user of the wearable computing system; monitor the data that is received from the wearable computing system for changes in the user's visibility of the proximity-sensitive display; in response to a detection of a change in the user's visibility of the proximity-sensitive display, switch between: (i) a first mode in which the one or more processors are configured to present a user interface on the proximity-sensitive display, and (ii) a second mode in the one or more processors are configured to convey one or more portions of the user interface to the user through use of the feedback component.

Optionally, the feedback component is a haptic actuator.

Optionally, the feedback component is a speaker.

Optionally, the user interface is a graphical user interface for controlling one or more functions of the wearable computing system.

Optionally, the graphical user interface a plurality of graphical control elements.

Optionally, the second mode is one in which the one or more processors are configured to refrain from presenting one or more of the plurality of graphical control elements on the proximity-sensitive display.

Optionally, the second mode is one in which the one or more processors are configured to present a limited version of the graphical user interface on the proximity-sensitive display.

Optionally, the limited version of the graphical user interface on the proximity-sensitive display is one in which one or more of the plurality of graphical control elements are not shown, one in which brightness levels of one or more of the plurality of graphical control elements are reduced, or a combination thereof.

Optionally, the second mode is one in which the one or more processors are configured to convey one or more locations on the proximity-sensitive display at which one or more of the plurality of graphical control elements as presented in the first mode.

Optionally, the one or more locations on the proximity-sensitive display that are conveyed in the second mode correspond to one or more outer boundaries of the plurality of graphical control elements as presented in the first mode.

Optionally, the plurality of graphical control elements corresponds to a plurality of physical user input components of a dedicated input controller that is associated with the wearable computing system.

Optionally, the computing device is configured to operate in a same or similar manner as one or more of the computing devices and/or apparatuses described herein.

Optionally, the computing device is configured to perform one or more of the operations described in the method described immediately above and/or the method described immediately below.

A computer-implemented method includes: receiving, from a wearable computing system, a first set of data indicating whether a proximity-sensitive display is visible to a user of the wearable computing system at a first point in time; receiving, from the wearable computing system, a second set of data indicating whether the proximity-sensitive display is visible to the user of the wearable computing system at a second, later point in time; determining, based on receiving the first and second sets of data from the wearable computing system, that a change in the user's visibility of the proximity-sensitive display has occurred; and in response to determining that the change in the user's visibility of the proximity-sensitive display has occurred, switching between (i) a first mode in which a user interface is presented on the proximity-sensitive display, and (ii) a second mode in which one or more portions of the user interface are conveyed to the user of the wearable computing system through use of a feedback component.

Optionally, determining, based on receiving the first and second sets of data from the wearable computing system, that a change in the user's visibility of the proximity-sensitive display has occurred comprises: determining, based on receiving the first and second sets of data from the wearable computing system, that the user has lost visibility of the proximity-sensitive display.

Optionally, in response to determining that the user has lost visibility of the proximity-sensitive display, the method comprises switching from the first mode to the second mode.

Optionally, determining, based on receiving the first and second sets of data from the wearable computing system, that a change in the user's visibility of the proximity-sensitive display has occurred comprises: determining, based on receiving the first and second sets of data from the wearable computing system, that the user has regained visibility of the proximity-sensitive display.

Optionally, in response to determining that the user has lost visibility of the proximity-sensitive display, the method comprises switching from the second mode to the first mode.

Optionally, the method may be performed by one or both of the computing devices described immediately above.

A wearable computing system includes: a head-mounted display configured to be worn on a head of a user; one or more sensing devices configured to monitor an environment of head-mounted display; and one or more processors that are operatively coupled to the head-mounted display and the one or more sensing devices and are communicatively coupled to a computing device, the one or more processors configured to: use data obtained from the one or more sensing devices to determine whether a display of the computing device is visible to the user of the wearable computing system; generate one or more messages based at least in part on whether the display of the computing device is determined to be visible to the user of the wearable computing system; and transmit the one or more messages to the computing device.

Optionally, the one or more sensing devices include one or more cameras.

Optionally, the one or more cameras include one or more forward-facing cameras that are configured to capture images of an environment of the user of the wearable computing system.

Optionally, the one or more cameras include one or more inward-facing cameras that are configured to capture images of one or both of the user's eyes, one or more portions of the user's head or face, or a combination thereof.

Optionally, the one or more sensing devices include one or more proximity sensors.

Optionally, the wearable computing system is configured to operate in a same or similar manner as one or more of the wearable computing systems, the wearable display systems, and/or image display devices described herein.

Optionally, the wearable computing system is configured to perform one or more of the operations in the method described immediately below.

A computer-implemented method includes: obtaining data from one or more sensing devices of a wearable computing system; determining, based on receiving the data from the one or more sensing devices of the wearable computing system, whether a display of a computing device is visible to the user of the wearable computing system; generating one or more messages based on whether the display of the computing device is determined to be visible to the user of the wearable computing system; and transmitting the one or more messages to the computing device.

Optionally, obtaining data from one or more sensing devices of a wearable computing system comprises: obtaining data from one or more forward-facing cameras that are configured to capture images of an environment of the user of the wearable computing system.

Optionally, determining, based on receiving the data from the one or more sensing devices of the wearable computing system, whether a display of a computing device is visible to the user of the wearable computing system comprises: determining whether the display of the computing device is shown in one or more images captured by the one or more forward-facing cameras.

Optionally, obtaining data from one or more sensing devices of a wearable computing system comprises: obtaining data from one or more inward-facing cameras that are configured to capture images of one or both of the user's eyes, one or more portions of the user's head or face, or a combination thereof.

Optionally, determining, based on receiving the data from the one or more sensing devices of the wearable computing system, whether a display of a computing device is visible to the user of the wearable computing system comprises: determining, based on one or more images captured by the one or more inward-facing cameras, whether the wearable computing system is being worn by the user on the user's head.

Optionally, determining, based on one or more images captured by the one or more inward-facing cameras, whether the wearable computing system is being worn by the user on the user's head comprises: determining whether the user is shown in one or more images captured by the one or more inward-facing cameras.

Optionally, obtaining data from one or more sensing devices of a wearable computing system comprises: obtaining data from one or more proximity sensors.

Optionally, determining, based on receiving the data from the one or more sensing devices of the wearable computing system, whether a display of a computing device is visible to the user of the wearable computing system comprises: determining whether the data received from the one or more proximity sensors indicate that the wearable computing system is being worn by the user on the user's head.

Optionally, the method may be performed by the wearable computing system described immediately above.

A computing device includes: a proximity-sensitive display; a feedback component; and one or more processors that are operatively coupled to the proximity-sensitive display and the feedback component and are communicatively coupled to a wearable computing system, the one or more processors configured to: receive data indicating a first touch input received at a first location on the proximity-sensitive display; receive data indicating a second touch input received at a second location on the proximity-sensitive display immediately subsequent the first touch input; determine whether each of the first and second locations fall within a particular region of the proximity-sensitive display; in response to a determination that one or both of the first and second locations fall within the particular region of the proximity-sensitive display: generate one or more messages based at least in part on one or both of the first and second touch inputs; and transmit the one or more messages generated based at least in part on one or both of the first and second touch inputs to the wearable computing system; and in response to (i) a determination that the first location falls within the particular region of the proximity-sensitive display, and (ii) a determination that the second location falls outside of the particular region of the proximity-sensitive display: cause the feedback component to generate feedback.

Optionally, the particular region of the proximity-sensitive display is associated with a particular control element.

Optionally, the particular control element is a graphical control element, and the one or more processors are further configured to display the particular control element at a location on the proximity-sensitive display coinciding with the particular region.

Optionally, the feedback component is a haptic actuator.

Optionally, the feedback component is a speaker.

Optionally, the computing device is configured to operate in a same or similar manner as one or more of the computing devices and/or apparatuses described herein.

Optionally, the computing device is configured to perform one or more of the operations in the method described immediately below.

A computer-implemented method includes: receiving data indicating a first touch input received at a first location on a proximity-sensitive display; receiving data indicating a second touch input received at a second location on the proximity-sensitive display immediately subsequent the first touch input; determining whether each of the first and second locations fall within a particular region of the proximity-sensitive display; in response to determining that one or both of the first and second locations fall within the particular region of the proximity-sensitive display: generating one or more messages based at least in part on one or both of the first and second touch inputs; and transmitting the one or more messages generated based at least in part on one or both of the first and second touch inputs to a wearable computing system; and in response to (i) determining that the first location falls within the particular region of the proximity-sensitive display, and (ii) determining that the second location falls outside of the particular region of the proximity-sensitive display: providing feedback for output through a feedback component.

Optionally, the method may be performed by the computing device described immediately above.

A computing device includes: a proximity-sensitive display; an orientation sensor configured to sense an orientation of the computing device; and one or more processors that are operatively coupled to the proximity-sensitive display and the orientation sensor and are communicatively coupled to a wearable computing system, the one or more processors configured to: monitor for a sequence of touch inputs received through the proximity-sensitive display corresponding to any one of a plurality of different predefined gestures; in response to a detection of any one of the plurality of different predefined gestures: select, from among a plurality of different types of transformations that are associated with the plurality of different predefined gestures, respectively, a particular type of transformation that is associated with the detected gesture; select, from among multiple different axes, a particular axis based on data obtained from the orientation sensor; generate a command to apply the particular type of transformation to a virtual object relative to the particular axis; and transmit the command to the wearable computing system. Optionally, the computing device is configured to operate in a same or similar manner as one or more of the computing devices and/or apparatuses described herein.

Optionally, the computing device is configured to perform one or more of the operations in the method described immediately below.

A computer-implemented method includes: obtaining data indicating an orientation of a computing device; receiving data indicating a sequence of touch inputs received through a proximity-sensitive display of the computing device; determining that the sequence of touch inputs received through the proximity-sensitive display corresponds to a particular gesture; and in response to determining that the sequence of touch inputs received through the proximity-sensitive display corresponds to the particular gesture: selecting, from among a plurality of different types of transformations that are associated with a plurality of different predefined gestures, respectively, a particular type of transformation that is associated with the particular gesture; and selecting, from among multiple different axes, a particular axis based on the orientation of the device; and generating a command to apply the particular type of transformation to a virtual object relative to the particular axis.

Optionally, the plurality of different types of transformations includes one or more of: rotation, translation, and resizing.

Optionally, the method may be performed by the computing device described immediately above.

A computing device includes: a proximity-sensitive display; and one or more processors that are operatively coupled to the proximity-sensitive display and are communicatively coupled to a wearable display system, the one or more processors configured to: present a particular piece of content on the proximity-sensitive display; monitor for a sequence of touch inputs received through the proximity-sensitive display corresponding to any one of a plurality of different predefined gestures during the presentation of the particular piece of content on the proximity-sensitive display; in response to a detection of any one of the plurality of different predefined gestures during the presentation of the particular piece of content on the proximity-sensitive display: generate one or more messages indicating that presentation of the particular piece of content is to be handed off to the wearable display system; transmit the one or more messages to the wearable display system; and discontinue presentation of the particular piece of content on the proximity-sensitive display.

Optionally, the computing device is configured to operate in a same or similar manner as one or more of the computing devices and/or apparatuses described herein.

Optionally, the computing device is configured to perform one or more of the operations in the method described immediately below.

A computer-implemented method includes: presenting a particular piece of content on a proximity-sensitive display; while presenting the particular piece of content on the proximity-sensitive display, receiving data indicating a sequence of touch inputs received through the proximity-sensitive display; determining that the sequence of touch inputs received through the proximity-sensitive display corresponds to a particular gesture; in response to determining that the sequence of touch inputs received through the proximity-sensitive display corresponds to the particular gesture: generating one or more messages indicating that presentation of the particular piece of content is to be handed off to a wearable display system; transmitting the one or more messages to the wearable display system; and discontinuing presentation of the particular piece of content on the proximity-sensitive display.

Optionally, determining that the sequence of touch inputs received through the proximity-sensitive display corresponds to the particular gesture comprises: determining that the sequence of touch inputs received through the proximity-sensitive display corresponds to a gesture in which the user has dragged one or more of their fingers from a location on the proximity-sensitive display that is associated with the particular piece of content to an edge of the proximity-sensitive display.

Optionally, determining that the sequence of touch inputs received through the proximity-sensitive display corresponds to the particular gesture comprises: determining that the sequence of touch inputs received through the proximity-sensitive display corresponds to a gesture in which the user has pinched two or more of their fingers together at a particular location on the proximity-sensitive display that is associated with the particular piece of content and subsequently moved their two or more pinched-together fingers away from the particular location.

Optionally, a gesture in which the user has pinched two or more of their fingers together at a particular location on the proximity-sensitive display that is associated with the particular piece of content and subsequently moved their two or more pinched-together fingers away from the particular location comprises: a gesture in which the user has pinched two or more of their fingers together at a particular location on the proximity-sensitive display that is associated with the particular piece of content and subsequently moved their two or more pinched-together fingers to an edge of the proximity-sensitive display.

Optionally, a gesture in which the user has pinched two or more of their fingers together at a particular location on the proximity-sensitive display that is associated with the particular piece of content and subsequently moved their two or more pinched-together fingers away from the particular location comprises: a gesture in which the user has pinched two or more of their fingers together at a particular location on the proximity-sensitive display that is associated with the particular piece of content and subsequently lifted their two or more pinched-together fingers off of the proximity-sensitive display.

Optionally, presenting the particular piece of content on the proximity-sensitive display comprises: presenting a scene that includes the particular piece of content on the proximity-sensitive display.

Optionally, discontinuing presentation of the particular piece of content on the proximity-sensitive display comprises: moving the particular piece of content out of the scene.

Optionally, the method further comprises: while presenting the particular piece of content on the proximity-sensitive display, generating identification information for the particular piece of content, and transmitting the identification information for the particular piece of content to the wearable display system.

Optionally, the method further comprises: while presenting the particular piece of content on the proximity-sensitive display, generating data indicating a current location of the particular piece of content relative to the proximity-sensitive display, and transmitting the data indicating the current location of the particular piece of content to the wearable display system.

Optionally, the method may be performed by the computing device described immediately above.

A wearable computing system includes: a head-mounted display configured to be worn on a head of a user; one or more cameras configured to capture images of an environment in front of the user; and one or more processors that are operatively coupled to the head-mounted display and the one or more cameras and are communicatively coupled to a computing device, the one or more processors configured to: identify a particular piece of content that is being presented on a display of the computing device; receive one or more messages from the computing device indicating that presentation of the particular piece of content is to be handed off from the display of the computing device to the head-mounted display; in response to the one or more messages received from the computing device: use one or more images captured by the one or more cameras to determine a location in the environment in front of the user; and present the particular piece of content on the head-mounted display in a manner so as to be perceived by the user as being positioned at the determined location in the environment in front of the user.

Optionally, the wearable computing system is configured to operate in a same or similar manner as one or more of the wearable computing systems, the wearable display systems, and/or image display devices described herein.

Optionally, the wearable computing system is configured to perform one or more of the operations in the method described immediately below.

A computer-implemented method includes: identifying a particular piece of content that is being presented on a display of a computing device; receiving one or more messages from the computing device indicating that presentation of the particular piece of content is to be handed off from the display of the computing device to a head-mounted display; and in response to receiving the one or more messages received from the computing device: obtaining one or more images of an environment in front of a user of the head-mounted display; identifying a location in the environment in front of the user based on the one or more obtained images; and presenting the particular piece of content on the head-mounted display in a manner so as to be perceived by the user as being positioned at the determined location in the environment in front of the user.

Optionally, the display of the computing device on which the particular piece of content is presented is a two-dimensional screen.

Optionally, presenting the particular piece of content on the head-mounted display in a manner so as to be perceived by the user as being positioned at the determined location in the environment in front of the user comprises: presenting a three-dimensional representation of the particular piece of content on the head-mounted display in a manner so as to be perceived by the user as being positioned at the determined location in the environment in front of the user.

Optionally, the method further comprises receiving identification information for the particular piece of content from the computing device.

Optionally, identifying the particular piece of content that is being presented on the display of the computing device comprises: identifying the particular piece of content that is being presented on the display of the computing device based on the identification information received from the computing device.

Optionally, the method further comprises receiving data indicating a current location of the particular piece of content from the computing device.

Optionally, the current location of the particular piece of content corresponds to a current location of the particular piece of content relative to the display of the computing device.

Optionally, the method may be performed by the wearable computing system described immediately above.

A system includes: a computing device that is configured to operate as a stand-in for a dedicated input controller that is associated with a wearable computing system, wherein the computing device includes: a proximity-sensitive display; and one or more processors that are operatively coupled to the proximity-sensitive display and are communicatively coupled to the wearable computing system, the one or more processors configured to: present a plurality of graphical control elements at a plurality of locations on the proximity-sensitive display, respectively, wherein the plurality of graphical control elements correspond to a plurality of physical user input components of the dedicated input controller, respectively; monitor for touch input received at any one of the plurality of locations on the proximity-sensitive display; and in response to a detection of touch input received at any one of the plurality of locations on the proximity-sensitive display: identify, from among the plurality of graphical control elements that are associated with the plurality of locations on the proximity-sensitive display, a particular one of the plurality of graphical control elements that is associated with a particular one of the plurality of locations on the proximity-sensitive display at which the detected touch input was received; generate one or more messages based on the particular graphical control element; and transmit the one or more messages to the wearable computing system.

Optionally, the plurality of physical user input components of the dedicated input controller to which plurality of graphical control elements correspond include one or more of: a "Home" button, a "Trigger" button, a "Bumper" button, and a touchpad.

Optionally, the computing device is configured to operate in a same or similar manner as one or more of the computing devices and/or apparatuses described herein.

Optionally, the computing device is configured to perform one or more of the operations in the method described immediately below.

A computer-implemented method includes: providing a graphical user interface of an application that is running on a computing device for output on a proximity-sensitive display of the computing device; presenting a plurality of graphical control elements through the graphical user interface that correspond to a plurality of physical user input components of a dedicated input controller that is associated with a wearable computing system, respectively; receiving data indicating touch input received at a particular location on the proximity-sensitive display; determining that the particular location at which touch input was received is associated with a particular one of the plurality of graphical control elements; and in response to determining that the particular location at which touch input was received is associated with the particular graphical control element: generating one or more messages based on the particular graphical control element; and transmitting the one or more messages to the wearable computing system.

Optionally, the method may be performed by the computing device described immediately above.

Additional and other objects, features, and advantages of the application are described in the detail description, figures and claims.

BRIEF DESCRIPTION OF THE DRAWINGS

The drawings illustrate the design and utility of various embodiments of the present application. It should be noted that the figures are not drawn to scale and that elements of similar structures or functions are represented by like reference numerals throughout the figures. In order to better appreciate how to obtain the above-recited and other advantages and objects of various embodiments of the application, a more detailed description of the present applications briefly described above will be rendered by reference to specific embodiments thereof, which are illustrated in the accompanying drawings. Understanding that these drawings depict only typical embodiments of the application and are not therefore to be considered limiting of its scope, the application will be described and explained with additional specificity and detail through the use of the accompanying drawings in which.

DETAILED DESCRIPTION

Figure 1:
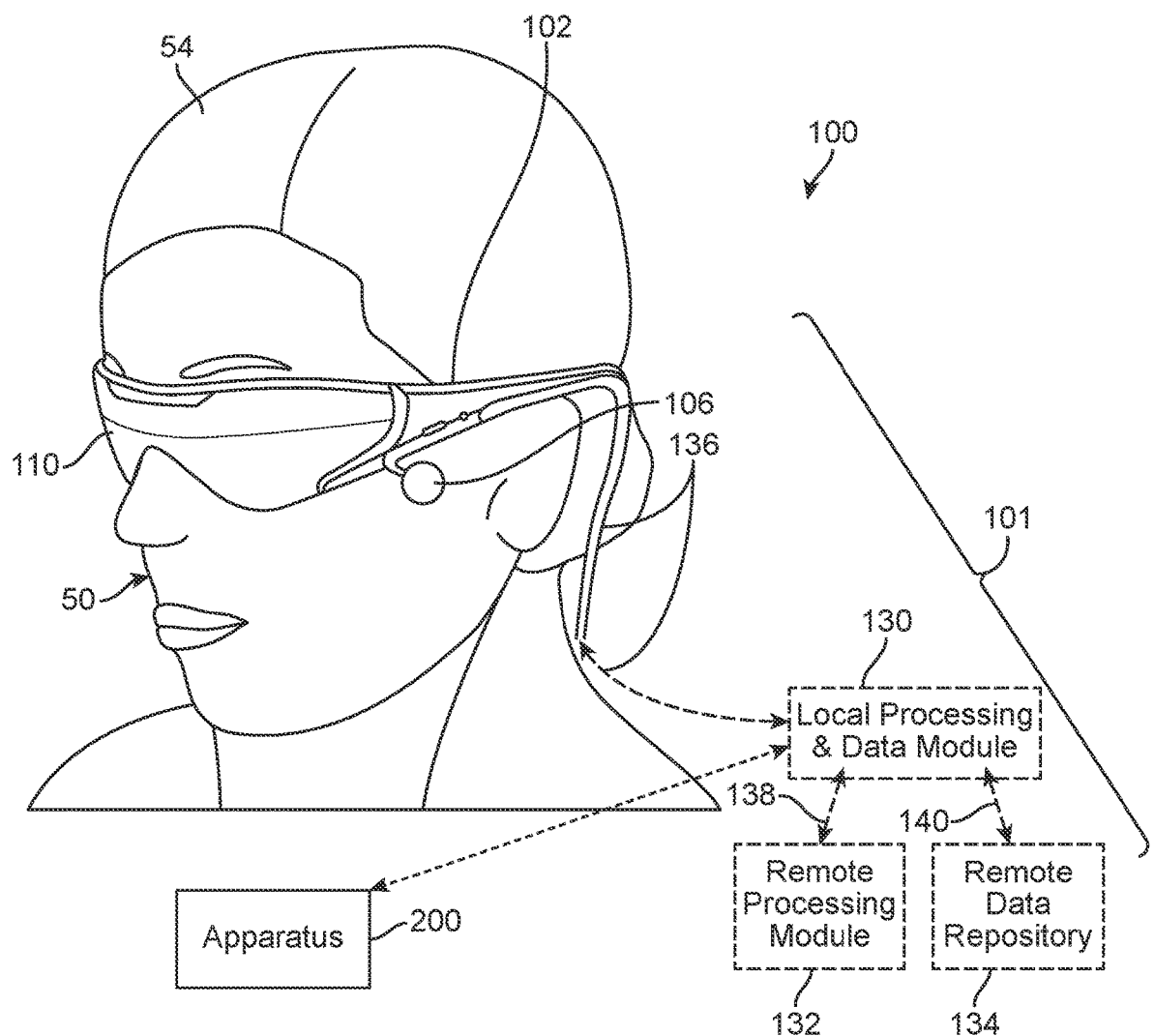
FIG. 1 illustrates another image display system having an image display device in accordance with some embodiments.
Figure 2:
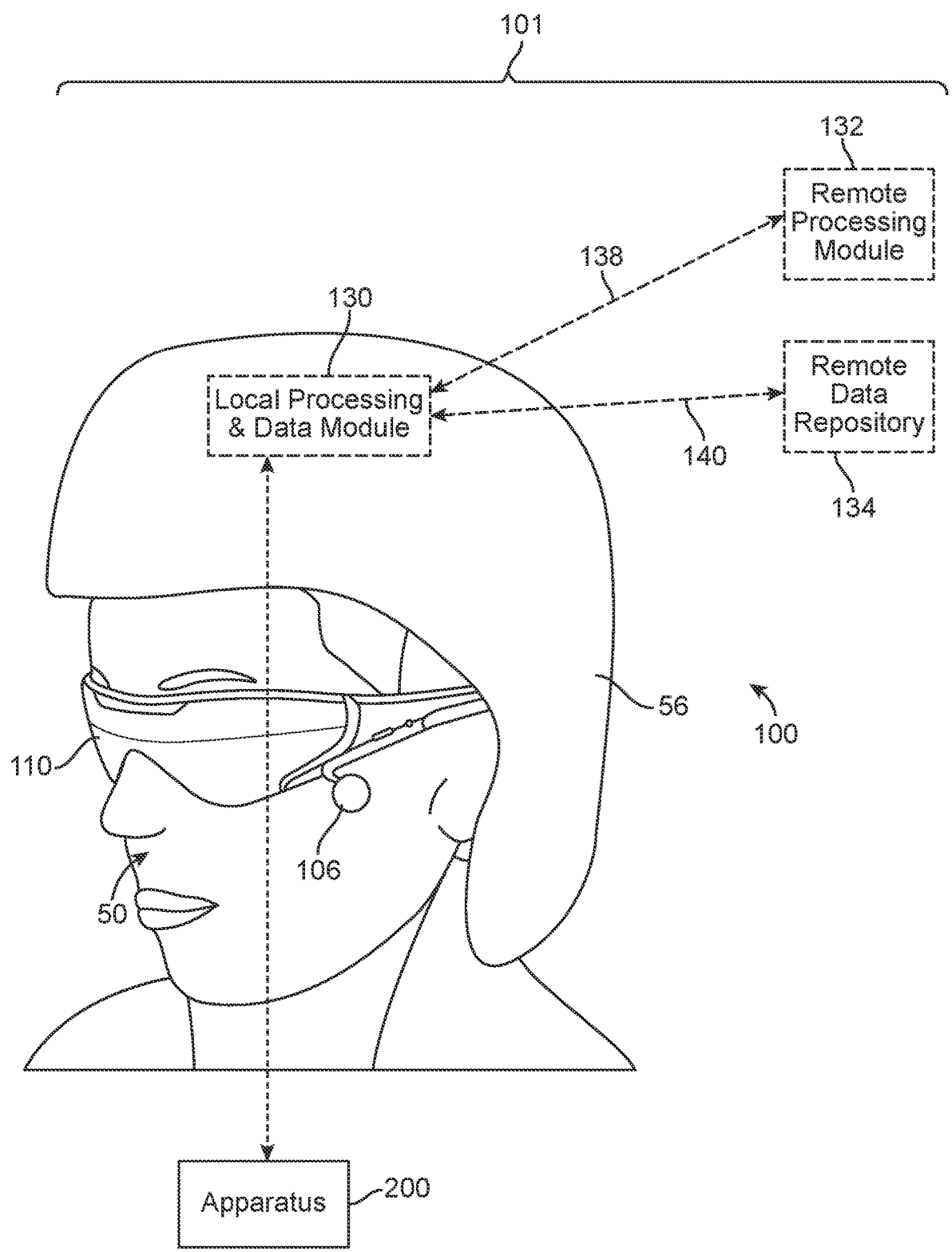
FIG. 2 illustrates another image display system having an image display device in accordance with other embodiments.
Figure 3:
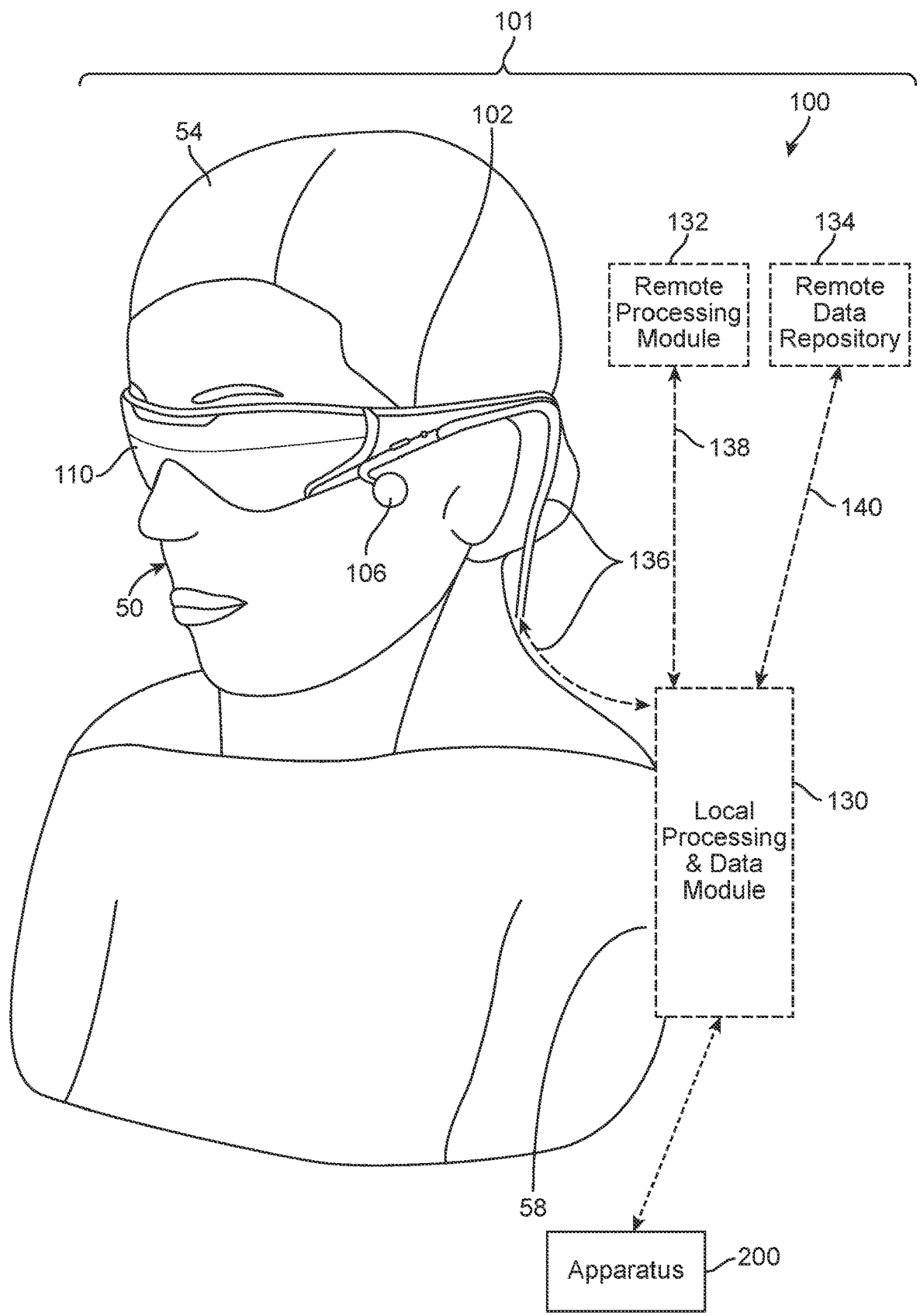
FIG. 3 illustrates another image display system having an image display device in accordance with other embodiments.

Various embodiments of the application are directed to methods, apparatuses, and articles of manufacture for providing input for head-worn video image devices. Other objects, features, and advantages of the application are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

SUMMARY OF PROBLEMS AND SOLUTIONS

In some cases, a head-worn image display device may have a dedicated input controller for allowing a user of the head-worn image display device to provide input. The dedicated input controller may be specific for the particular model of the head-worn image display device, and may be unique for each brand and model of the image display device. Such dedicated input controller may allow the user of the head-worn image display device to enter text by displaying a keyboard on the screen of the head-worn image display device, and the user may enter text by using the dedicated input controller to interact with the keyboard as displayed on the screen of the head-worn image display device. Such technique of entering text may be cumbersome and may not be ideal. Also, the dedicated input controller may have limited voice and gesture control. In addition, if the dedicated input controller for a particular head-worn image display device is lost, if the dedicated input controller breaks, or if the user forgets to bring the dedicated input controller, then there is no backup controller for the user to use. Furthermore, a dedicated input controller for head-worn image display device may not be able to transfer digital images, photos, and other media content between a user's media storage device and the head-worn image display device. A dedicated input controller also may not be capable of accessing application store and content, and may not be able to receive notifications from the head-worn image display device or from a network when the head-worn image display device is not being worn by the user.

In accordance with one or more embodiments described herein, an apparatus having a touch-screen is provided as an input device for allowing a user of a head-worn image display device to enter input for the image display device, which is sometimes referred to herein as the "wearable computing system" or "wearable display system." The apparatus, which is sometimes referred to herein more simply as the "computing device," may serve as a backup input device so that if a dedicated input controller for a head-worn image display device is unavailable, the apparatus may be used instead by the user to enter input. The apparatus may alternatively be also used as the main or sole input device for the image display device. The apparatus may be used as the main device for inputting text, or alternatively, be used as an alternative to a dedicated input controller for inputting text. Entering text through a touch screen of the apparatus while the user is viewing the screen of the apparatus through a transparent part of the head-worn image display device is more convenient and efficient than displaying a keyboard on a viewing screen of the image display device while the user enters text using the dedicated input controller. Also, in the embodiment in which the apparatus is implemented using the user's cell phone, the apparatus may also facilitate transfer of digital images and photos, and other media content, between the user's phone and the image display device. In addition, in some embodiments, the apparatus described herein allows a user of the head-worn image display device to access application store and content. Furthermore, in some embodiments, the apparatus described herein may receive notifications from the head-worn image display device or from a network when the head-worn image display device is not being worn by the user.

FIGS. 1-4 illustrate various components of an image display system 100 in various embodiments. The image display system 100 includes an image display device 101, and an apparatus 200 for providing input for the image display device 101. The apparatus 200 will be described in further detail below. The image display device 101 may be a VR device, an AR device, a MR device, or any of other types of display devices. The image display device 101 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally, or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The image display device 101 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros), or any combination of the foregoing. Many of these sensors operate on the assumption that the frame 102 on which they are affixed is in turn substantially fixed to the user's head, eyes, and ears.

The image display device 101 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The image display device 101 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 101 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
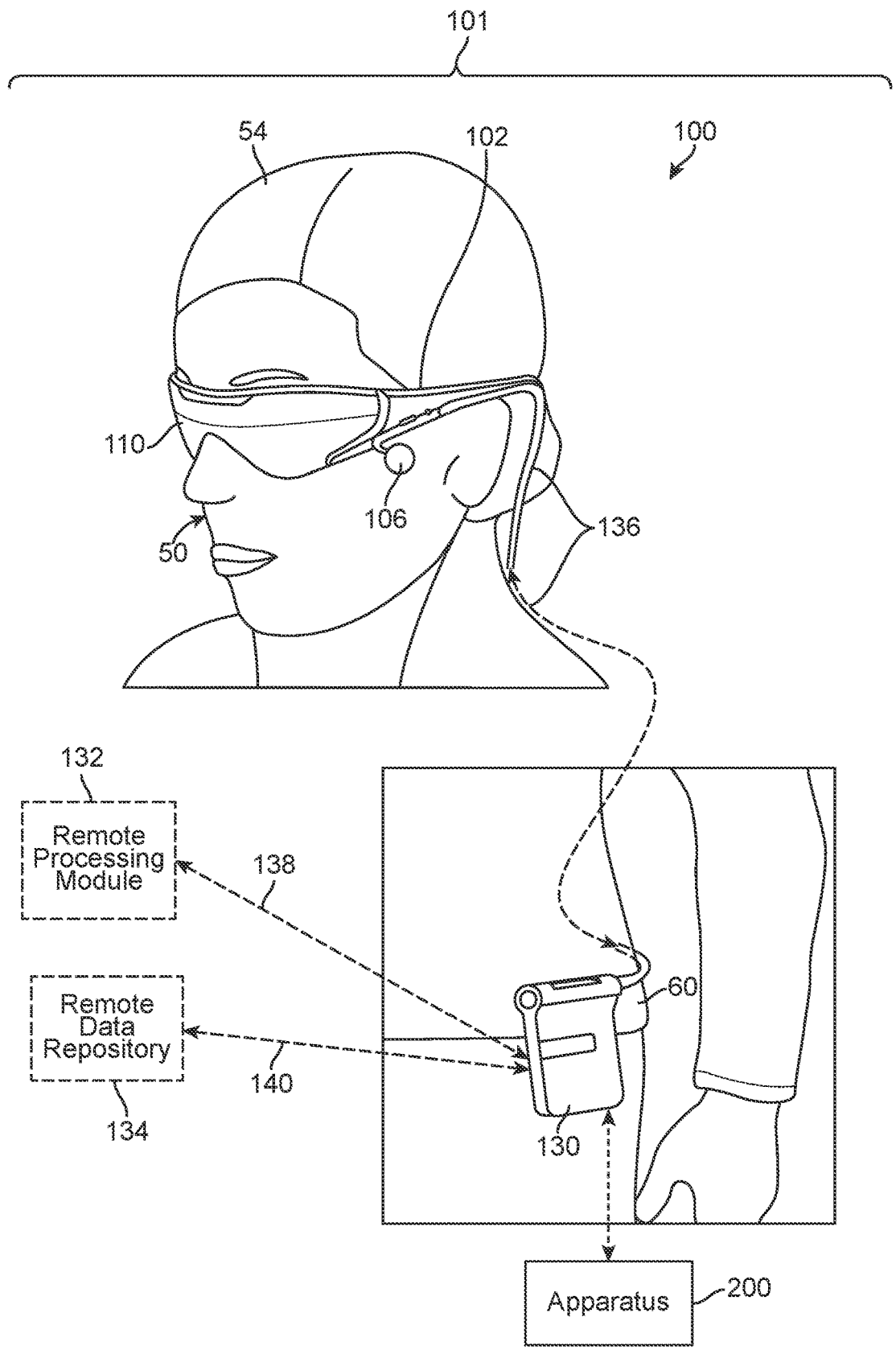
FIG. 4 illustrates another image display system having an image display device in accordance with other embodiments.

The various processing components of the image display device 101 may be physically contained in a distributed subsystem. For example, as illustrated in FIGS. 1-4, the image display device 101 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The image display device 101 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1-4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 100 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
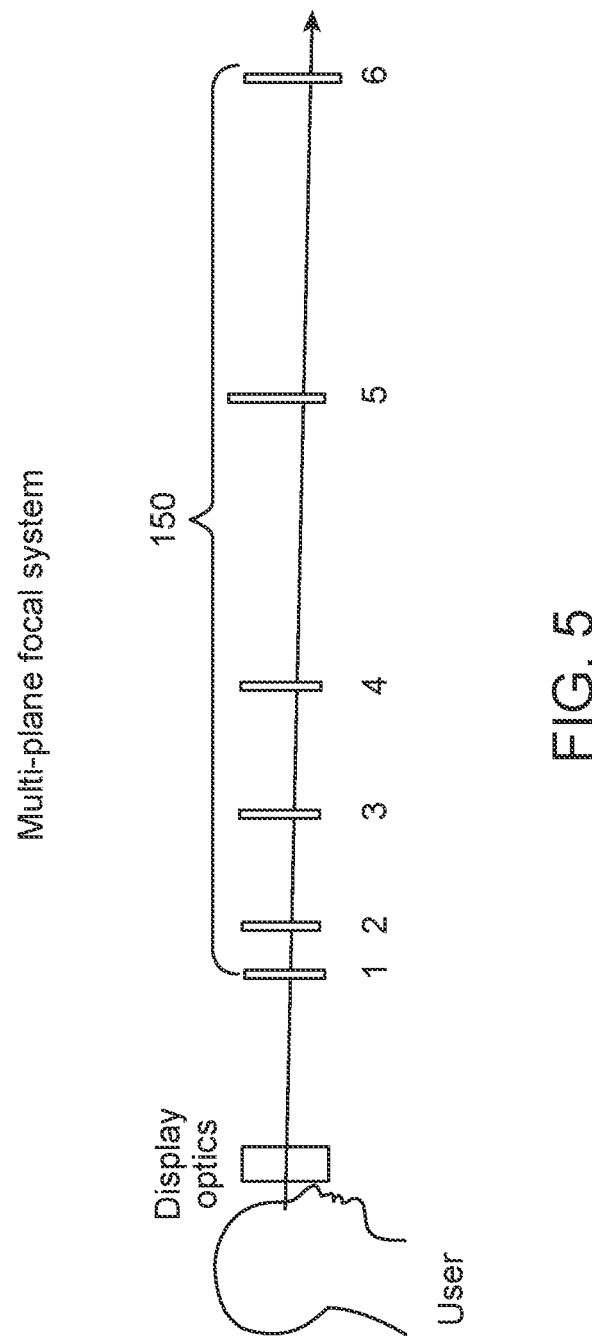
FIG. 5 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be 1/3 diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 100 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

As mentioned, and shown in FIGS. 1-4, the image display system 100 includes the apparatus 200 for providing input for the image display device 101. The apparatus 200 allows the user 50 of the image display device 101 to enter user input while the user 50 is viewing content displayed by the image display device 101. In one implementation, the apparatus 200 may be a handheld device (such as a cell phone (e.g., smart phone), a tablet, an IPAD, a mini-pad, etc.) configured to interact with the image display device 101. In the examples shown in FIGS. 1-4, the apparatus 200 interacts with the image display device 101 by communicating with the processing module 130 of the image display device 101. The communication between the apparatus 200 and the processing module 130 of the image display device 101 may be achieved via a wireless connection or a wired connection. In other embodiments, the apparatus 200 may also communicate with the remote processing module 132 and/or the remote data repository 134 via a wireless connection.

Figure 6:
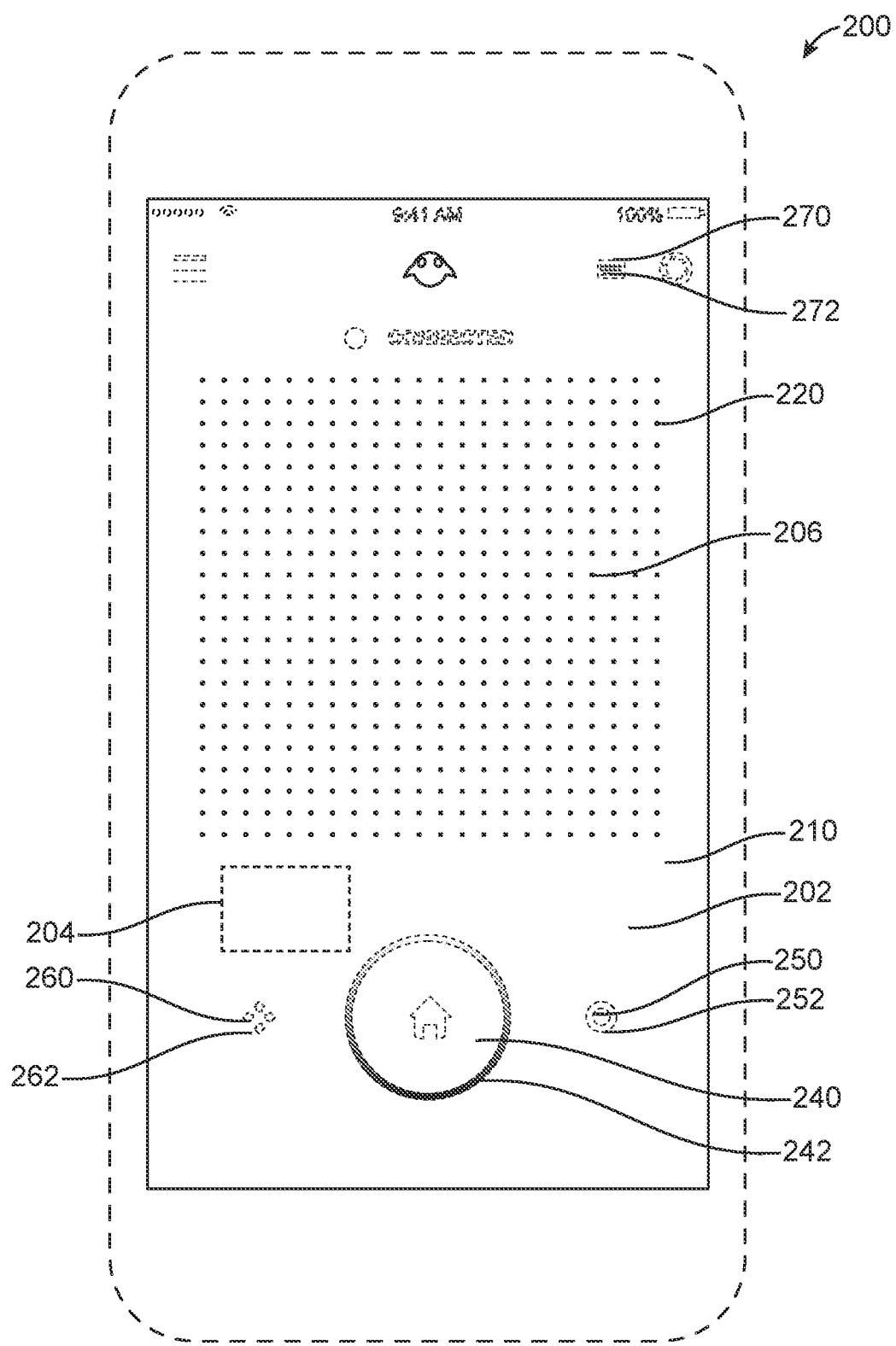
FIG. 6 illustrates an apparatus having a touch-sensitive screen with an assigned area for allowing a user to provide input for an image display device.

FIG. 6 illustrates an example of the apparatus 200. The apparatus 200 is for use with the image display device 101 configured for head-worn by the user 50. In particular, the apparatus 200 is configured as an input device/controller for allowing the user 50 to provide user input using his/her finger(s) while the user 50 is viewing images displayed by the display device 101. In some cases, the apparatus 200 may be considered to be a part of the image display system 100. The apparatus includes a screen 202, and a processing unit 204. The processing unit 204 is configured to assign a first area 206 of the screen 202 to sense finger-action of the user 50. The processing unit 204 is configured to detect different finger(s)-actions performed on the assigned first area 206, thereby allowing the assigned first area 206 to function like a touchpad. The processing unit 204 is also configured to generate an electronic signal to cause a change in a content displayed by the image display device 101 based on the finger-action of the user 50 sensed by the assigned first area of the screen 202 of the apparatus 200. The electronic signal may represent an identification of a detected finger(s)-action, and/or may represent a command generated by the processing unit 204 based on a detected finger(s)-action.

In the illustrated embodiment, the apparatus 200 is a handheld apparatus. By means of non-limiting examples, the handheld apparatus may be a cell phone, a smart phone, a personal-digital-assistant (PDA), or a tablet.

As shown in FIG. 6, the screen 202 of the apparatus 200 has a touch-sensitive region 210, and the assigned first area 206 is less than a total area of the touch-sensitive region 210. Accordingly, the processing unit 204 is configured to ignore input generated by the user 50 using a portion of the touch-sensitive region 210 that is not a part of the assigned first area 206.

Figure 7A:
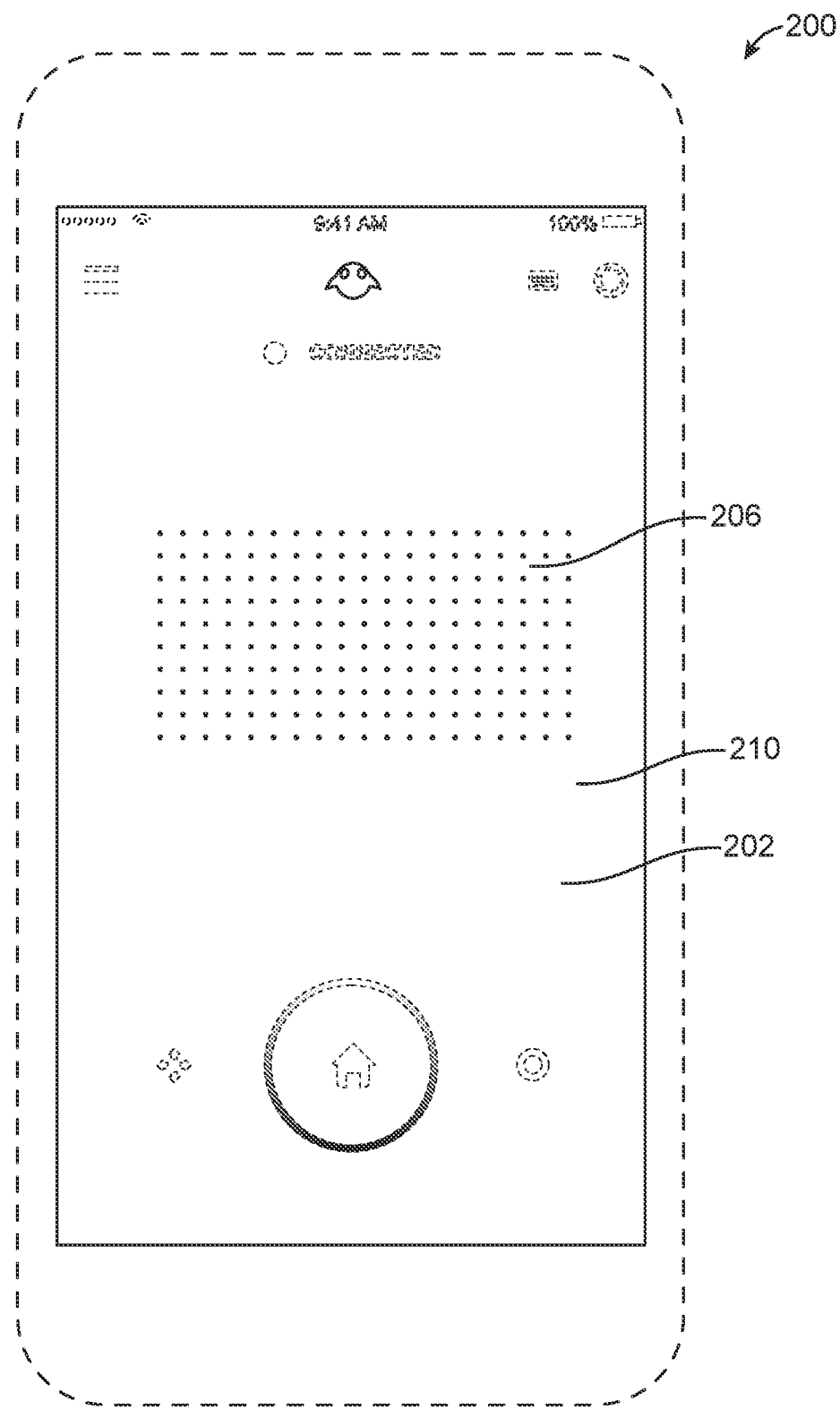
FIGS. 7A-7F illustrate examples of different alternative assigned areas of the screen of the apparatus of FIG. 6.
Figure 7B:
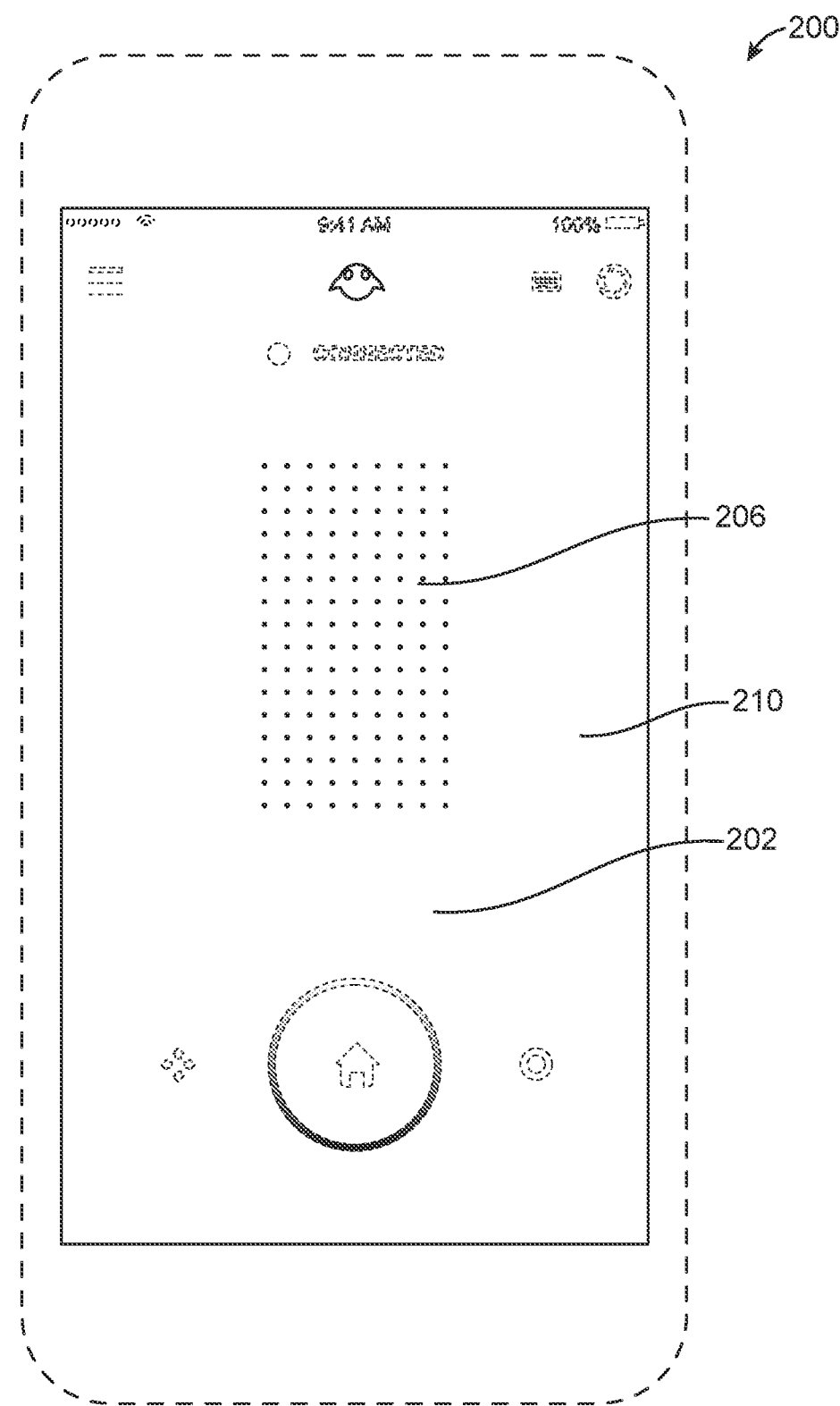
Figure 7C:
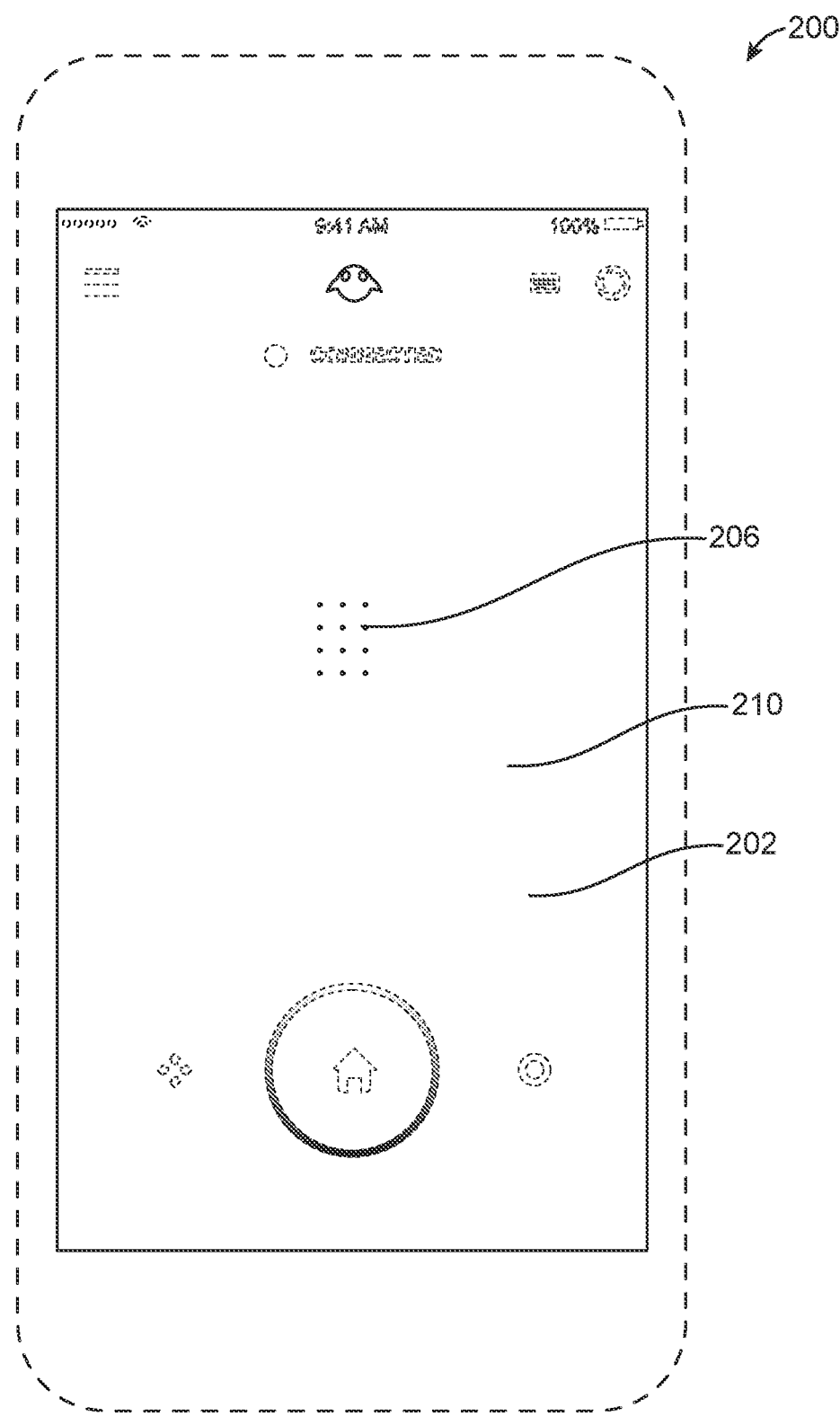
Figure 7D:
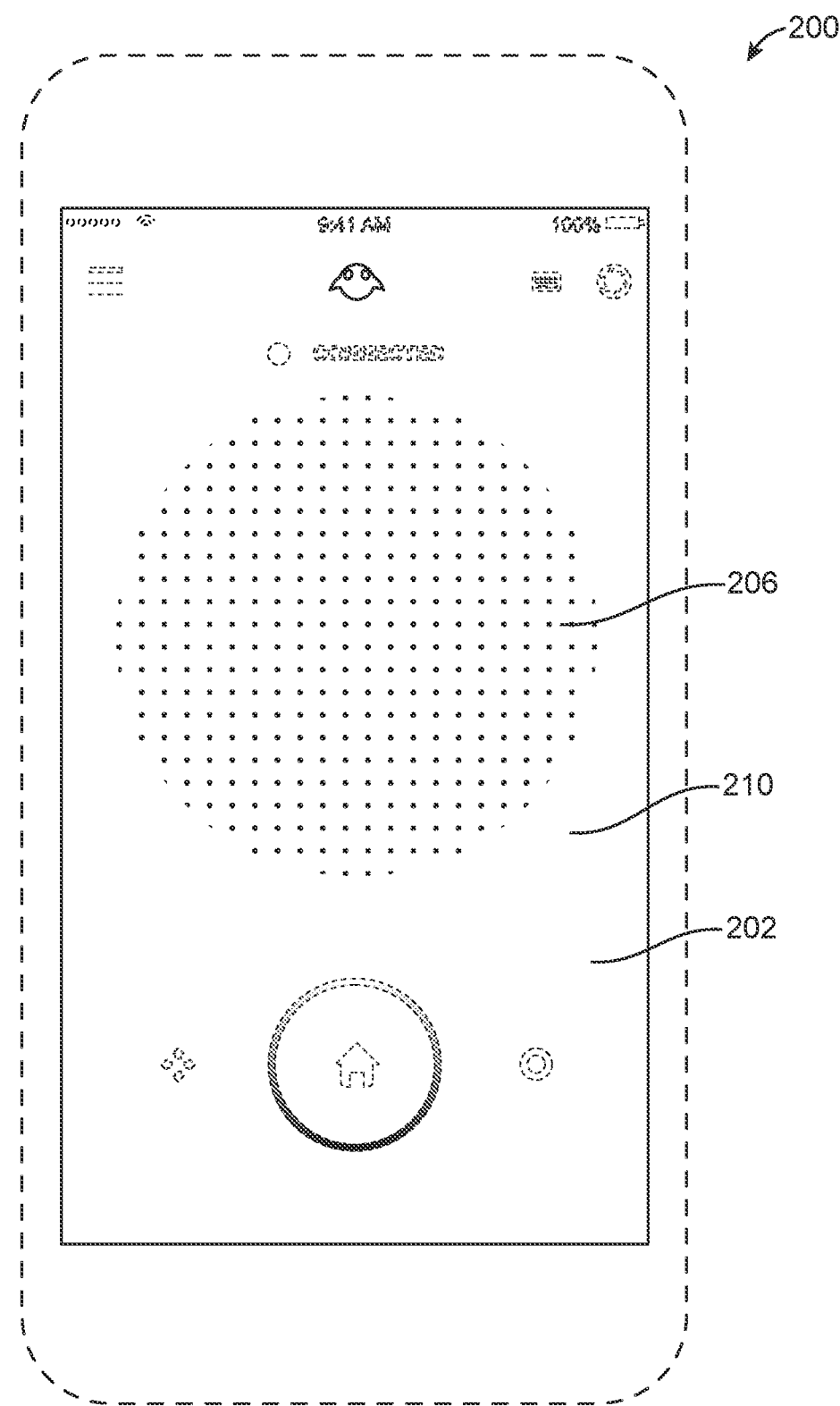
Figure 7E:
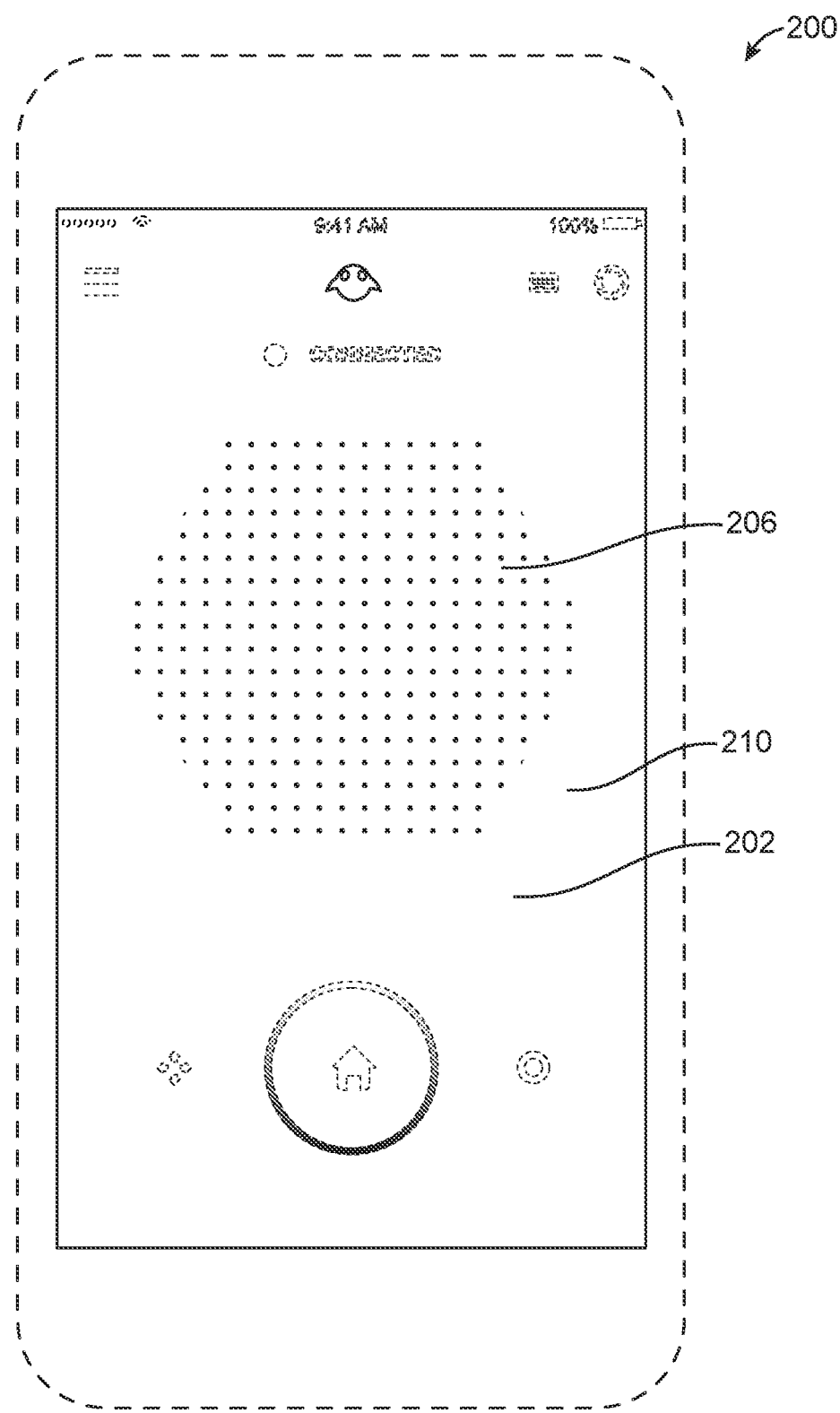

The size and shape of the first area 206 may be pre-defined, or may be selectively configured by the user 50. In other embodiments, the first area 206 may have other shapes instead of the square shape shown in FIG. 6. FIGS. 7A-7F illustrate examples of different first area 206 that may be assigned by the processing unit 204. FIG. 7A illustrates the first area 206 having a rectangular shape with a long side of the first area 206 being parallel to a short side of the apparatus 200, and the short side of the first area 206 being parallel to a long side of the apparatus 200. In other embodiments, like that shown in FIG. 7B, the first area 206 may have a rectangular shape with a long side of the first area 206 being parallel to a long side of the apparatus 200, and the short side of the first area 206 being parallel to a short side of the apparatus 200. In further embodiments, the size of the first area 206 may be smaller (or larger) that the examples illustrated. For example, in other embodiments, the first area 206 may have a small size occupying only a discrete area of the screen (FIG. 7C). In further embodiments, the first area 206 may have a circular shape (FIG. 7D), a hexagon shape (FIG. 7E), or any of other polygonal shapes.

Figure 7F:
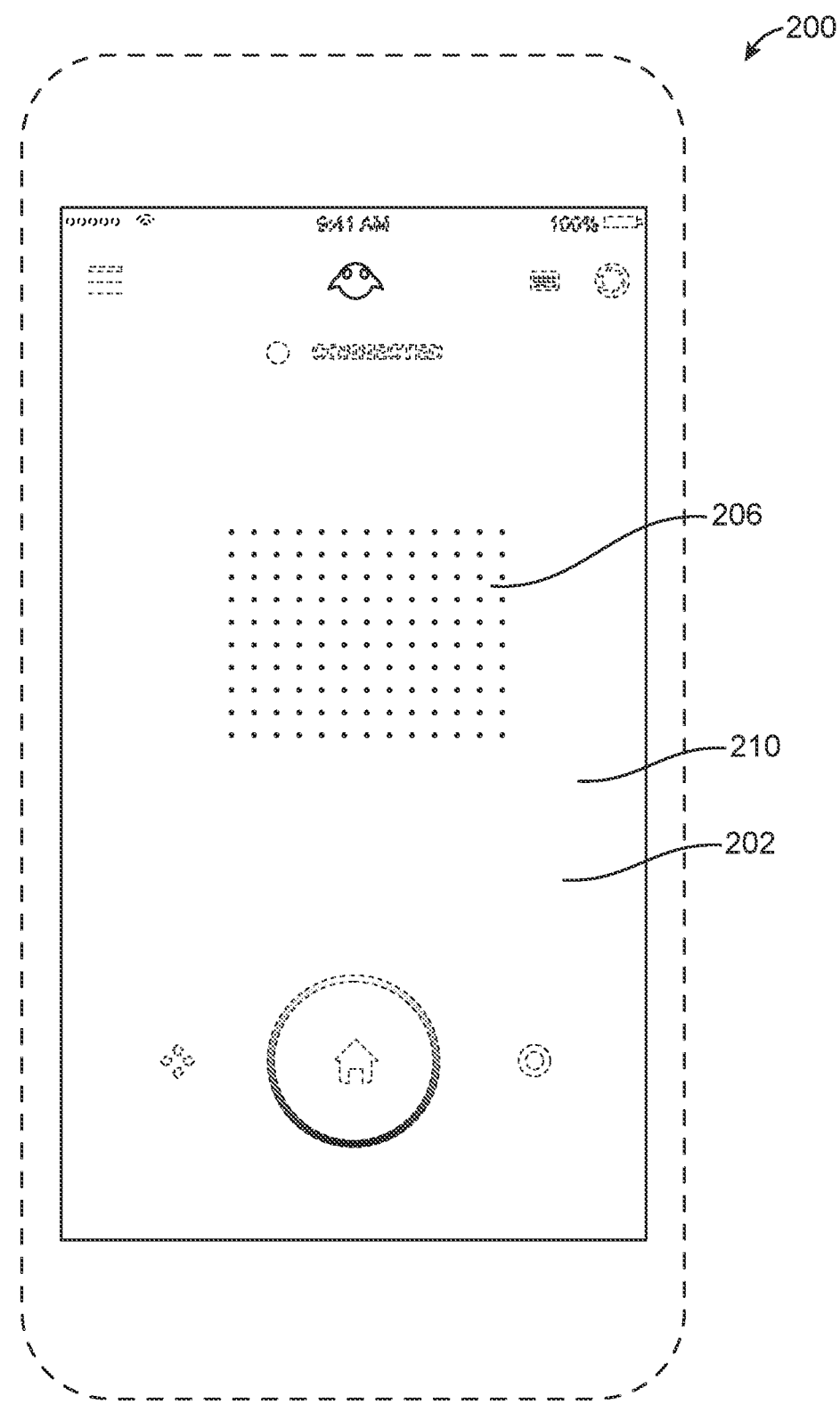

In some embodiments, the first area 206 may have a shape that corresponds with an area of the display screen of the image display device 101. For example, if the screen of the image display device 101 has an aspect ratio of 4:3, then the first area 206 assigned by the processing unit 204 may also have an aspect ratio of 4:3 (FIG. 7F). In one implementation, the processing unit 204 of the apparatus 200 is configured to determine a shape of the display screen area of the image display device 101, and determine the shape of the first area 206 based on the shape of the display screen area of the image display device 101. For example, the processing unit 204 may determine the shape of the first area 206 to be the same as the shape of the display screen area of the image display device 101.

In some embodiments, the processing unit 204 may be configured to determine a size of the touch-sensitive region 210, and determine a size and/or shape for the first area 206 being assigned to sense finger-action of the user 50. For example, the processing unit 204 may determine that the entire touch-sensitive region 210 of the apparatus 200 is 2.5 inches in width and 5.5 inches in length. In such cases, the processing unit 204 may then determine the width of the first area 206 to be a constant k1 (e.g., 0.9) times the width of the touch-sensitive region 210 (which would be 0.9×2.5=2.25 inches in the above example). Similarly, the processing unit 204 may determine the length of the first area 206 to be a constant k2 (e.g., 0.5) times the length of the touch-sensitive region 210 (which would be 0.5×5.5=2.75 inches in the above example).

In other embodiments, the processing unit 204 may determine a brand and a model of the apparatus 200, and determine the size and/or shape of the first area 206 to be assigned to sense finger-action of the user 50. For example, a brand and a model of the apparatus 200 having a relatively larger screen size may be assigned a relatively larger first area 206 compared to another brand and another model of the apparatus 200 having a relatively smaller screen size.

After the first area 206 has been assigned to sense finger-action of the user 50, the user 50 may then use one or more fingers to enter input for the image display system 100 using the assigned first area 206 of the apparatus 200. For example, the user 50 may move a finger within the assigned first area 206 to move an object being displayed by the image display device 101. The object may be any object, such as a cursor, a text, an image, a photo, a window, a frame, an application page, etc. As another example, the user 50 may move two fingers in a same swiping direction within the assigned first area 206 to move an object being displayed by the image display device 101. As a further example, the user 50 may perform a pinching or un-pinching action within the assigned first area 206 to change a size (e.g., reducing a size by pinching, increasing a size by un-pinching) of an object. As a further example, the user 50 may perform a tapping action (e.g., single tapping, double tapping, etc.) within the assigned first area 206 to select an object, un-select an object, grab an object, un-grab an object, etc. Thus, the apparatus 200 is configured as an input device/controller for allowing the user 50 to provide input for interacting with content being displayed by the image display device 101.

In a first mode of operation, the apparatus 200 may provide no visual display on the screen 202 while the user 50 is using the apparatus 200 to generate input for the image display system 100. The assigned first area 206 of the screen has no displayed object while the assigned first area 206 of the screen 202 is sensing the finger-action of the user 50. In such cases, the apparatus 200 is configured like a touchpad. However, unlike a touchpad, the apparatus 200 itself may be a mobile or handheld device. In some implementations, the presentation of content on the screen 202 by the apparatus 200 may be at least partially degraded or disabled when in the first mode of operation. More specifically, when in the first mode of operation, the apparatus 200 may, in such implementations, provide less content for visual display on the screen 202, provide content of reduced brightness and/or contrast for visual display on the screen 202, reduce the brightness level of the screen 202, or take one or more other actions to reduce display functionality to conserve power. In some examples, when in the first mode of operation, the apparatus 200 may convey the boundaries of the touchpad and/or other portions of the user interface to which the touchpad belongs through use of one or more feedback components (e.g., haptic feedback components, speakers, etc.). In these examples, when in first mode of operation, the apparatus 200 may use one or more feedback components to convey one or more portions of such a user interface instead of or in addition to using the screen 202 to visually display the user interface. In some embodiments, a representation of such a user interface or a portion thereof may be displayed by the image display device 101 while the apparatus 200 is operating in the first mode. In at least some of these embodiments, the relative locations on the screen 202 to which touch input has been provided may also be visually represented for the user through the image display device 101. In this way, the user may be able to effectively interact with the screen 202 while looking elsewhere. In some of these examples, when in first mode of operation, a representation of such a user interface or a portion thereof may be displayed using the image display device 101 instead of or in addition to using the screen 202 of the apparatus 200 to visually display the user interface or a limited version thereof (e.g., and at least partially degraded or disabled version of the user interface).

Figure 8A:
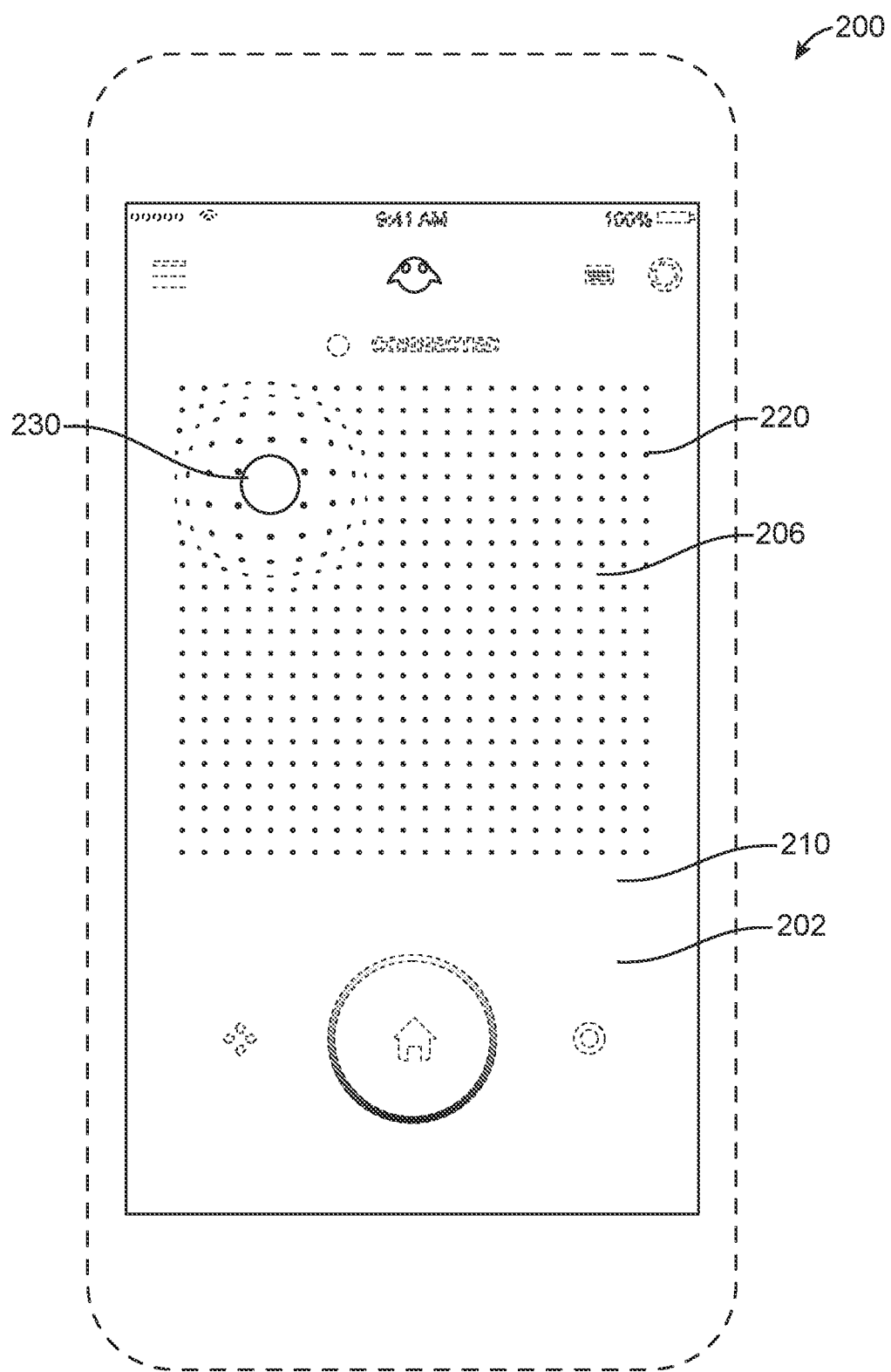
FIG. 8A illustrates an example of visual feedback generated in response to a user touching a part of the assigned area of the screen of the apparatus of FIG. 6 with one finger.
Figure 8B:
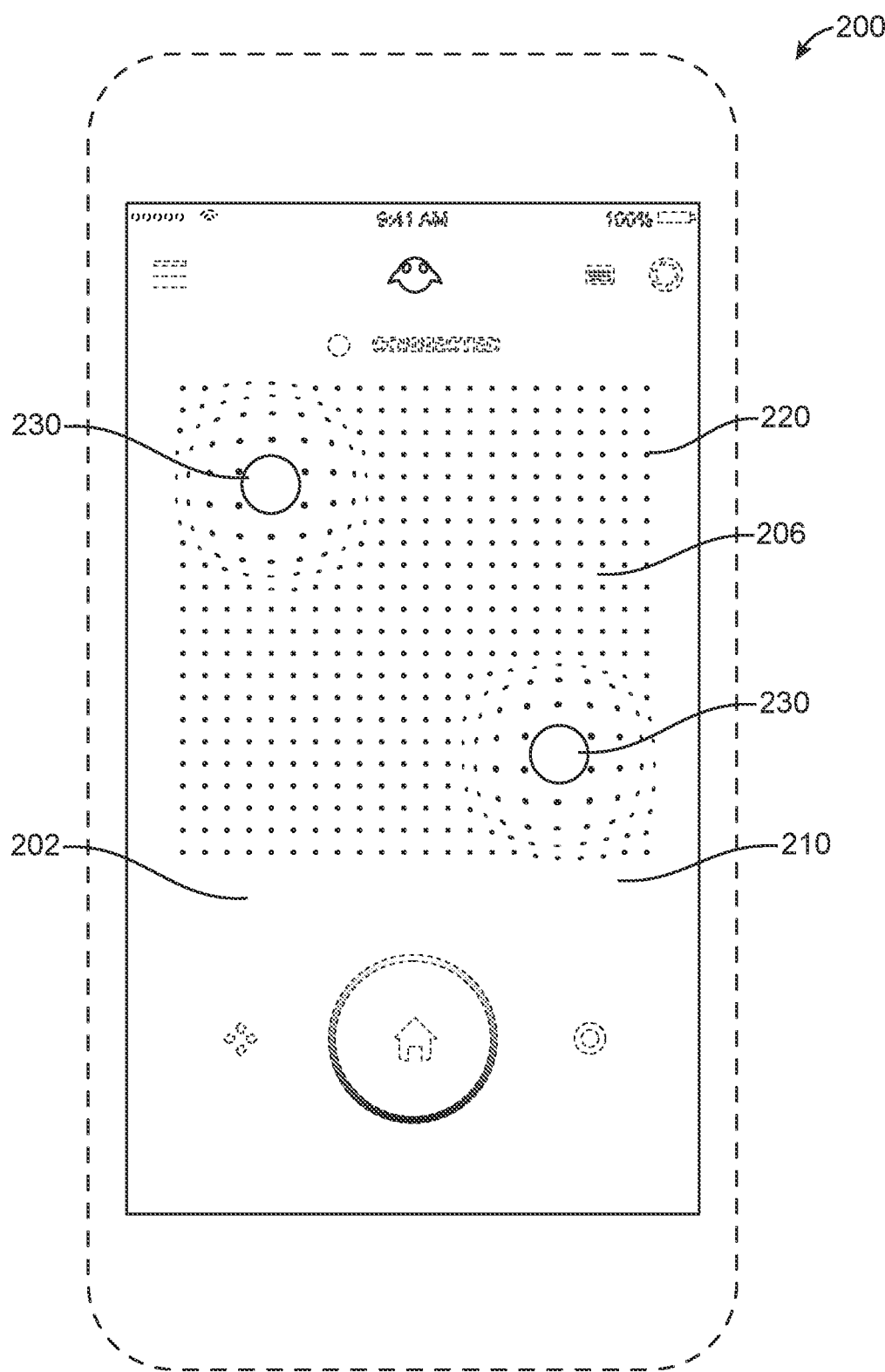
FIG. 8B illustrates an example of visual feedback generated in response to a user touching a part of the assigned area of the screen of the apparatus of FIG. 6 with two fingers.

In a second mode of operation, the processing unit 204 may be configured to operate the screen 202 to display content while allowing the screen 202 to receive finger(s)-action input from the user 50. In some implementations, the quantity, brightness, and/or contrast of the content that is provided by the apparatus 200 for visual display on the screen 202 when in the second mode of operation may be greater than the quantity, brightness, and/or contrast of the content that is provided by the apparatus 200 for visual display on the screen 202 when in the first mode of operation. Similarly, in some examples, the apparatus 200 may operate the screen 202 at a higher brightness level in the second mode of operation than it does in the first mode of operation. For example, the processing unit 204 may operate the screen 202 to display a grid of dots 220 in the assigned first area 206 of the screen 202, like that shown in FIG. 6. The grid of dots 220 allows the user 50 to see where the assigned first area 206 is located, so that the user 50 can more accurately position his/her finger(s). In some cases, the processing unit 204 may also be configured to change a feature of one or more of the dots 220 in response to the user 50 touching a part of the assigned first area 206 of the screen 202 where the one or more of the dots 206 are displayed (FIGS. 8A-8B). In particular, FIG. 8A illustrates an example of visual feedback 230 generated by the processing unit 204 in response to the user 50 touching a part of the assigned area 206 of the screen 202 of the apparatus 200 with one finger. FIG. 8B illustrates an example of visual feedback 230 generated by the processing unit 204 in response to the user 50 touching a part of the assigned area 206 of the screen 202 of the apparatus 200 with two fingers. This allows the user 50 to see that his/her finger action generated input is successfully received by the processing unit 204. In the above examples, the visual feedback 230 includes a circle and a change in a spacing of the dots 220 in proximity to the touched location. In other embodiments, the visual feedback 230 may include just the circle without the change in the spacing of the dots 220. In further embodiments, instead of a circular shape, the visual feedback 230 may include an object (of any shape) generated by the processing unit 204 positioned at the location of the screen 202 where it is touched by the user 50. In still further embodiments, the visual feedback 230 may not include any object overlay with the dots 220. In such cases, the visual feedback 230 may be a change in the color of the dot(s), and/or a change in the shape and/or size of the dot(s), where the user 50 touches the screen 202.

In some embodiments, the horizontal spacing of the dots 220 may be the same as the vertical spacing of the dots 220. In other embodiments, the horizontal spacing of the dots 220 may be different from the vertical spacing of the dots 220. For examples, the horizontal spacing of the dots 202 may be larger than, or less than, the vertical spacing of the dots 220.

It should be noted that in the second mode, the screen of the apparatus 200 is not limited to displaying the dots 220, and may display other content in other embodiments. For example, in other embodiments, when in the second mode, the screen of the apparatus 200 may display a number of objects (e.g., photos, videos, icons, etc.) for the user 50 to select using the apparatus 200, a text box for the user 50 to enter text, a drawing "pad" for allowing the user 50 to draw things, tabs for the user 50 to select, application graphics for allowing the user 50 to interact with, etc. In some implementations, a polygonal shape may be displayed in the assigned first area 206 of the screen 202. For instance, in these implementations, the apparatus may display a solid polygonal shape, an outline of a polygonal shape, or both, in the assigned first area 206 of the screen 202. In some examples, the geometry of such a polygonal shape may correspond to the geometry of the assigned first area 206, such that one or more boundaries of the polygonal shape may coincide with one or more boundaries of the assigned first area 206, respectively.

In some embodiments, the apparatus 200 may switch between the first and second modes. For example, the apparatus 200 may switch between the first and second modes based on commands received from the image display device 101. In some implementations, the image display device 101 may analyze data output from one or more of its sensing devices to determine whether the apparatus 200 is within the user's field of view. In some examples, such one or more sensing devices of the image display device 101 may correspond to one or more forward-facing cameras. For instance, the image display device 101 may analyze images captured by its camera(s) to determine whether the apparatus 200 is shown in any of the images (and thus located within the user's field of view). If the apparatus 200 is not detected by any of the camera(s), in response, the image display device 101 may then instruct the apparatus 200 to operate in the first mode. On the other hand, if the apparatus 200 is detected by a camera of the image display device 101, in response, the image display device 101 may then instruct the apparatus 200 to operate in the second mode. This feature is advantageous because it may provide power-saving benefits at times when the user 50 is not looking at the screen of the apparatus 200. So if the user 50 is not looking at the apparatus 200 through the screen of the image display device 101, the screen of the apparatus 200 may operate in the first mode (displaying no content or a degraded set of content), and if the user 50 is looking at the apparatus 200 through the screen of the image display device 101, the screen of the apparatus 200 may operate in the second mode (displaying content in its entirety). In some examples, the image display device 101 may leverage one or more of sensing devices other than one or more of its forward-facing cameras to determine whether the apparatus 200 is within the user's field of view. For instance, the image display device 101 may determine whether the apparatus 200 is within the user's field of view based on data output from one or more proximity sensors, inward-facing eye tracking cameras, or other sensing devices of the image display device 101 that are capable of outputting data indicative of whether the user is wearing the image display device 101. It may be particularly beneficial for the image display device 101 to instruct the apparatus 200 to switch between the first and second modes of operation based on data output from one or more such sensing devices in implementations where the image display device 101 is a virtual reality (VR) headset or other wearable computing device that physically occludes some portion of the user's view of the environment when worn by the user.

Also, in some embodiments, each unit length Lh of a horizontal movement input performed at the first area 206 may cause a corresponding amount of horizontal movement Mh of an object displayed by the image display device 101. Similarly, each unit length Lv of a vertical movement input performed at the first area 206 may cause a corresponding amount of vertical movement Mv of the object displayed by the image display device 101. A horizontal movement efficiency may be represented by the ratio Mh/Lh, and a vertical movement efficiency may be represented by the ratio Mv/Lv. If the ratio Mh/Lh is 1.0, that means one until of horizontal movement input at the assigned first area 206 will cause the same unit of horizontal movement to occur for an object displayed by the image display device 101. If the ratio Mh/Lh is larger than 1.0, that means one unit of horizontal movement input at the assigned first area 206 will cause more than one unit of horizontal movement to occur for an object displayed by the image display device 101. If the ratio Mh/Lh is less than 1.0, that means one unit of horizontal movement input at the assigned first area 206 will cause less than one unit of horizontal movement to occur for an object displayed by the image display device 101. Similar concepts apply for the vertical direction. In some embodiments, the screen of the apparatus 200 may be smaller in size compared to the screen of the image display device 101. In such cases, it may be desirable to configure the assigned first area 206 so that Mh/Lh>1, and so that Mv/Lv>1. This allows the user 50 to operate a relatively smaller first area 206 on the apparatus 200 to cover a larger screen area in the image display device 101. In other embodiments, the screen of the apparatus 200 may be larger in size compared to the screen of the image display device 101. In such cases, it may be desirable to configure the assigned first area 206 so that Mh/Lh<1, and so that Mv/Lv<1. This allows the user 50 to operate a relatively larger first area 206 on the apparatus 200 to cover a smaller screen area in the image display device 101. In other embodiments, regardless of the relative screen sizes of the apparatus 200 and the image display device 101, the movement efficiencies (Mh/Lh and Mv/Lv) of the assigned first area 206 may be arbitrary set to any values.

In some embodiments, the ratio Mh/Lh may be equal to the ratio Mv/Lv. This means that a horizontal movement efficiency is the same as a vertical movement efficiency for input entered using the assigned first area 206. In other embodiments, the ratio Mh/Lh may be higher than the ratio Mv/Lv. This means that a horizontal movement efficiency is higher than a vertical movement efficiency for input entered using the assigned first area 206. This allows the user 50 to cover more horizontal space in the displayed screen of the image display device 101 by moving through less horizontal space in the assigned first area 206 (compared to that for the vertical space). In further embodiments, the ratio Mh/Lh may be less than the ratio Mv/Lv. This means that a horizontal movement efficiency is lower than a vertical movement efficiency for input entered using the assigned first area 206. This allows the user 50 to cover more vertical space in the displayed screen of the image display device 101 by moving through less vertical space in the assigned first area 206 (compared to that for the horizontal space).

In some embodiments, Mh/Lh may be based on a width of the screen of the image display device 101, and Mv/Lv may be based on a height of the screen of the image display device 101. Thus, Mh/Lh and Mv/Lv may be based on an aspect ratio or shape of the screen of the image display device 101. For example, if the screen of the image display device 101 has an aspect ratio (width to height ratio) of 4:3, then Mh/Lh may be 1.33 times Mv/Lv. When these movement efficiencies are applied for an assigned first area 206 having a square shape, for example, a unit of horizontal movement input by the user will cause an object displayed in the image display device 101 to move 1.33 times more compared to that for a unit of vertical movement. Accordingly, even though the assigned first area 206 (with a square shape in the example) may not correspond with the shape (having an aspect ratio of 4:3 in the example) of the screen of the image display device 101, the movement efficiencies of the assigned first area 206 may be selected or determined so that the user 50 can cover all of the space horizontally and vertically using the assigned first area 206.

In further embodiments, the horizontal movement efficiency and/or the vertical movement efficiency for the assigned first area 206 may be variable. In particular, the horizontal movement efficiency and/or the vertical movement efficiency for the assigned first area 206 may be a function of an input location within the assigned first area 206, and/or a function of a cursor/pointer position in the screen of the image display device 101. For example, the horizontal movement efficiency may have a first value when an input generated at the first area 206 corresponds to a center of a field of view or a center of the first area 206, and may have a second value (higher than the first value) when the input generated at the first area 206 corresponds with a location that is at a periphery of the field of view or at a periphery of the first area 206. This feature may be desirable as it allows the user 50 to scroll or move through more content as his/her finger(s) approaches a left/right edge of the first area 206 or the field of view. The scroll speed may appear to be faster because the cursor is "moving more" through the content. In other embodiments, the second value may be lower than the first value.

In one or more embodiments described herein, the horizontal movement efficiency and/or the vertical movement efficiency for the first area 206 may be predetermined, may be determined by the processing unit 204, and/or may be configurable by the user 50 of the apparatus 200.

Returning to FIG. 6, in some embodiments, the processing unit 204 may also optionally be configured to assign a second area 240 of the screen 202 as a first button 242. In the illustrated example, the first button 242 is a "HOME" button. In other embodiments, the first button 242 may be other types of buttons for performing other types of functions.

Also, the processing unit 204 may optionally be configured to assign a third area 250 of the screen as a second button 252. In the illustrated example, the second button 252 is a "TOGGLE" button. The TOGGLE button may allow the user to perform a select function, and/or to change a function of a cursor or pointer. In other embodiments, the second button 252 may be other types of buttons for performing other types of functions.

In addition, the processing unit 204 may optionally be configured to assign a fourth area 260 of the screen as a third button 262. In the illustrated example, the third button 262 is a "BUMPER" button. The BUMPER button is a multi-function button depending on the software/operating system of the apparatus 200. In some cases, the BUMPER button may allow the user 50 to control a volume, turn a page, change a magnification, etc. In other embodiments, the third button 262 may be other types of buttons for performing other types of functions.

In other embodiments, the processing unit 204 may assign more than three areas of the screen as respective input areas (e.g., pad area(s) for receiving finger movement input, buttons, controls, etc.).

Furthermore, in some embodiments, any control of the apparatus 200 may be operable to generate input for the image display device 101. For example, in some embodiments, a volume control of the apparatus 200 may be utilized to control speaker(s) of the image display device 101. In one implementation, the processing unit 204 is configured to detect an actuation of the volume control at the apparatus 200. In response to the detected actuation, the processing unit 204 then provides a corresponding control signal (e.g., volume up signal, volume down signal, mute, etc.) for transmission to the image display device 101. The transmission of the control signal may be achieved wirelessly or through a cable. The image display device 101 then operates its speaker(s) in accordance with the control signal provided by the apparatus 200.

Also, as shown in FIG. 6, in some embodiments, the processing unit 204 may provide an "Image Capture" button 274 for allowing the user 50 to capture an image presented by the screen of the image display device 101. The image may include content displayed by the screen of the image display device 101, and/or content in the surrounding environment as viewed through the screen of the image display device 101. In one implementation, the processing unit 204 is configured to detect a pressing of the "Image Capture" button 274, and in response, generates a control signal (for transmission to the image display device 101) to cause the image display device 101 to perform a screen-shot function to capture a screen-shot of content displayed by the image display device 101. Alternatively, or additionally, the processing unit 204 may generate a control signal to cause the image display device 101 to operate its camera to take a picture of the surrounding as viewed by the camera. The image of the displayed content and the image of the surrounding may be combined by the processing unit 204 and/or the processing unit 130 to form a composite image. In some cases, the "Image Capture" button 274 may also be pressed to capture an image of content displayed by the apparatus 200. The image displayed by the apparatus 200 may be artificially generated graphics and/or camera image captured by the camera of the apparatus 200. For example, the processing unit 204 may detect a pressing of the "Image Capture" button 274, and in response, performs a screen-shot function to capture a screen-shot of content displayed by the apparatus 200. Also, in other embodiments, the "Image Capture" button 274 may be used to capture a video. For example, the "Image Capture" button 274 may be pressed and hold for a certain duration. The processing unit 204 detects that there is a long hold for the "Image Capture" button 274, and operates the camera of the apparatus 200 to start recording a video. The user 50 may long hold the "Image Capture" button 274 again to stop the recording of the video. Thus, as soon as the processing unit 204 detects that there is a second long hold for the "Image Capture" button 274, the processing unit 204 then operates the camera to stop the recording of the video. It should be noted that other techniques for generating a video using the apparatus 200 may be employed in other embodiments, and that the "Image Capture" button 274 is just an example of the control that may be used to generate a video.

In one or more embodiments, an image or a video captured by the apparatus 200 may be sent by the apparatus 200 to a network (e.g., a Cloud network) for storage. In such cases, the image display device 101 may retrieve the stored image or video from the network (e.g., the Cloud network) for display on its screen. Alternatively, an image or a video captured by the apparatus 200 may be sent by a short distance network (e.g., Bluetooth network, Wi-Fi, etc.) to the image display device 101. Also, in some embodiments, the apparatus 200 may be configured to obtain media content (e.g., photos, pictures, videos, etc.) from the network. For example, another user may upload a media content to a Cloud network, and the user 50 may obtain such media content by accessing the Cloud network via an account that is associated with the apparatus 200 and/or the image display device 101.

In some embodiments, when the user 50 is using the assigned first area 206 (the simulated touchpad region) of the screen 202, the buttons 242, 252, 262 are disabled. This may have the benefit of preventing the user 50 from inadvertently touching and activating any of these buttons. In other embodiments, when the user 50 is using the assigned first area 206 of the screen 202, one or more of the buttons 242, 252, 262 are not disabled, thereby allowing the user 50 to perform simultaneous finger(s)-actions using both the first assigned area 206 (the simulated touchpad region) and any of the buttons 242, 252, 262.

Figure 9A:
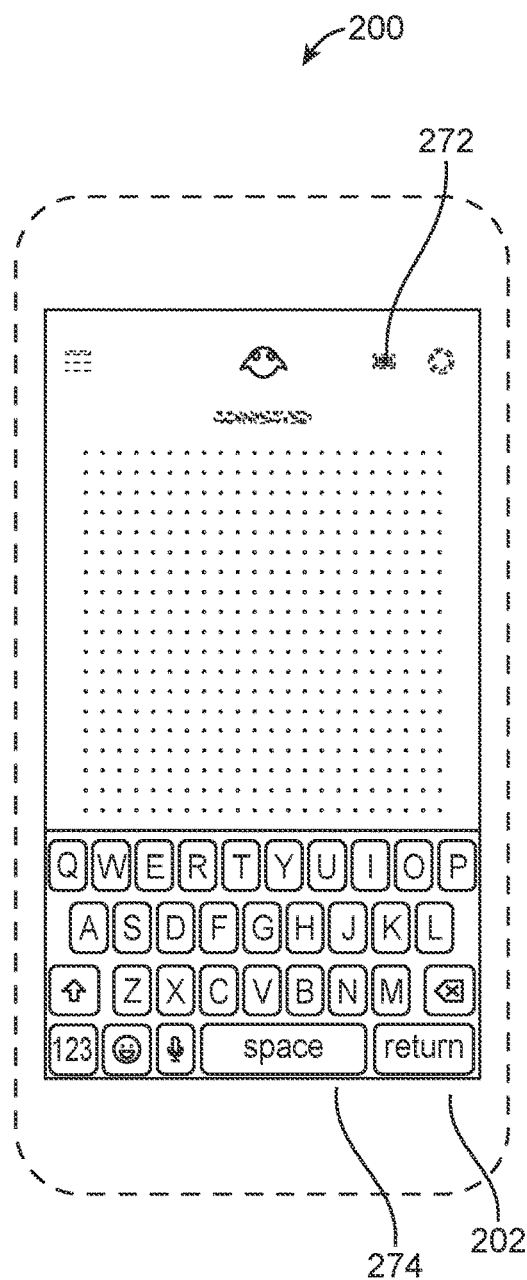
FIG. 9A illustrates an example of a keyboard that may be displayed by the apparatus of FIG. 6.
Figure 9B:
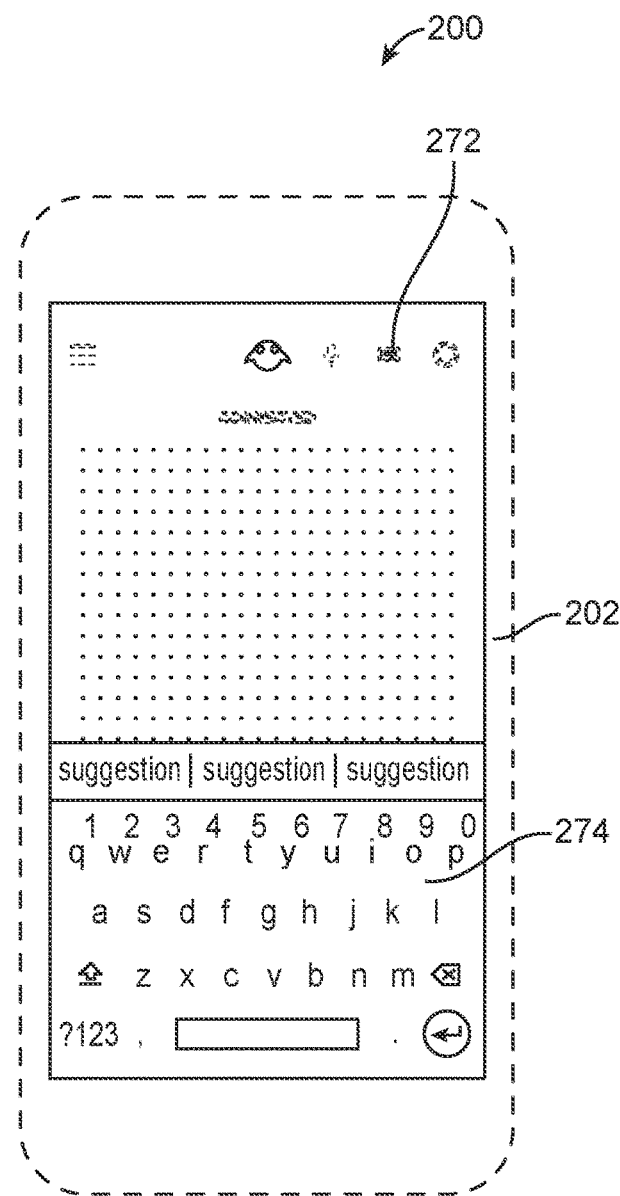
FIG. 9B illustrates another example of a keyboard that may be displayed by the apparatus of FIG. 6.

As shown in FIG. 6, the processing unit 204 may also optionally be configured to assign another area 270 of the screen 202 as a keyboard activation button 272, and wherein the processing unit 204 is configured to operate the screen 202 to display a keyboard 274 (FIG. 9A) in response to the user 50 touching the assigned second area 270 of the screen 202 where the keyboard activation button 272 is located. FIG. 9B illustrates another example of a keyboard 274 that may be displayed by the screen 202. The displayed keyboard 274 allows the user 50 to enter text, numbers, symbols, expressions, messages, etc.

Returning to FIG. 6, the processing unit 204 is configured to perform gesture recognition to identify a finger-action(s) performed on any or a combination of the assigned areas 206, 240, 250, 260. In one implementation, the apparatus 200 includes a buffer, and as the user 50 enters input using finger-action(s) performed on the assigned area(s), the apparatus 200 generates the touch input data corresponding to the touched positions on the screen 202. The processing unit 204 is configured to add the touch input data to the buffer, and performs gesture recognition using the input data stored in the buffer. In some embodiments, the input data may include positional data representing respective touched locations in the assigned first area 206. The input data may also include respective timing data representing respective times at which the respective locations were touched by the user 50. If the user 50 touches any of the buttons 242, 252, 262, the corresponding input data generated may include the identification of the button touched, and timing of the touch action, and also a duration for which the button was touched.

In the illustrated embodiments, the processing unit 204 is configured to perform gesture recognition using the input data to identify a corresponding command for the performed gesture. For example, if the processing unit 204 determines from the input data that the user 50 is making a swiping action, the processing unit 204 may then identify "movement" as the command that corresponds with the user's finger-action. As another example, if the processing unit 204 determines from the input data that the user 50 is making a pinching action, the processing unit 204 may then identify "size reduction" as the command that corresponds with the finger-action.

Figure 10A:
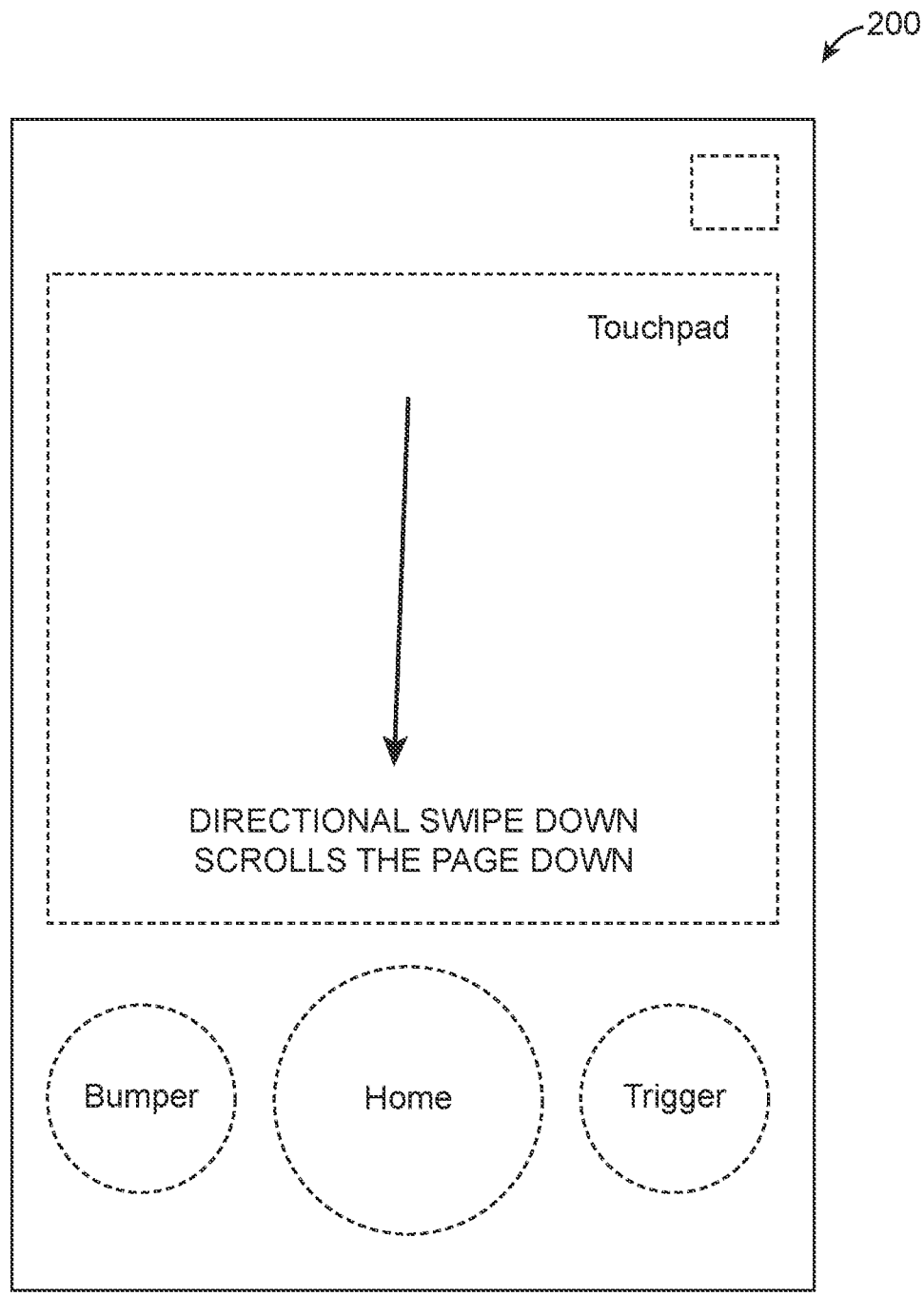
FIG. 10A illustrates an example of a one finger swipe performed on an assigned area of a screen of the apparatus of FIG. 6, and detectable by the apparatus as a finger-action input for an image display device.
Figure 10B:
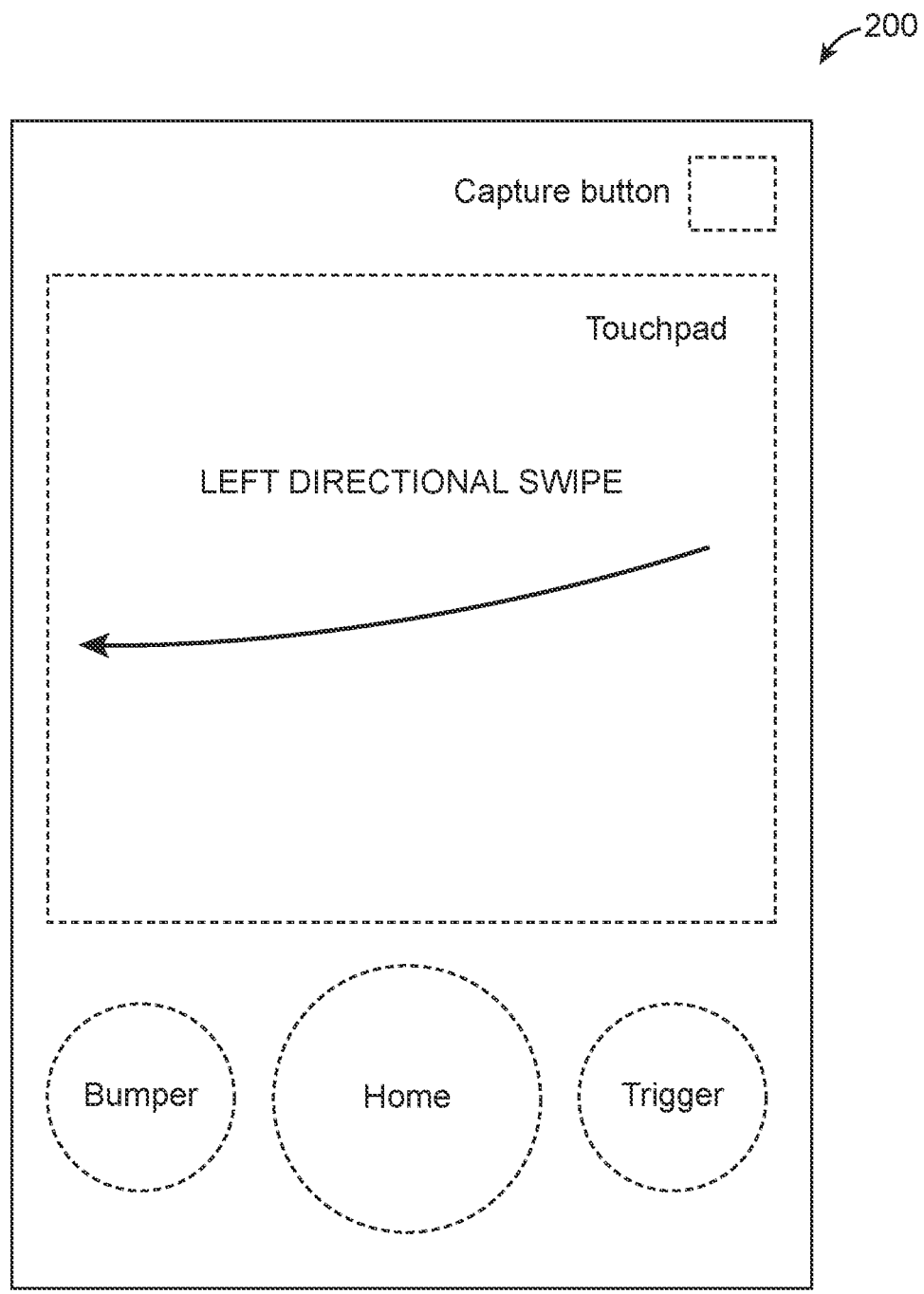
FIG. 10B illustrates another example of a one finger swipe performed on an assigned area of a screen of the apparatus of FIG. 6, and detectable by the apparatus as a finger-action input for an image display device.
Figure 11A:
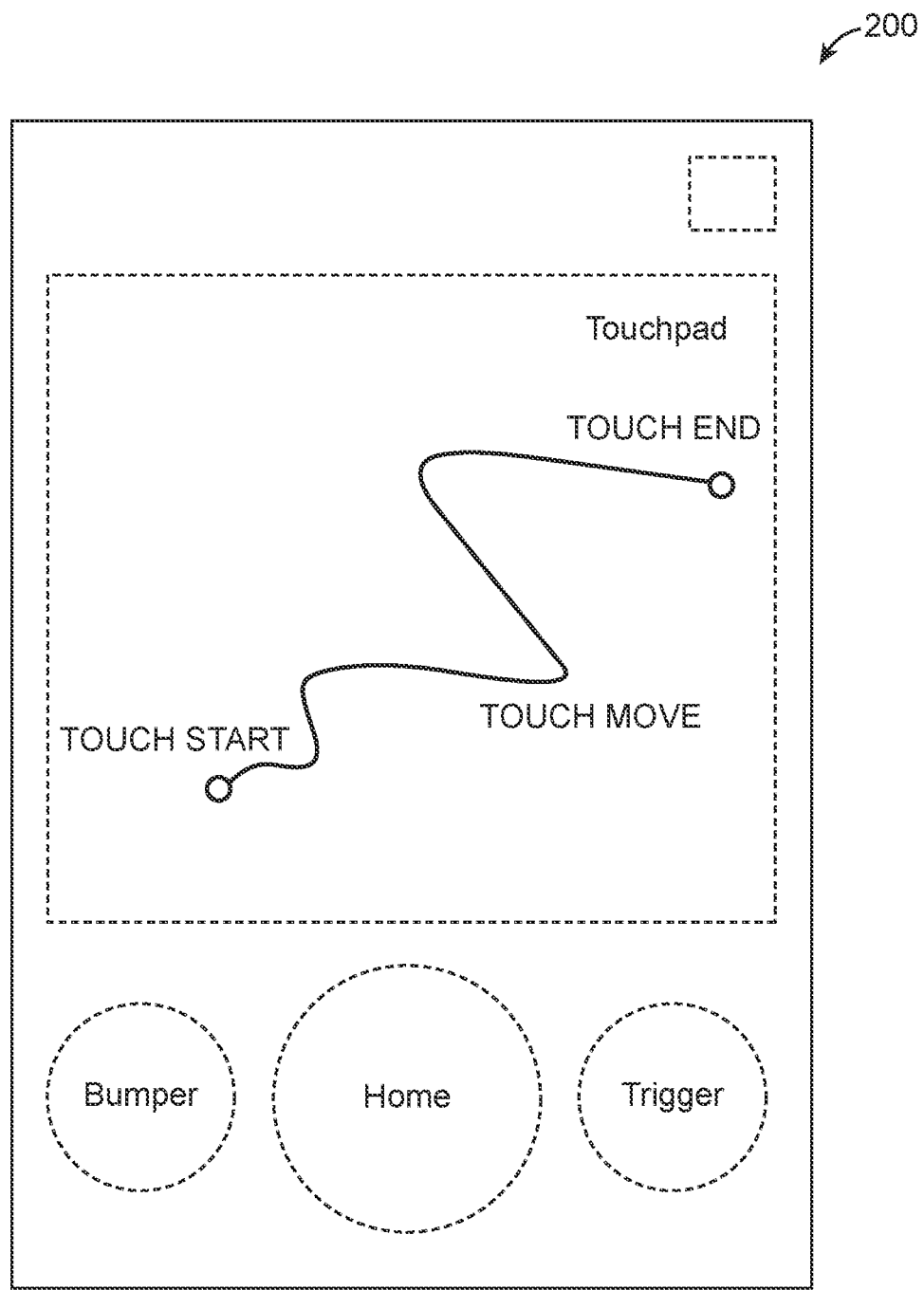
FIG. 11A illustrates an example of a one finger touch move performed on an assigned area of a screen of the apparatus of FIG. 6, and detectable by the apparatus as a finger-action input for an image display device.
Figure 11B:
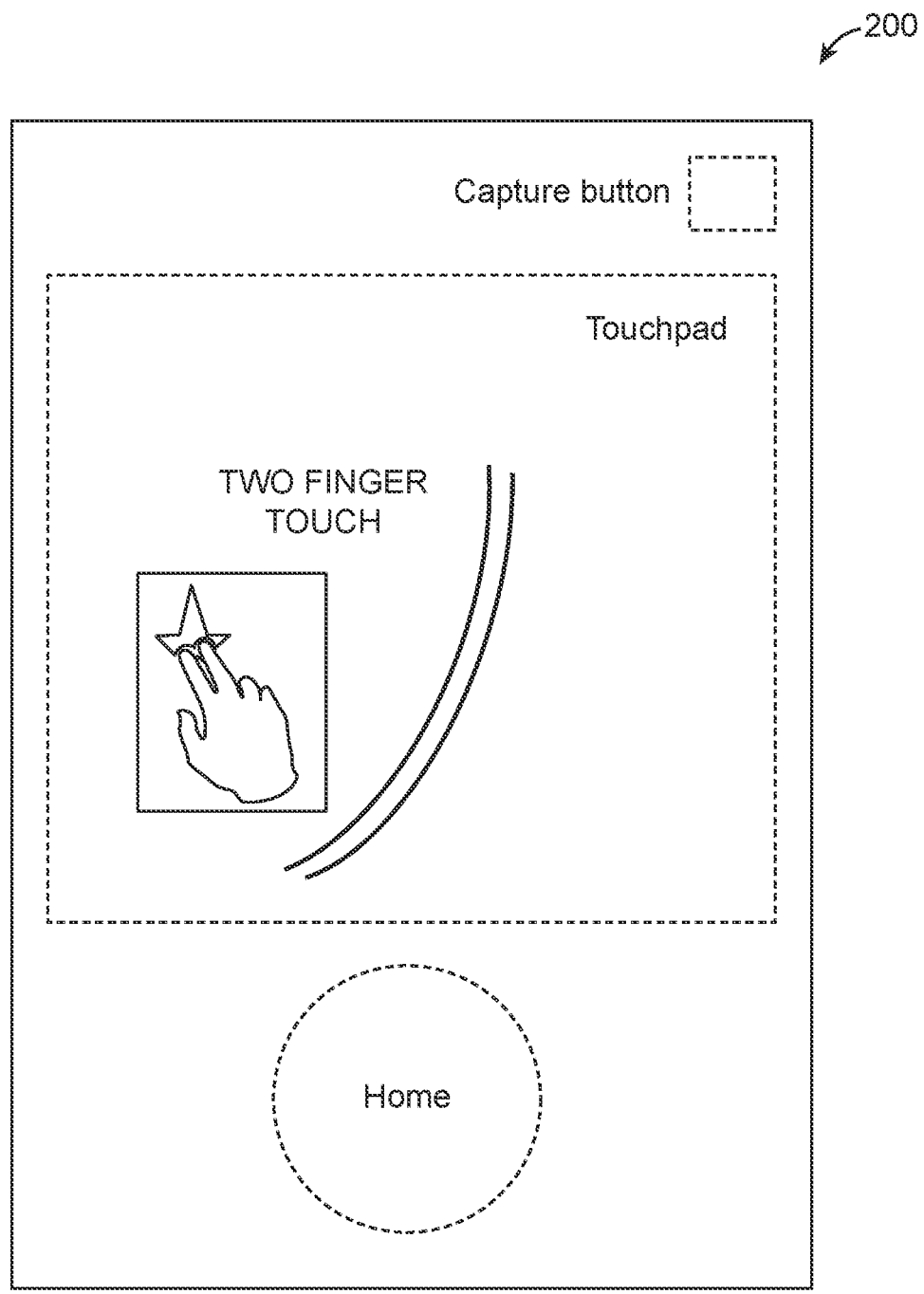
FIG. 11B illustrates an example of a two fingers touch move performed on an assigned area of a screen of the apparatus of FIG. 6, and detectable by the apparatus as a finger-action input for an image display device.
Figure 12A:
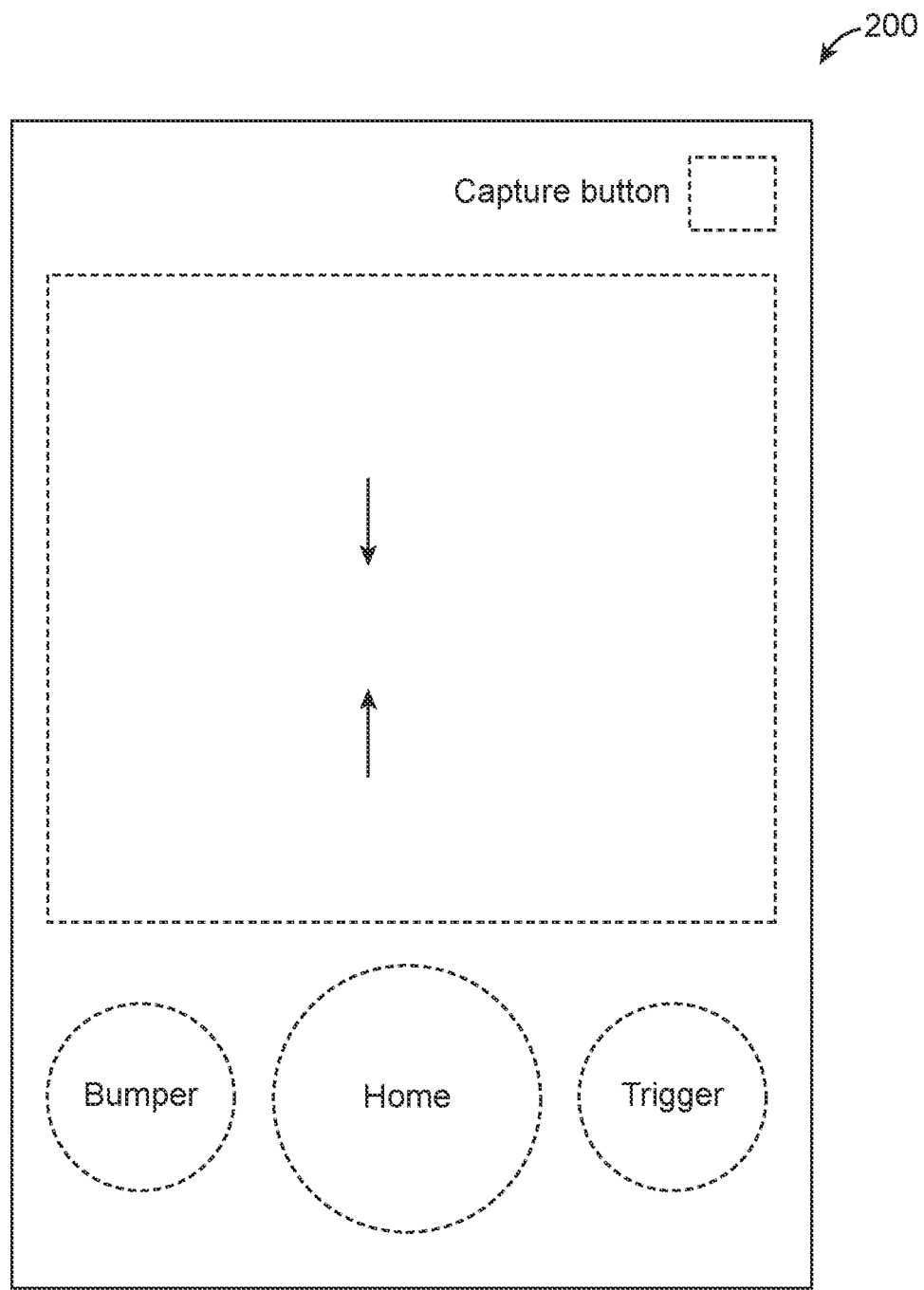
FIG. 12A illustrates an example of a two fingers pinch performed on an assigned area of a screen of the apparatus of FIG. 6, and detectable by the apparatus as a finger-action input for an image display device.
Figure 12B:
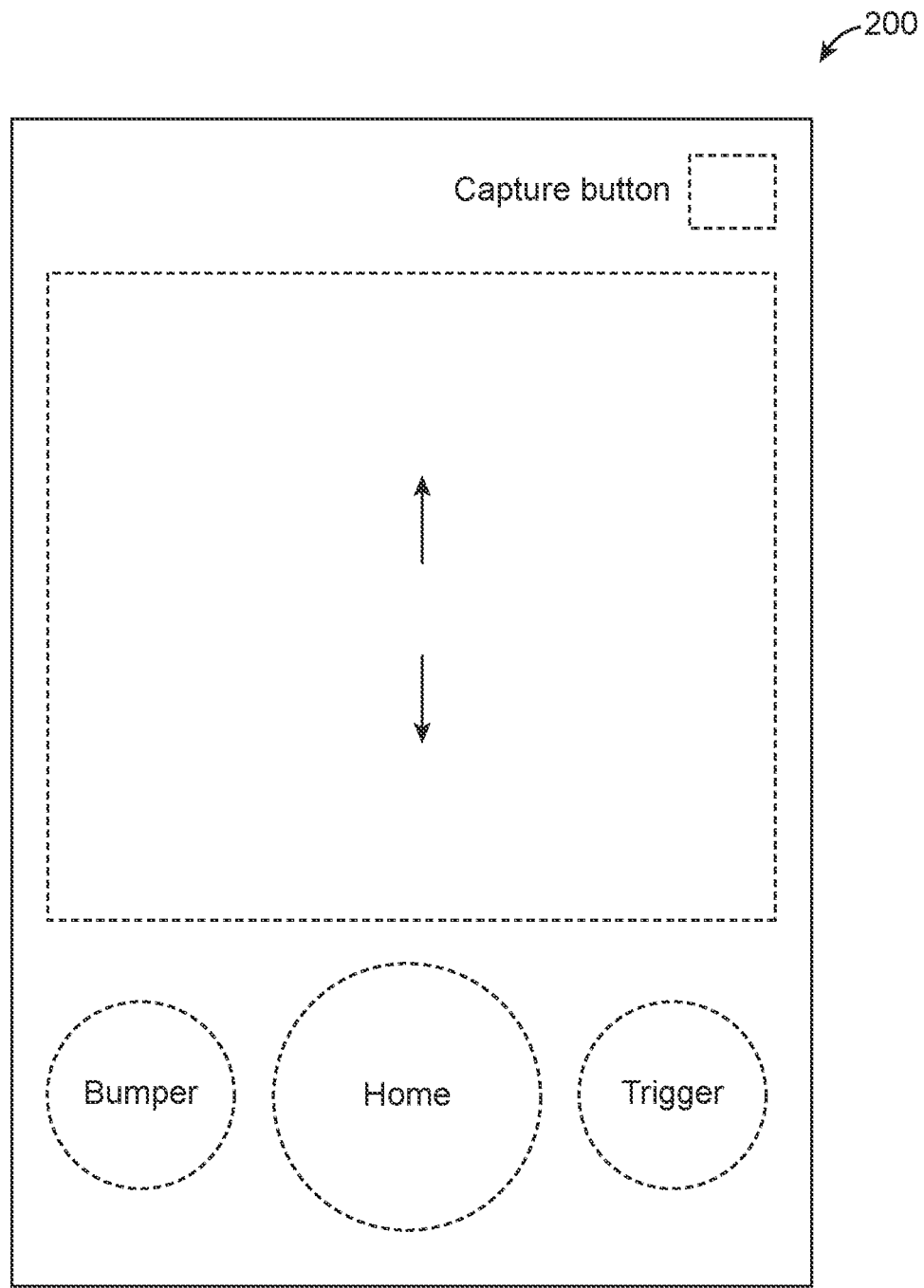
FIG. 12B illustrates an example of a two fingers un-pinch performed on an assigned area of a screen of the apparatus of FIG. 6, and detectable by the apparatus as a finger-action input for an image display device.
Figure 13:
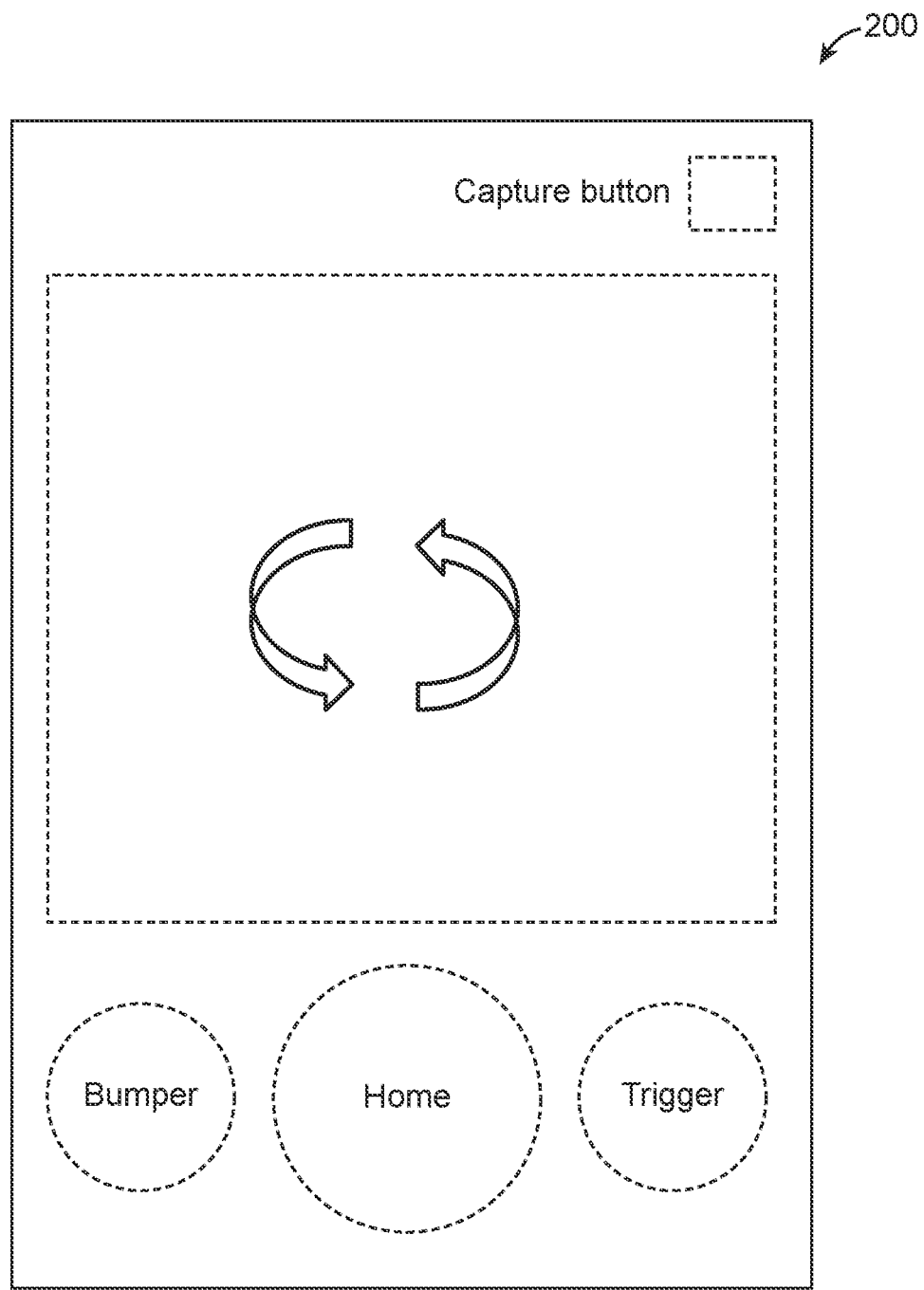
FIG. 13 illustrates an example of a two fingers radial move performed on an assigned area of a screen of the apparatus of FIG. 6, and detectable by the apparatus as a finger-action input for an image display device.
Figure 14:
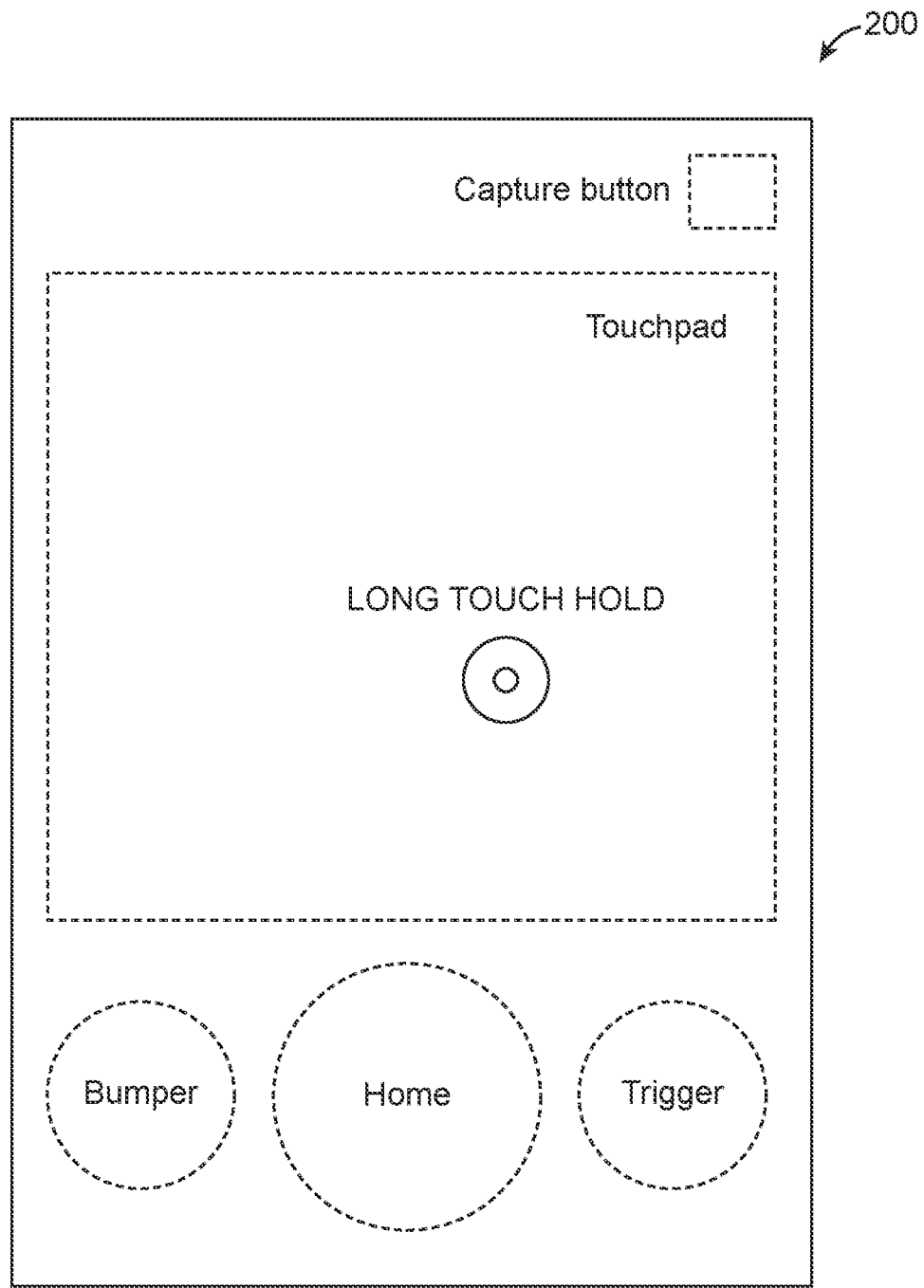
FIG. 14 illustrates an example of a long touch-hold performed on an assigned area of a screen of the apparatus of FIG. 6, and detectable by the apparatus as a finger-action input for an image display device.
Figure 15:
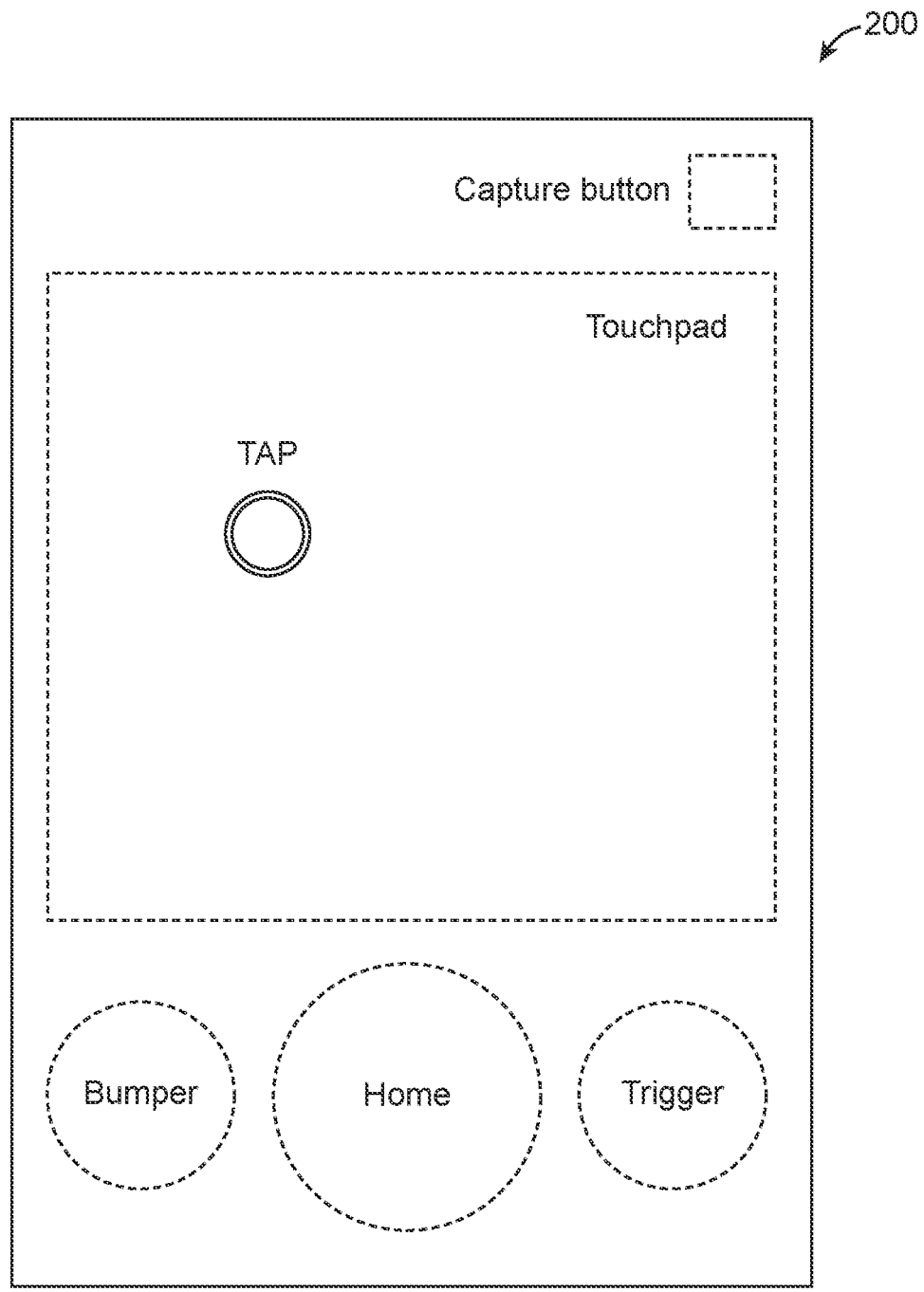
FIG. 15 illustrates an example of a tap performed on an assigned area of a screen of the apparatus of FIG. 6, and detectable by the apparatus as a finger-action input for an image display device.
Figure 16A:
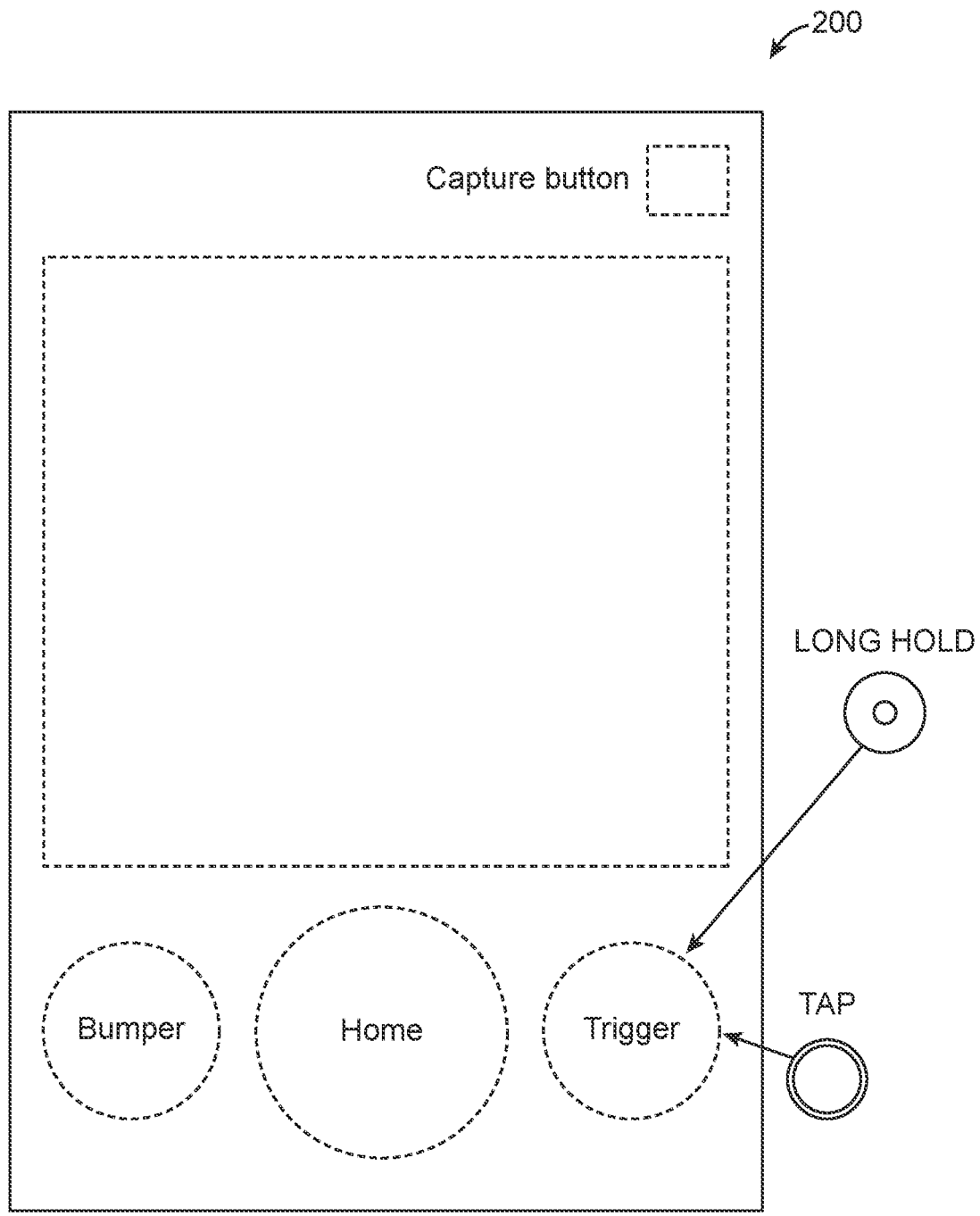
FIG. 16A illustrates examples of finger-actions performed on an area of a screen of the apparatus of FIG. 6 that has been assigned as a button, and detectable by the apparatus as input for an image display device
Figure 16B:
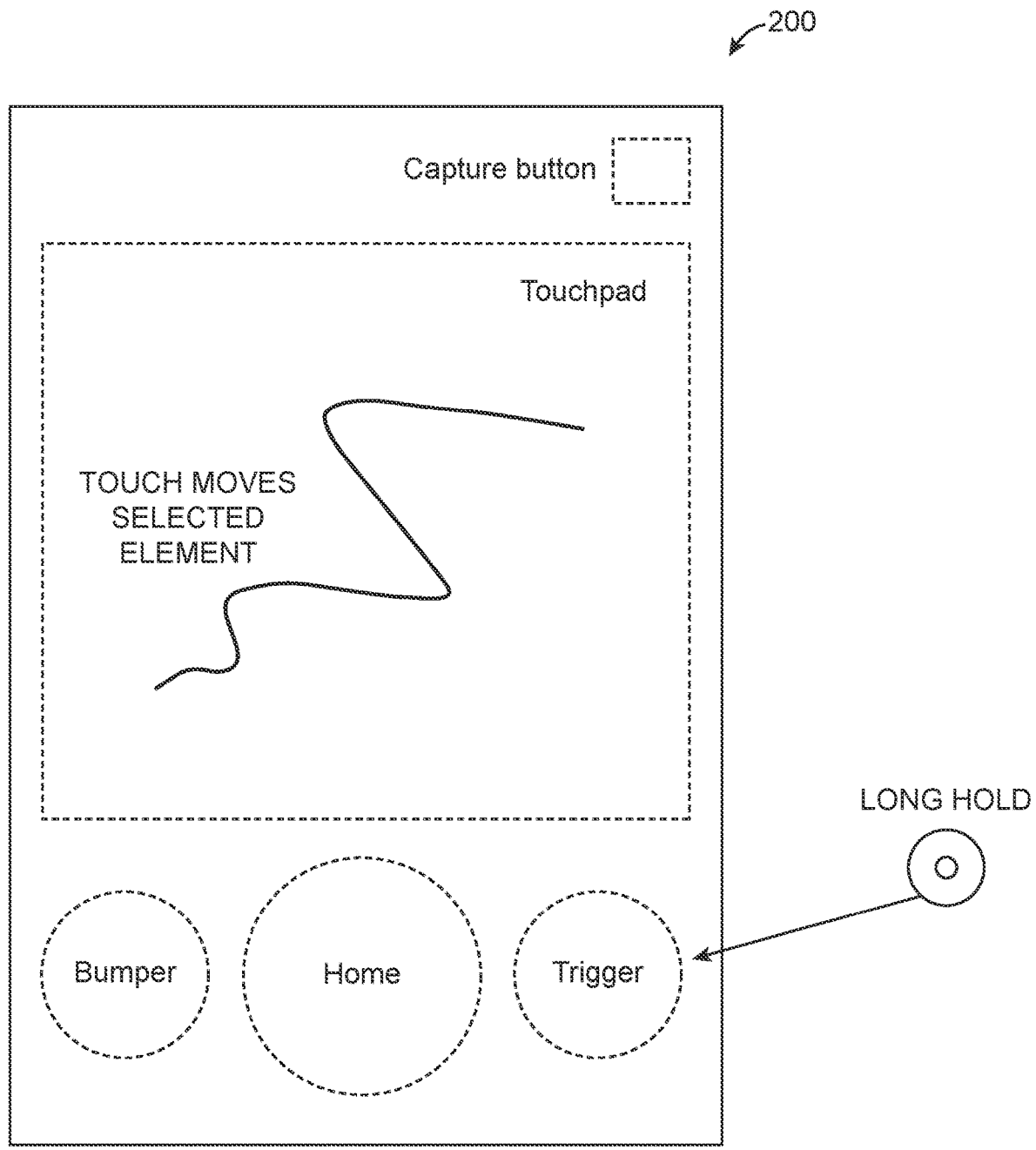
FIG. 16B illustrates an example of a combination of different finger-action inputs detectable by the apparatus of FIG. 6 as a combined input for an image display device.

It should be noted that the processing unit 204 is not limited to detecting the above gestures or finger-actions, and that the processing unit 204 can detect other finger-actions of the user 50. By means of non-limiting examples, the processing unit 204 may be configured to detect one finger swipe (e.g., up/down swipe (FIG. 10A), left/right swipe (FIG. 10B)), two fingers swipe, one finger touch move (FIG. 11A), two fingers touch move (FIG. 11B), two fingers pinch (FIG. 12A), two fingers un-pinch (FIG. 12B), two fingers radial move (FIG. 13), long touch-hold (FIG. 14), tap (FIG. 15), double tap, etc. In one implementation, the processing unit 204 is configured to distinguish between a long hold action and a tap action based on a duration for which the user's finger is in contact with the screen 202. For example, if the touch duration is 0.7 second or less, then the processing unit 204 may determine that the finger(s)-action is a tap action. On the other hand, if the touch duration is 1 second or more, then the processing unit 204 may determine that the finger(s)-action is a long hold action. Also, the processing unit 204 may detect finger action(s) performed using other assigned areas of the screen 202, such as the area where the "Home" button is located, the area where the "Trigger" button is located, and the area where the "Bumper" button is located. In some implementations, the functionality of each of one or more of the "Home," "Trigger," and "Bumper" buttons described herein may correspond to the functionality of each of one or more of the "Home," "Trigger," and "Bumper" buttons as described in U.S. patent application Ser. No. 15/965,702, which is incorporated by reference herein in its entirety. Similarly, in some examples, the functionality of the touchpad described herein may correspond to that which is described in U.S. patent application Ser. No. 15/965,702, the entirety of which is incorporated herein by reference. As such, the apparatus 200 may function as an adequate stand-in for a dedicated input controller. FIG. 16A shows examples of finger-actions (e.g., long-hold, tap, etc.) that may be performed on the "Trigger" button and is detectable by the processing unit 204. Furthermore, the processing unit 204 may be configured to detect a combination of finger-actions performed on different assigned areas of the screen 202. For example, as shown in FIG. 16B, the user 50 may long hold the "Trigger" button, and while doing so, may also perform touch moves using the first assigned area 206 of the screen 202. The processing unit 204 is configured to detect both of these finger-actions simultaneously, and may consider them as a combined input for the image display device 101. For example, the processing unit 204 may determine that the above combination of finger-actions is to create a command to move a selected object. The processing unit 204 may then transmits such command signal to the image display device to move a selected object. The processing unit 204 is configured to generate corresponding commands for the above different finger-actions, or combination of finger-actions, performed on one or more assigned areas of the screen 202.

In some embodiments, while the user 50 is performing a certain finger(s)-action on the assigned area(s) of the screen 202, the user's 50 finger(s) may unintentionally leave the screen 202. To address this situation, the processing unit 204 may be configured to determine that a certain finger(s)-action (e.g., swiping action, etc.) has ended after receiving more than a predetermined threshold quantity of consecutive samples indicating that the user 50 is not touching any location on the screen 202. For example, the processing unit 204 may wait until it has received three (or other number of) consecutive null samples before it determines that such a swiping action has ended. In this example, the processing unit 204 may receive a series of touch input samples, followed by two consecutive null samples (e.g., due to the user's finger unintentionally not touching the screen 202), followed by a series of touch input samples. In this situation, the processing unit 204 would still treat this entire sequence of samples as though it is part of one continuous swiping action. This allows the user 50 to correct his/her action and to finish the finger(s)-action without requiring the user to re-perform the previous performed action. The above features are advantageous because they help filter out noise and increase system robustness to measurement or sensing errors.

In some embodiments, the processing unit 204 is configured to send the identified command to the image display device 101 (e.g., to the processing module 130). The processing module 130 then determines what content to display for the user 50 for viewing based on the received command determined by the processing unit 204. In some cases, the same command may result in different effects on the content being displayed by the image display device 101, depending on the particular application being used by the user 50, and/or the particular content being viewed by the user 50. For example, if the user 50 is viewing a page that allows the user 50 to browse different pages of objects, then the "movement" command may cause a scrolling of the different pages of objects. On the other hand, if the user 50 is in an application that allows an object to be moved, then the "movement" command may cause the object to move from one location to another location.

As illustrated in the above embodiments, the apparatus 200 is advantageous and improves the technological field of head-worn image display devices in several respects. First, the apparatus 200 may serve as a backup input device (for a head-worn image display device) so that if a dedicated input controller for a head-worn image display device is unavailable (e.g., if the dedicated input controller is lost, breaks, runs out of battery, etc.), the apparatus 200 may be used instead by the user 50 to enter input for the head-worn image display device. Many users of image display devices already carry smartphones whenever they go. So, implementing the apparatus 200 as an input controller using a smartphone would increase the chance that the user has an input controller for the image display device. The apparatus may also be also used as the main or sole input device for the image display device, so that the image display device may not need to come with a dedicated input controller.

As mentioned, many users of image display devices already carry smartphones or other types of mobile devices whenever they go. So, implementing the apparatus 200 as an input controller using a smartphone or any other types of mobile devices would improve portability and mobility for the image display device because the user may use the image display device 101 anywhere (even without a dedicated input controller for the image display device 101) as long as the user has the mobile device. Backup and supplemental input support may also be achieved through the apparatus 200 because most users already carry a mobile device whenever they go.

The apparatus 200 may be used as the main device for inputting text, or alternatively, be used as an alternative to a dedicated input controller for inputting text. Entering text through a touch screen of the apparatus while the user is viewing the screen of the apparatus through a transparent part of the head-worn image display device is more convenient and efficient than displaying a keyboard on a viewing screen of the image display device while the user enters text using the dedicated input controller. While smartphones have been known to implement keyboards, the concept of using a smartphone to implement keyboard in the context of providing input for a head-worn image display device is believed to be novel and non-intuitive. This is because such solution would require the user 50 of the head-worn image display device 101 to view through a display screen of the image display device 101 to view the screen 202 (where the keyboard is displayed) of the apparatus 200. Accordingly, this solution would require the user to shift focus from the display screen of the image display device 101 to the screen 202 of the apparatus 200 (which is visible through the display screen of the image display device 101). However, it is believed that despite the shift in visual focus, the touchscreen keyboard implemented on the apparatus 200 as input device for the image display device 101 may be more comfortable to some users in some instances.

Also, in the embodiment in which the apparatus 200 is implemented using the user's cell phone (e.g., smartphone), the apparatus 200 may also facilitate transfer of digital images and photos, and other media content, between the user's phone and the image display device 101. For example, pictures taken by the image display device's 101 camera may be transferred to the user's apparatus 200, and pictures taken by the apparatus's 200 camera may be transferred to the image display device 101. An apparatus that provides both content and control input by a user for a head-worn image display device is believed to be unique.

In addition, in some embodiments, the apparatus 200 described herein allows a user of the head-worn image display device to access application store and content through a network, such as the Internet, Bluetooth network, etc. As most smartphones already have multiple network interfaces for multiple types of network connections (e.g., Wi-Fi connection, Bluetooth connection, connection to cellular towers, etc.), implementing the apparatus 200 using smartphone (or other types of portable network devices) will have the benefit of allowing the user to obtain media content and other information from multiples sources through different types of connections. For example, the apparatus 200 implemented as the input device for the image display device 101 may also access application store for obtaining applications useable with the image display device 101. As another example, the apparatus 200 implemented as the input device for the image display device 101 may also obtain media content from the Web, from another mobile device (e.g., through email, texting, airdrop, etc.). In some embodiments, the apparatus 200 may also allow the user 50 to control account settings for the image display device 101, and to manage the image display device 101 through a user interface displayed on the screen 202 of the apparatus 200.

Furthermore, in some embodiments, the apparatus 200 described herein may receive notifications (for the image display device 101) from a network (e.g., the Internet) even when the head-worn image display device 101 is not being worn by the user 50. For example, the image display device 101 may push different notifications to the apparatus 200. The pushing of the notifications may be performed directly by the image display device 101, or indirectly through another network device (such as a component in a Cloud network). By means of non-limiting examples, notifications received by the apparatus 200 may be calendar notification, advertisement notification, social media notification, operational notification (e.g., battery status, storage level, update notification, etc.) regarding an operation of the image display device 101, etc., or any combination of the foregoing. Also, in some embodiments, a third party in communication with the image display device 101 may provide notification to the image display device 101. In such cases, the image display device 101 may forward the notification to the apparatus 200 so that the user 50 can see the notification even if the user 50 is not wearing the image display device 101. The notification feature is advantageous because it allows functions such as calendar management to be made more practical, and timely reminders and real-time updates for the image display device 101 may be received by the user via the apparatus 200.

Sensory Feedback

In some embodiments, the processing unit 204 may optionally be configured to operate a feedback component in the apparatus 200 in response to the finger-action of the user 50. Such feature is advantageous in that it allows the user 50 to know that his/her finger(s) is reaching or crossing a boundary of the first area 206. In particular, when the user 50 is viewing content displayed by the image display device 101, the user 50 may not be viewing the apparatus 200. As such, the user 50 may not visually notice that his/her finger has moved out of a boundary of the first area 206 (that has been assigned to receive finger-action input). The feedback feature solves this technical problem, and provides a technical improvement for the image display system 100 by informing the user 50 of the image display system 100 via feedback that his/her is about to cross, has reached, or has crossed, the boundary of the assigned first area 206. The feedback may be in a form of a vibration (haptic feedback), which may include one or more mechanical pulses. Alternatively, or additionally, the feedback may include audio feedback.

Figure 17:
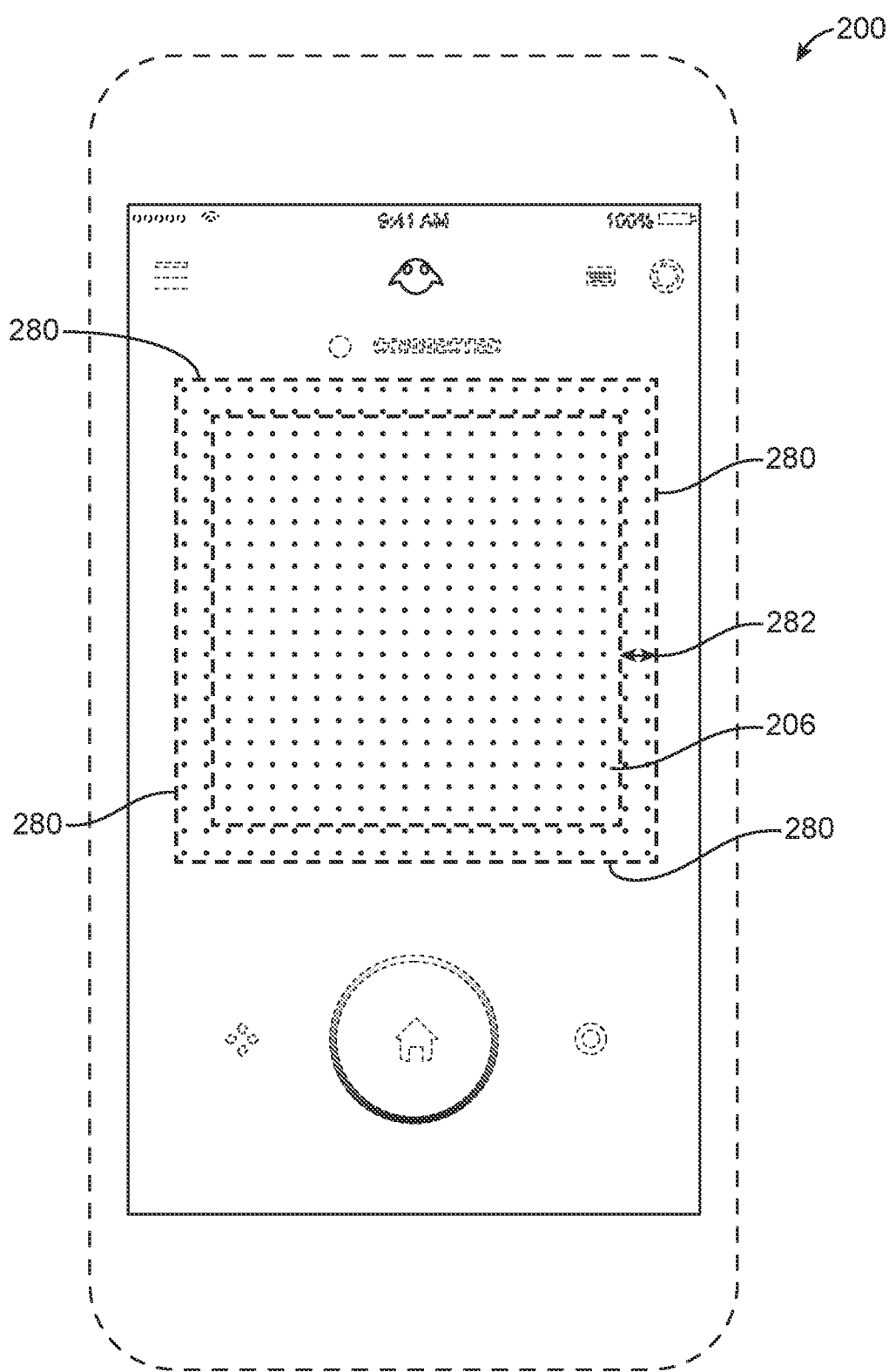
FIG. 17 illustrates a feedback feature of the apparatus of FIG. 6.

As shown in FIG. 17, in some embodiments, the first area 206 may have a boundary 280, and the processing unit 204 may be configured to operate the feedback component when a finger of the user 50 is crossing, reaching, or moving to a location that is within a prescribed distance 282 from the boundary 280. In one implementation, the first assigned area 206 has a square or rectangular shape with four boundaries 280. In such cases, the processing unit 204 may be configured to operate the feedback component when the finger of the user 50 is crossing, reaching, or moving to a location that is within a prescribed distance from any of the four boundaries 280 of the first assigned area 206. The feedback component may include a haptic feedback component, a speaker, any of other types of components that is capable of generating feedback signal (such as a visual signal for display by the image display device 101), or any combination of the foregoing. Thus, as used in this specification, the term "feedback component" may include one or more components for providing one or more sensory feedback. Similarly, as used in this specification, the term "feedback' may include one or more different types of feedback.

As another example, the first area 206 may have one or more boundaries 280 that at least partially surround a reference location. For example, the first area 206 may have a square or rectangular shape surrounding a reference location (e.g., center), or may have a circular shape surrounding a reference location (e.g., center). In such cases, the processing unit 204 may be configured to operate the feedback component in the apparatus 200 in response to a finger of the user 50 reaching a prescribed distance from the reference location.

Also, in some embodiments, the processing unit 204 may be configured to operate the feedback component in the apparatus 200 to generate different types of feedback based on different respective spatial relationships between one or more finger(s) of the user 50 with respect to the first area 206. This allows the user 50 to know the degree to which his/her finger(s) is reaching one or more boundaries 280 of the assigned first area 206. In one example, the different respective spatial relationships may be one of the one or more finger(s), or a point that is between two fingers, reaching different respective distances 282 from a boundary 280 of the assigned first area 206. In another example, the different respective spatial relationships may be different distances (exceeding a threshold) that is between (1) one of the one or more finger(s), or a point that is between two fingers, of the user and (2) a reference location within the assigned first area 206.

In one example, the different types of feedback may comprise a first haptic impulse with a first amplitude, and a second haptic impulse with a second amplitude that is different from the first amplitude. In such cases, as the user's finger moves closer to a boundary 280 of the assigned first area 206 (or moves further away from a reference location surrounded by one or more boundaries 280), the amplitude of the haptic impulse will increase.

In another example, the different types of feedback comprise a first number of haptic impulse(s), and a second number of haptic impulse(s) that is different from the first number. In such cases, as the user's finger moves closer to a boundary 280 of the assigned first area 206 (or moves further away from a reference location surrounded by one or more boundaries 280), the number of the haptic impulse(s) will increase.

In further example, the different types of feedback comprise a first series of haptic impulses with a first frequency, and a second series of haptic impulses with a second frequency that is different from the first frequency. In such cases, as the user's finger moves closer to a boundary 280 of the assigned first area 206 (or moves further away from a reference location surrounded by one or more boundaries 280), the frequency of the haptic impulse will increase.

In another example, the different types of feedback may comprise a first audio signal with a first tone, and a second audio signal with a second tone.

In still another example, the different types of feedback may comprise a first number of audio signal, and a second number of audio signal, wherein the first number is different from the second number.

In a further example, the different types of feedback may comprise a first audio message, and a second audio message that is different from the first audio message.

In other embodiments, the processing unit 204 may operate the feedback component to generate different types of feedback based on the user's finger(s) reaching different boundaries 280 of the assigned first area 206. For example, the assigned first area 206 may have a first boundary 280 (e.g., a left boundary or a right boundary) and a second boundary 280 (e.g., a top boundary or a bottom boundary). In such cases, the processing unit 204 may be configured to operate the feedback component to generate a first type of feedback when one or more finger(s) of the user crosses, reaches, or moves to a location that is within a prescribed distance from, the first boundary; and may be configured to operate the feedback component to generate a second type of feedback when one or more finger(s) of the user crosses, reaches, or moves to a location that is within a prescribed distance from, the second boundary. Such feature may be desirable because it allows the user 50 to know which boundary 280 his/her finger(s) is approaching without looking at the apparatus 200.

Also, in other embodiments, the processing unit 204 may be configured to operate the feedback component based on a swiping direction of the user's finger(s). For example, assuming the assigned first area 206 has a rectangular shape with top boundary, bottom boundary, left boundary, and left boundary. If the user 50 is swiping his/her finger(s) upward, then the boundary 280 that is likely to be reached would be the top boundary. In such cases, the processing unit 204 may then operate the feedback component to generate a type of feedback to inform the user 50 that the user's finger(s) is reaching the top boundary.

In some embodiments, it may be desirable to ensure that feedback is provided only in situations in which a touching of a location outside (or close to) the boundary 280 of the first area 206 is resulted from the user 50 using the assigned first area 206. For example, if the user 50 touches a location outside (or within a prescribed distance from) the assigned first area 206, and the touch-action is not a part of a continuous swiping action that starts from within the first area 206, then the processing unit 204 may not operate the feedback component to provide any feedback. On the other hand, if the touching of the location outside (or within the prescribed distance from) the assigned first area 206 is a part of a swiping action that begins from within the assigned first area 206, then the processing unit 204 may operate the feedback component to provide feedback.

Figure 18:
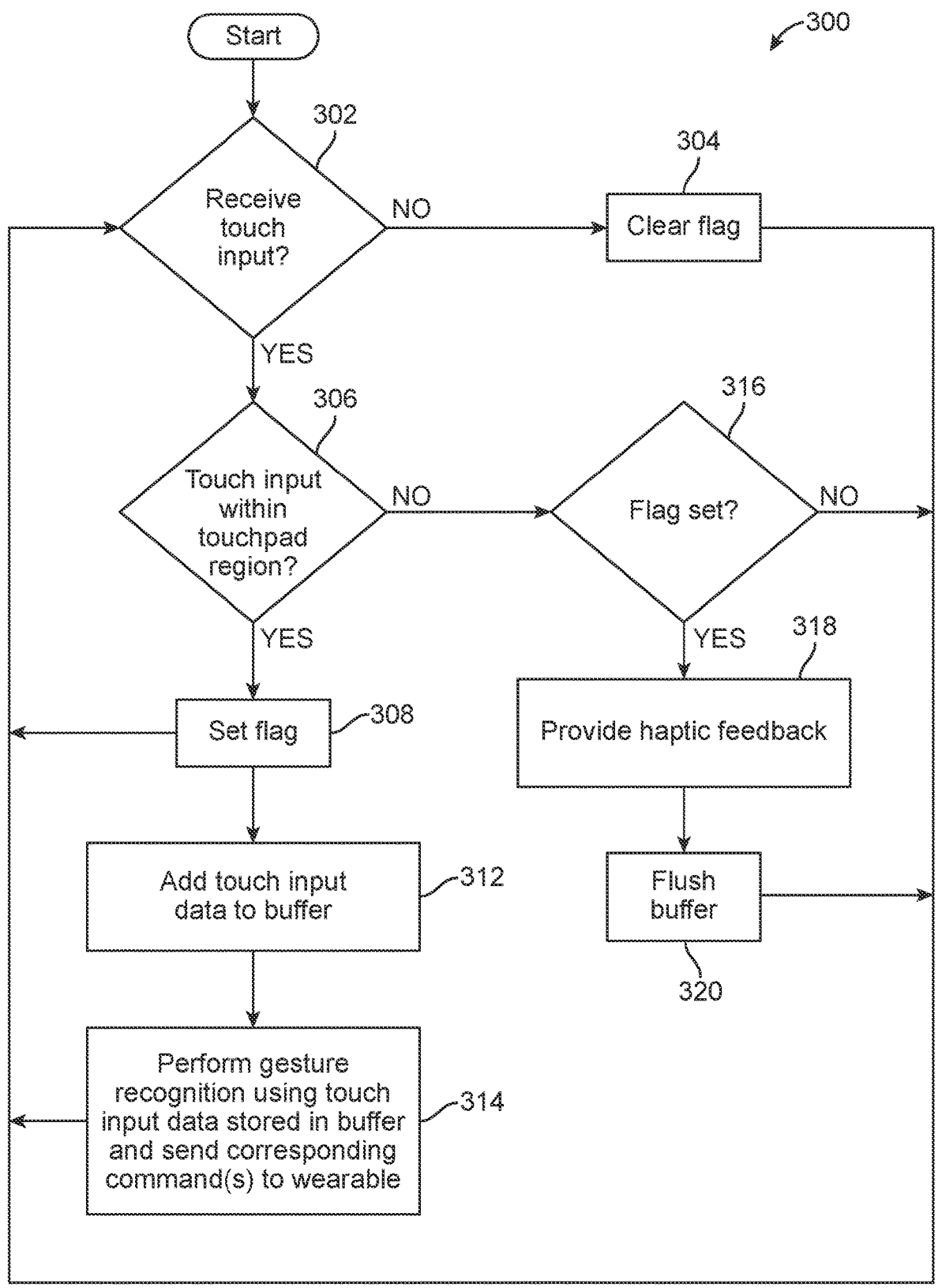
FIG. 18 illustrates an algorithm or a method for providing feedback.

FIG. 18 illustrates an algorithm or method 300 for providing feedback that considers the above two scenarios. First, the processing unit 204 determines whether there is an input signal indicating a receipt of touch input by the user 50 (item 302). The input signal may be generated as a result of the user 50 touching any location in the touch-sensitive region of the apparatus 200. If there is no such input signal, the processing unit 204 then clears a flag (item 304). In the illustrated embodiments, the flag is used to keep track whether the user 50 has initiated a finger-action by touching a location inside the assigned first area 206. If the user has initiated such action, then the flag will be set. If not, the flag will be cleared. After the flag is cleared, the method loops back to item 302 so that the processing unit 204 continues to determine whether the user 50 has touched any part of the touch-sensitive region (e.g., area outside and inside the assigned first area 206) of the apparatus 200.

If the processing unit 204 determines that there is an input signal indicating a receipt of a touch input by the user 50, the processing unit 204 then determines whether the touched location is within the assigned first area 206 of the screen 202 (item 306). If the touched location is inside the assigned first area 206, then the processing unit 204 sets the flag to indicate that a finger-action has occurred that involves the user 50 touching a location in the assigned first area 206 (item 308). The processing unit 204 also adds the touch input data to a buffer (item 310), and performs gesture recognition using the input data stored in the buffer (item 312). As discussed, the buffer is configured to store input data generated by the user 50 performing a finger-action on the assigned first area 206 and/or other assigned area(s). In some embodiments, in item 312, the processing unit 204 performs gesture recognition using the input data to identify a corresponding command for the performed gesture (finger-action(s)). The processing unit 204 also generates or identifies corresponding command for the detected finger-action(s) performed on one or more assigned areas of the screen 202. In some embodiments, the processing unit 204 is configured to send the command to the image display device 101 (e.g., to the processing module 130). The processing module 130 then determines what content to display for the user 50 for viewing based on the received command provided by the apparatus 200.

Returning to FIG. 18, if, on the other hand, the processing unit 204 determines in item 306 that the touched location is outside the assigned first area 206, the processing unit 204 then determines whether a flag was previously set (item 316). If no flag was previously set, that means the currently touched location is not a part of a finger-action initiated from a location that is within the assigned first area 206 (e.g., the currently touched location may have been resulted from the user 50 tapping, grabbing, etc., a location that is outside the assigned first area 206). In such cases, the processing unit 204 does not operate the feedback component, and no feedback is provided to the user 50. The method then loops back to item 302, so that the processing unit 204 can continue to determine whether the user 50 has touched any part of the touch-sensitive region (e.g., area outside and inside the assigned first area 206) of the apparatus 200.

On the other hand, if the processing unit 204 determines in item 316 that a flag was previously set, that means the currently touched location (which is outside the assigned first area 206 or is within a prescribed distance 282 from a boundary 280 of the assigned first area 206) is a part of a trajectory of a finger-action that initiated from within the first area 206. In such case, the processing unit 204 then operates the feedback component to provide feedback (item 318). Once feedback has been provided, the processing unit may then flush the buffer that stores input data generated from the user 50 touching the assigned first area 206 (item 314). The flushing of the buffer means that the previous input data resulted from the user 50 touching the assigned first area 206 is deleted, and no command will be identified and generated because the user's finger has reached or exceeded the boundary 280 of the assigned first area 206.

Change in Content Based on Finger(s)-Generated Input Signal and/or Sensor Signal As described above, the assigned first area 206 (which functions like a touchpad) of the screen 202, and other assigned areas (like areas 240, 250, 260), allow the user 50 of the video display device 101 to provide a variety of finger(s)-generated inputs for the video display device 101. The processing unit 204 of the apparatus 200 is configured to generate an electronic signal (resulted from the finger(s)-generated input) for causing a change in the content displayed by the image display device 101. In some cases, the electronic signal may represent an identification of a finger(s)-action. Alternatively, or additionally, the electronic signal may represent a command or an identification of a command determined by the processing unit 204 based on a recognition of a finger-action input generated using the assigned areas 206, 240, 250, 260 (like those described with reference to FIGS. 10-16, and items 312 and 314 of FIG. 18). In some embodiments, the apparatus 200 is configured to transmit such electronic signal to the image display device 101 via a wired connection. In other embodiments, the apparatus 200 may convert the electronic signal using a wireless communication module into a wireless form for wireless transmission to the image display device 101. The processing module 130 of the video display device 101 receives the signal from the apparatus 200, and change the content for display by the display subsystem 110 based on the signal.

By means of non-limiting examples, the change in the content may be a change in a size of the content, a change in a position of the content, a change in a shape of the content, a change in a color of the content, a replacement of information in the content, an increase or decrease in a quantity of information in the content, or any combination of the foregoing. In some cases, a change in the content caused by the finger(s)-generated input (generated using the assigned first area 206) may be a movement of a cursor or a pointer. In other cases, a change in the content caused by the finger(s)-generated input may be a change in a selection of an item to another selection of another item displayed by the image display device 101. In still other cases, a change in the content caused by the finger(s)-generated input may be a movement of an object (e.g., a photo, a computer-generated image, a cartoon, etc.) across a display of the image display device 101, wherein the movement may occur within a viewing plane of the user 50 (e.g., in the X-Y plane), or along a viewing depth (e.g., along a Z-axis) of the user 50. Also, in some cases, a change in the size of content may be a change in the size of an object (e.g., a photo, a computer-generated image, a cartoon, etc.) being displayed by the image display device 101.

It should be noted that the finger(s)-actions detected by the processing unit 204 may be used by the processing unit 204 to determine a variety of different commands (an example of electronic signals), and the processing unit 204 may transmit such commands (wirelessly or through a wired connection) to the image display device 101 for allowing the image display device 101 to change the content being displayed based on the commands. By means of non-limiting examples, a command determined from a detected touch move (like that shown in FIG. 11A) may be processed by the image display device 101 to target elements, to control movement of a cursor, to navigate within the plane of the viewing screen of the image display device 101, etc.; a command determined from a detected upward or downward swipe (like that shown in FIG. 10A) may be processed by the image display device 101 for scrolling content in simple grid and list layouts; a command determined from a detected left or right swipe (like that shown in FIG. 10B) may be processed by the image display device 101 to move a next page, to move a different section, etc. to the current viewing frame for display by the image display device 101; a command determined from a two fingers touch and scroll action (like that shown in FIG. 11B) may be processed by the image display device 101 to provide inertial scroll of content (i.e., if the two-fingers touch is moved slowly, the page scrolls slowly and precisely, and if the two-fingers touch is moved with a quick swipe, the page flings) displayed by the image display device 101; a command determined from a pinching action (like that shown in FIG. 12A) or un-pinching action (like that shown in FIG. 12B) may be processed by the image display device 101 to change a size of an object displayed by the image display device 101; a command determined from a detected long hold in the assigned first area 206 (like that shown in FIG. 14) may be processed by the image display device 101 to open a menu, to open a browser, to open an application, etc., for display by the image display device 101; a commend determined from a detected tap action in the assigned first area 206 (like that shown in FIG. 15) or from a tap action on the "Trigger" button (like that shown in FIG. 16B) may be processed by the image display device 101 to open an additional function menu for display by the image display device 101; etc. The above functions caused by the commands generated by the processing unit 204 are only examples. In other embodiments, the same detected finger(s)-actions described above may be used to generate other different commands for performing other functions different from the examples described.

Also, in some embodiments, a sequence of commands determined from a sequence of detected finger(s)-action may be transmitted from the processing unit 204 to the image display device 101 for allowing the user 50 to perform a variety of tasks on the content displayed by the image display device 101. For example, a sequence of commands may be provided by the processing unit 204 for 3D placement of object and content extraction. In one implementation, the user 50 long holds the "Trigger button" to grab an object displayed by the image display device 101, then performs touch move using the first assigned area 206 to move the grabbed object, and then releases the "Trigger button" to place the object at a desired location. In some embodiments, the object is grabbed as long as the "Trigger" button is pressed, and is dropped as soon as the "Trigger" button is released. In such cases, the user 50 may use one hand to press the "Trigger" button, while the other hand is used to move the grabbed object. Alternatively, after an object is grabbed, the user can release the "Trigger" button, and the object will still remain grabbed. In such cases, the user can use the same hand to move the grabbed object. After the grabbed object is desirably placed, the user can then tap or long-hold the "Trigger" button to release the grabbed object. The 3D placement feature may allow the user 50 to move any object displayed by the image display device 101. For example, the user 50 may use the above features for dragging and dropping an image in an application for composing slide shows, for moving a web slider, etc. In some embodiments, while the object is grabbed, the user 50 can use the assigned first area 206 and/or head pose to move the grabbed object, can use the assigned first area 206 to rotate the grabbed object (using two fingers radial move like that shown in FIG. 13), and can use the assigned first area 206 to scale the grabbed object (using pinch or un-pinch action like that shown in FIGS. 12A/12B).

As another example, the processing unit 204 may detect a certain swiping action by the user 50, and in response, provide a text-box for allowing the user 50 to enter text (e.g., English letters, letters or characters in other languages, numbers, punctuation, special characters, symbols, emoji, text graphics, etc.). This swipe-to-type feature may provide a fast and convenient way for the user 50 to enter text and other information.

In some embodiments, in addition to the input signal generated using finger action performed on the assigned area 206, the processing unit 204 of the apparatus 200 may also obtain sensor signal that is associated with an orientation of the apparatus 200, and use the combination of the input signal and the sensor signal to cause a change of the content being displayed by the image display device 101. In particular, the processing unit 204 may determine a command based on the combination of the input signal and the sensor signal, and may transmit such command to the image display device 101. The image display device 101 then processes the command and changes the content based on the command. Alternatively, the processing unit 204 may determine a first command for the input signal, and a second command for the sensor signal, and may transmit both commands to the image display device 101. The image display device 101 then processes the commands and changes the content based on both commands.

For example, in some embodiments, the apparatus 200 further includes an orientation sensor for sensing an orientation of the apparatus 200. The orientation sensor may be an inertial measurement unit (IMU), or any of other types of orientation sensor. In such cases, the processing unit 204 may be configured to generate the electronic signal to cause the content displayed by the image display device 101 to change based on both (1) the finger(s)-generated input signal and (2) the sensed orientation of the apparatus.

In some cases, the finger(s)-generated input signal may be associated with a pinching or un-pinching action of the user 50. In such cases, the apparatus the processing unit 204 may be configured to generate the electronic signal to cause the content displayed by the image display device 101 to change based on (1) the input signal associated with the pinching or un-pinching action and (2) the sensed orientation of the apparatus 200. For example, the processing unit 204 may be configured to (1) generate the electronic signal to cause the content to contract or expand in a first plane if the pinching or un-pinching action is sensed by the apparatus 200 while the apparatus 200 is at a first orientation, and (2) generate the electronic signal to cause the content to contract or expand in a second plane if the pinching or un-pinching action is sensed by the apparatus 200 while the apparatus 200 is at a second orientation different from the first orientation, the second plane being different from the first plane. In some embodiments, the apparatus 200 may be considered as having the first orientation when a major axis of the apparatus 200 forms an angle with a horizontal plane that is less than 45°, or more preferably less than 30°. Also, the apparatus 200 may be considered as having the second orientation when a major axis of the apparatus 200 forms an angle with a vertical plane that is less than 45°, or more preferably less than 30°.

In addition, the first plane in which the content contracts or expands due to apparatus being at the first orientation may be perpendicular to the second plane in which the contact contracts or expands due to apparatus being at the second orientation. For example, the first plane may be a Y-Z plane in a virtual three-dimensional environment, and the second plane comprises a X-Y plane in the virtual three-dimensional environment.

In other embodiments, instead of a pinching or un-pinching action of the user 50, the input signal may be resulted from other types of finger(s)-generated actions. For example, the input signal may be resulted from a swiping action performed by the user 50. In such cases, the apparatus the processing unit 204 may be configured to generate the electronic signal to cause the content displayed by the image display device 101 to change based on (1) the input signal associated with the swiping action and (2) the sensed orientation of the apparatus 200.

For example, the processing unit 204 may be configured to (1) generate the electronic signal to cause the content to move in a first plane if the pinching or un-pinching action is sensed by the apparatus 200 while the apparatus 200 is at a first orientation, and (2) generate the electronic signal to cause the content to move in a second plane if the pinching or un-pinching action is sensed by the apparatus 200 while the apparatus 200 is at a second orientation different from the first orientation, the second plane being different from the first plane. In some embodiments, the apparatus 200 may be considered as having the first orientation when a major axis of the apparatus 200 forms an angle with a horizontal plane that is less than 45°, or more preferably less than 30°. Also, the apparatus 200 may be considered as having the second orientation when a major axis of the apparatus 200 forms an angle with a vertical plane that is less than 45°, or more preferably less than 30°.

In addition, the first plane in which the content moves due to apparatus being at the first orientation may be perpendicular to the second plane in which the contact moves due to apparatus being at the second orientation. For example, the first plane may be a Y-Z plane in a virtual three-dimensional environment, and the second plane comprises a X-Y plane in the virtual three-dimensional environment.

In some embodiments, the content is in a virtual three-dimensional environment, and the processing unit 204 is configured to generate the electronic signal to cause the content displayed by the image display device 101 to change by moving the content closer to or further from the user 50 when the swiping action is sensed by the apparatus 200 while the orientation of the apparatus 200 is approximately parallel to a horizontal plane (e.g., forming an angle that is ±30° from the horizontal plane). The processing unit 204 is also configured to generate the electronic signal to cause the content displayed by the image display device 101 to move in a vertical plane in the three-dimensional environment when the swiping action is sensed by the apparatus 200 while the orientation of the apparatus 200 is approximately perpendicular to a horizontal plane (e.g., forming an angle that is ±30° from a vertical plane).

In some embodiments, the processing unit 204 is configured to generate the electronic signal to cause the content to expand in one or more directions based on the sensed orientation of the apparatus 200. For example, if the apparatus 200 is in a first orientation (e.g., upright orientation), the electronic signal may be a command to expand the content in a first direction that corresponds with the first orientation of the apparatus 200. If the apparatus 200 is in a second orientation (e.g., a face-up orientation), the electronic signal may be a command to expand the content in a second direction that corresponds with the second orientation of the apparatus 200.

Also, in some embodiments, the processing unit 204 is configured to generate the electronic signal to cause the content to move or rotate based on the sensed orientation of the apparatus 200.

Furthermore, in some embodiments, the apparatus 200 further includes a movement sensor for sensing a movement of the apparatus 200, wherein the processing unit 204 is configured to generate the electronic signal to cause the content displayed by the image display device 101 to change (e.g., to move) based on the sensed movement of the apparatus 200. The movement sensor may include an accelerometer, or any of other components that can detect movement and/or direction of movement.

Figure 19A:
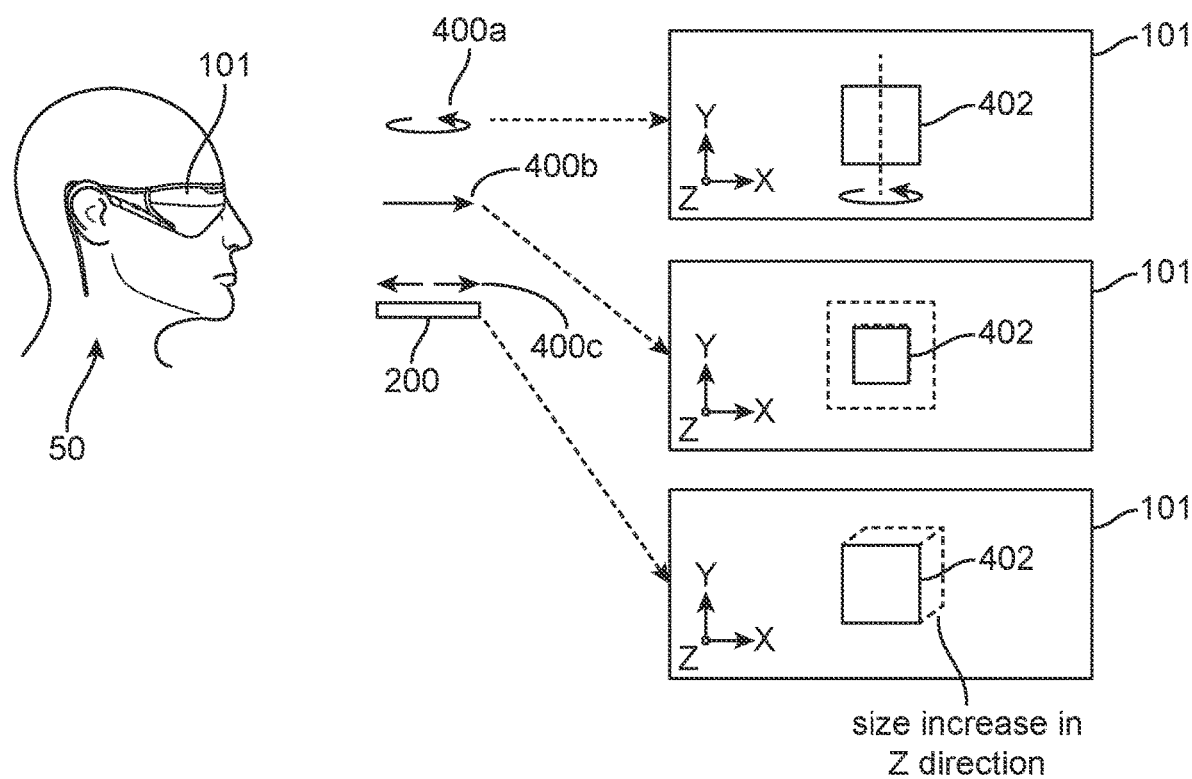
FIG. 19A illustrates examples of finger(s)-action performed on the apparatus of FIG. 6 while apparatus is in a face-up orientation, and examples of the corresponding effects on a displayed content.
Figure 19B:
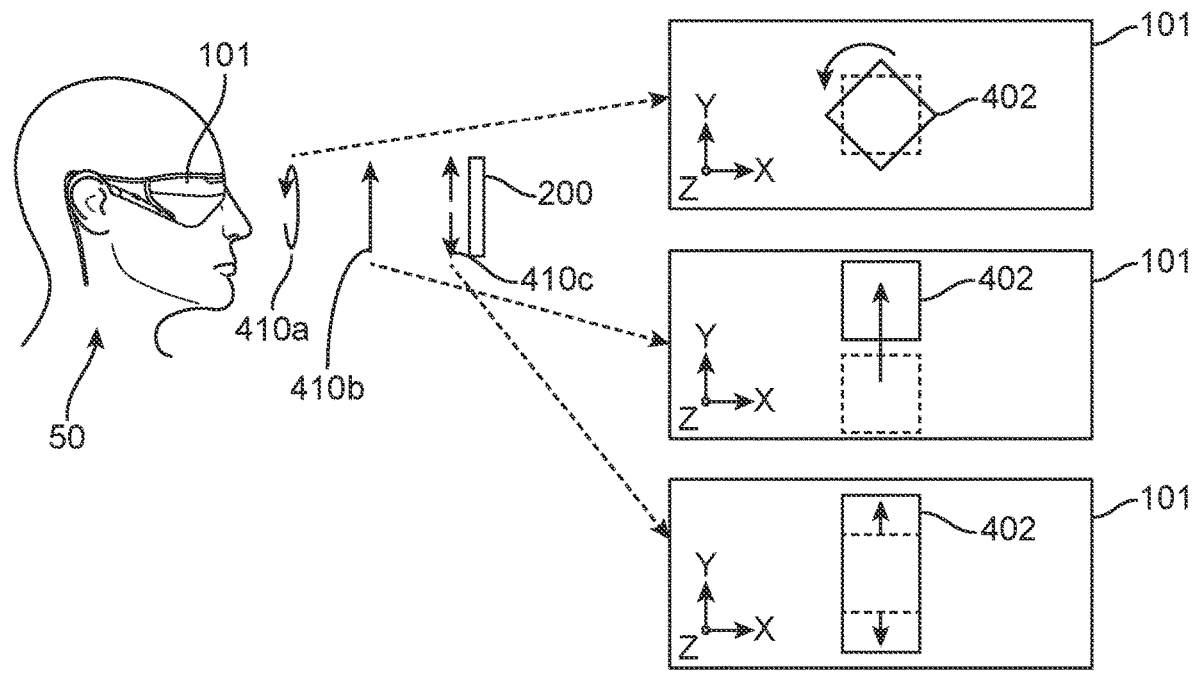
FIG. 19B illustrates examples of finger(s)-action performed on the apparatus of FIG. 6 while apparatus is in an up-right orientation, and examples of the corresponding effects on a displayed content.

FIGS. 19A and 19B illustrate examples of some of the above-described features. In particular, FIG. 19A illustrates examples of finger(s)-action performed on the apparatus of FIG. 6 while apparatus is in a face-up orientation, and examples of the corresponding effects on a displayed content. FIG. 19B illustrates examples of finger(s)-action performed on the apparatus of FIG. 6 while apparatus is in an up-right orientation, and examples of the corresponding effects on a displayed content. As shown in FIG. 19A, when the apparatus is held by the user 50 in a face-up orientation, the user 50 may perform (1) a two-fingers radial move 400a on the assigned first area 206 of the screen 202 of the apparatus 200 to cause an object 402 displayed by the image display device 101 to rotate about a Y-axis, (2) a vertical swipe move 400b on the assigned first area 206 of the screen 202 of the apparatus 200 to cause the object 402 to move further away along a Z-axis, and (3) an un-pinch move 400c to on the assigned first area 206 of the screen 202 of the apparatus 200 to cause the object 402 to increase in size along the Z-axis. On the other hand, as shown in FIG. 19B, when the apparatus is held by the user 50 in an upright orientation, the user 50 may perform (1) a two-fingers radial move 410a on the assigned first area 206 of the screen 202 of the apparatus 200 to cause the object 402 displayed by the image display device 101 to rotate about the Z-axis, (2) a vertical swipe move 410b on the assigned first area 206 of the screen 202 of the apparatus 200 to cause the object 402 to move up (or down) along a Y-axis, and (3) an un-pinch move 410c to on the assigned first area 206 of the screen 202 of the apparatus 200 to cause the object 402 to increase in size along the Y-axis. Accordingly, depending on the orientation of the apparatus 200, the same finger(s)-action would achieve different effects on the content displayed by the image display device 101.

In some embodiments, the processing unit 204 may be configured to detect six different scenarios of finger(s)-action input(s) and/or orientation sensor signal, and generate a corresponding control signal to cause an object displayed by the image display device 101 to move in six different degrees of freedom, respectively. For example, based on the finger(s)-action input and/or orientation sensor signal, an object displayed by the image display device 101 may be translated along an X-axis, translated along an Y-axis, translated along an Z-axis, rotated about the X-axis, rotated about the Y-axis, and rotated about the Z-axis.

In some embodiments, the electronic signal generated by the processing unit 204 of the apparatus 200 may also cause the image display device 101 to display touch hint, so that the user 50 viewing the screen of the image display device 101 can see what finger(s)-action is being detected by the processing unit 204. For example, if the user 50 is performing a two-fingers touch move on the first assigned area 206 of the screen 202 to inertial move an object being displayed by the image display device 101, the electronic signal generated by the processing unit 204 based on a detection of the two-fingers touch move may be transmitted to the image display device 101, which then displays a graphic (touch hint) to inform the user 50 that he/she is performing a two-fingers touch move. The same feature may be applied for other types of detected finger(s)-actions. Thus, the image display device 101 may display different finger(s)-action indicators for informing the user 50 that different respective finger(s)-actions have been detected by the apparatus 200.

It should be noted that in one or more embodiments, any feature described herein may be performed by the processing unit 204 of the apparatus 200, and/or the processing unit 130 of the image display device 101. Accordingly, one or more features described herein as being performed by the processing unit 204 of the apparatus 200 may alternatively be performed by the processing unit 130 of the image display device 101, or by the combination of the processing unit 204 of the apparatus 200 and the processing unit 130 of the image display device 101. Similarly, one or more features described herein as being performed by the processing unit 130 of the image display device 101 may alternatively be performed by the processing unit 204 of the apparatus 200, or by the combination of the processing unit 204 of the apparatus 200 and the processing unit 130 of the image display device 101.

Gesture Handoff

In some embodiments, the image display device 101 may include a camera for detecting gestures of the hand(s) of the user 50, and the processing unit 130 of the image display device 101 may interpret the detected gestures to generate corresponding control signals for operating the image display device 101. In some embodiments, a gesture performed by the user 50 on the assigned first area 206 may be combined with a gesture detected by the camera of the image display device 101 to achieve a desired operation. For example, in some embodiments, the apparatus 200 may display content on its screen, and the user 50 may perform a pinching action on the screen of the apparatus 200 to extract the displayed content. The processing unit 204 detects the pinching action performed using the apparatus 200, and interprets it as a control signal to extract the content. The user 50 may then perform an un-pinching action in the field of view of the camera of the image display device 101. The image display device 101 detects the un-pinching action, and interprets it as a control signal to place the content in a certain location presented by (or viewable through) the screen of the image display device 101. Accordingly, gesture detection performed by the apparatus 200 may be combined with gesture detection performed by the image display device 101 to operate on content displayed by the apparatus 200 and/or content displayed by the image display device 101.

In another example, the image display device 101 may display content on its screen, and the user 50 may perform a pinching action in front of the camera of the image display device 101 to extract the displayed content. The processing unit 130 of the image display device 101 detects the pinching action as captured by the camera, and interprets it as a control signal to extract the content. The user 50 may then perform an un-pinching action on the apparatus 200. The apparatus 200 detects the un-pinching action, and interprets it as a control signal to place the content in a certain location presented by the screen of the apparatus 200.

Also, in some embodiments, content displayed by the apparatus 200 may be moved to the "environment" of the image display device 101 by selecting the content at the apparatus 200, and moving (e.g., by touch move, swiping, etc.) the content to an edge of the display area of the apparatus 200. When the processing unit 204 detects that the content is moved to the edge of the display, the processing unit 204 then determines that the content is to be moved to the display screen of the image display device 101. The apparatus 200 then transmits a control signal to cause the content to be displayed by the image display device 101. After the content has been "moved" from the screen of the apparatus 200 to the screen of the image display device 101, then user 50 may then perform further operations on the content by using the apparatus 200 (e.g., operating on the assigned first area 206 to move the content, resize the content, etc.) and/or using hand gesture for detection by the camera of the image display device 101.

In some embodiments, the "movement" of content from the screen of the apparatus 200 to the screen of the image display device 101 (or vice versa) may be executed to provide temporal continuity. For example, as soon as the content disappears on the screen of the apparatus 200, the processing unit 130 of the image display device 101 may immediately generate and provide an image of the content for display by the screen of the image display device 101. In other embodiments, the "movement" of content from the screen of the apparatus 200 to the screen of the image display device 101 (or vice versa) may be executed without any temporal continuity. For example, after the content disappears on the screen of the apparatus 200, there may be a time lag for providing an image of the content for display by the screen of the image display device 101.

Also, in some embodiments, the "movement" of content from the screen of the apparatus 200 to the screen of the image display device 101 (or vice versa) may be executed to provide spatial continuity. For example, if content on the screen of the apparatus 200 is moved to the right edge of the display for moving the content to the screen of the image display device 101, then as soon as the content is moved out of the screen of the apparatus 200, the image display device 101 may immediately display the content next to the left edge of the screen of the image display device 101. Similarly, as another example, if content on the screen of the image display device 101 is moved to the right edge of the display for moving the content to the screen of the apparatus 200, then as soon as the content is moved out of the screen of the image display device 101, the apparatus 200 may immediately display the content next to the left edge of the screen of the apparatus 200.

In other embodiments, the "movement" of content from the screen of the apparatus 200 to the screen of the image display device 101 (or vice versa) may be executed without any spatial continuity. For example, after the content on the screen of the apparatus 200 is moved out of the screen, the content may always appear at a pre-determined location (e.g., center) on the screen of the image display device 101.

In one example of use, the above features may be implemented to allow the user 50 to deal cards in a poker game. For example, the user 50 may perform a swiping action using the apparatus 200 to dispatch a poker card. The poker card may move out of the screen of the apparatus 200, and may appear on the screen of the image display device 101 (or on the screen of another image display device another user is using, wherein the other image display device may be communicating with the image display device 101 via a network, such as the Internet, a Wi-Fi, etc.).

Also, in some embodiments, the camera of the image display device 101 for detecting user's gesture may be used to view the user's hand while the user 50 is performing finger(s)-action input on the apparatus 200. In such cases, the processing unit 130 of the image display device 101 may detect the finger(s)-action by the user 50, and verify a detection of the finger(s) gesture detected by the apparatus 200.

In addition, in some embodiments, the image display device 101 is configured to detect whether the user 50 is using the apparatus 200. If the user 50 is using the apparatus 200 for entering input, the image display device 101 may disable its gesture-detection camera. Alternatively, in some examples, if the user 50 is using the apparatus 200 for entering input, the image display device 101 may keep its camera enabled and simply refrain from performing one or more gesture detection processes on images that are captured by the camera. As soon as the user 50 lifts his/her fingers away from the screen of the apparatus 200, the image display device 101 may then activate the gesture-detection camera to allow the camera to take over the gesture-detection function. In one implementation, the processing unit 130 of the image display device 101 is configured to disable the gesture-detection camera of the image display device 101 as long as the apparatus 200 is receiving input generated by the finger(s)-actions of the user 50. The processing unit 130 may be configured to receive a signal from the apparatus 200 as soon as the user 50 lifts his/her finger(s) away from the screen of the apparatus 200. In response to such signal, the processing unit 130 then activates the gesture-detection camera of the image display device 101 to allow gestures detected by the camera to be used as input for the image display device 101.

Figure 20:
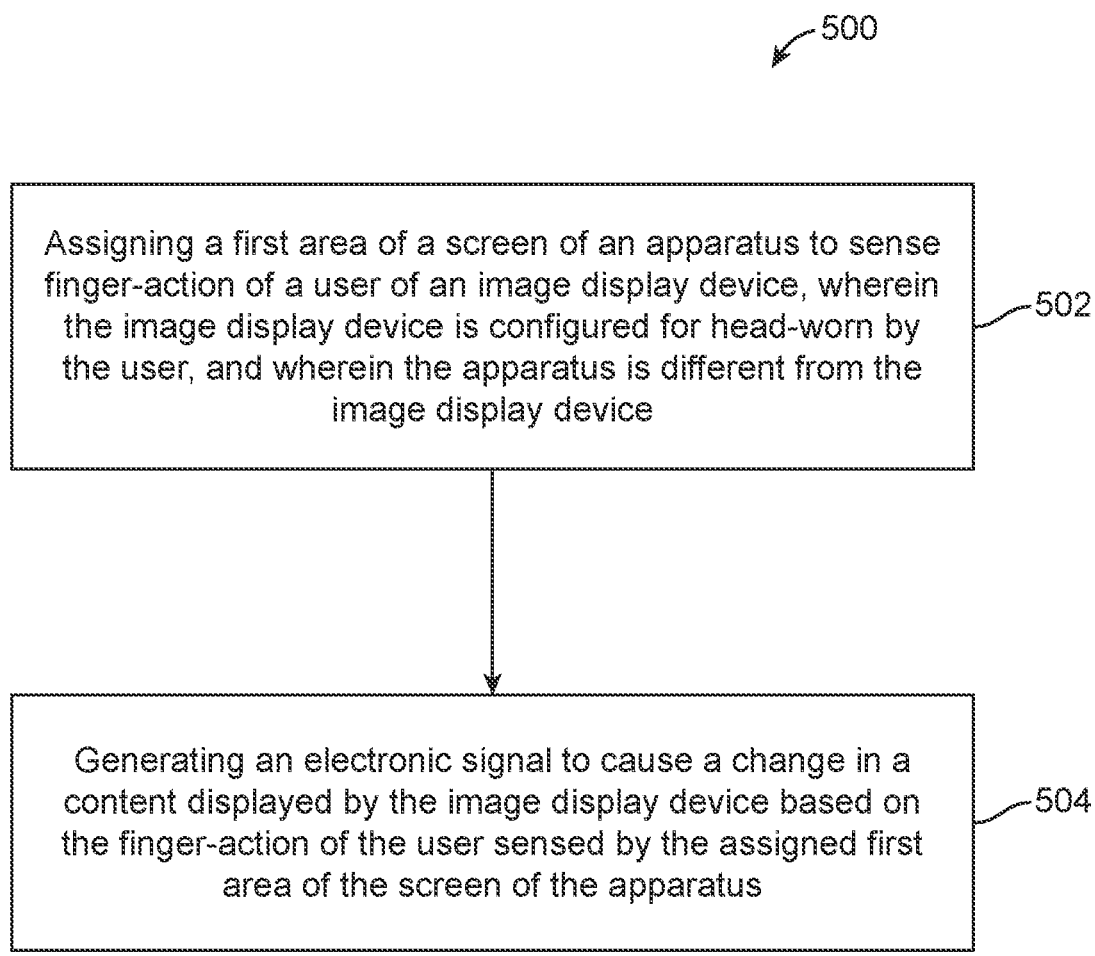
FIG. 20 illustrates a method in accordance with some embodiments.

Method Performed by the Processing Unit and/or Application in the Processing Unit FIG. 20 illustrates a method 500 in accordance with some embodiments. The method 500 may be performed by the processing unit 204 and/or an application in the processing unit 204 of the apparatus 200. The method 500 includes: assigning a first area 206 of a screen 202 of the apparatus 200 to sense finger-action of the user 50 of the image display device 101, wherein the image display device 101 is configured for head-worn by the user, and the apparatus 200 is different from the image display device 101 (item 502). The image display device 101 may be any of the ones shown in FIGS. 1-4. The method 500 also includes: generating an electronic signal to cause a change in a content displayed by the image display device 101 based on the finger-action of the user sensed by the assigned first area 206 of the screen 202 of the apparatus 101 (item 504).

In some embodiments, the electronic signal may be a command determined by the processing unit 204 or by the application in the processing unit 204 based on gesture recognition. The electronic signal may be transmitted by the apparatus 200 to the processing unit 130 of the image display device 101, which then changes the content based on the electronic signal. Alternatively, if the apparatus 200 participates in providing the content for display by the image display device 101, then the processing unit 204 may change the content being displayed based on the electronic signal that it provides. Thus, the electronic signal may directly or indirectly cause the change in the content displayed by the image display device 101.

Optionally, in the method 500, the screen 202 has a touch-sensitive region 210, and wherein the assigned first area 206 is less than a total area of the touch-sensitive region 210.

Optionally, the method 500 may further include ignoring input generated by the user 50 using a portion of the touch-sensitive region 210 that is not a part of the assigned first area 206, and that is not a part of an assigned button.

Optionally, the method 500 may further include generating a control signal to operate a feedback component in response to the finger-action of the user 50.

Optionally, in the method 500, the first area has a boundary, and wherein the finger-action of the user 50 comprises a finger of the user crossing, reaching, or moving to a location that is within a prescribed distance from, the boundary.

Optionally, in the method 500, the first area 206 has one or more boundaries that at least partially surround a reference location, and wherein the control signal is for operating the feedback component in response to a finger of the user 50 reaching a prescribed distance from the reference location.

Optionally, the method 500 further includes generating different control signals to operate a feedback component to generate different respective types of feedback based on different respective spatial relationships between one or more finger(s) of the user 50 with respect to the first area 206.

Optionally, in the method 500, the different types of feedback comprise a first haptic impulse with a first amplitude, and a second haptic impulse with a second amplitude that is different from the first amplitude.

Optionally, in the method 500, the different types of feedback comprise a first number of haptic impulse(s), and a second number of haptic impulse(s) that is different from the first number.

Optionally, in the method 500, the different types of feedback comprise a first series of haptic impulses with a first frequency, and a second series of haptic impulses with a second frequency that is different from the first frequency.

Optionally, in the method 500, the different respective spatial relationships comprise different distances between (1) one of the one or more finger(s), or a point that is between two fingers, of the user and (2) a reference location within the assigned first area 206.

Optionally, in the method 500, the reference location comprises a center of the assigned first area 206.

Optionally, in the method 500, the different distances exceed a threshold.

Optionally, in the method 500, the different respective spatial relationships comprise one of the one or more finger(s), or a point that is between two fingers, reaching different respective distances from a boundary of the assigned first area 206.

Optionally, in the method 500, the assigned first area 206 has a first boundary and a second boundary; wherein the different types of the feedback comprise at least a first type of feedback and a second type of feedback; wherein the feedback component is operated to generate the first type of feedback when one or more finger(s) of the user 50 crosses, reaches, or moves to a location that is within a prescribed distance from, the first boundary; and wherein the feedback component is operated to generate the second type of feedback when one or more finger(s) of the user 50 crosses, reaches, or moves to a location that is within a prescribed distance from, the second boundary.

Optionally, in the method 500, the first boundary comprises a left or right boundary, and the second boundary comprises a top or bottom boundary, of the assigned first area 206.

Optionally, in the method 500, the control signal for operating the feedback component is based on a swiping direction.

Optionally, the method 500 further includes receiving an input signal associated with a pinching or un-pinching action performed by the user 50 on the assigned first area 210 of the screen 202.

Optionally, in the method 500, the electronic signal is for changing a size of the content displayed by the image display device 101 in response to the input signal that is associated with the pinching or un-pinching action.

Optionally, the method 500 further includes obtaining an orientation of the apparatus 200 from an orientation sensor, wherein the electronic signal is for changing the content displayed by the image display device 101 based on the input signal that is associated with the pinching or un-pinching action and the orientation of the apparatus 200.

Optionally, in the method 500, the content is changed by contracting or expanding the content in a first plane if the pinching or un-pinching action is sensed by the assigned first area 206 while the apparatus 200 is at a first orientation; and wherein the content is changed by contracting or expanding the content in a second plane if the pinching or un-pinching action is sensed by the assigned first area 206 while the apparatus 200 is at a second orientation different from the first orientation, the second plane being different from the first plane.

Optionally, in the method 500, the apparatus 200 has the first orientation when a major axis of the apparatus forms an angle with a horizontal plane that is less than 45°.

Optionally, in the method 500, the apparatus 200 has the second orientation when a major axis of the apparatus forms an angle with a vertical plane that is less than 45°.

Optionally, in the method 500, the first plane comprises a Y-Z plane in a virtual three-dimensional environment, and the second plane comprises a X-Y plane in the virtual three-dimensional environment.

Optionally, in the method 500, the first plane and the second plane are with respect to a virtual three-dimensional environment.

Optionally, in the method 500, the first plane is perpendicular to the second plane.

Optionally, the method 500 further includes receiving an input signal associated with a swiping action performed by the user 50 on the assigned first area 206 of the screen 202.

Optionally, in the method 500, the electronic signal is for moving the content displayed by the image display device 101 in response to the sensed swiping action.

Optionally, the method 500 further includes obtaining an orientation of the apparatus 200 from an orientation sensor, wherein the electronic signal is for changing the content displayed by the image display device 101 based on the input signal that is associated with the swiping action and the orientation of the apparatus 200.

Optionally, in the method 500, the content is changed by moving the content in a first plane if the swiping action is sensed by the assigned first area 206 while the apparatus 200 is at a first orientation; and wherein the content is changed by moving the content in a second plane if the swiping action is sensed by the assigned first area 206 while the apparatus 200 is at a second orientation different from the first orientation, the second plane being different from the first plane.

Optionally, in the method 500, the apparatus 200 has the first orientation when a major axis of the apparatus 200 forms an angle with a horizontal plane that is less than 45°.

Optionally, in the method 500, the apparatus 200 has the second orientation when a major axis of the apparatus 200 forms an angle with a vertical plane that is less than 45°.

Optionally, in the method 500, the first plane comprises a Y-Z plane in a virtual three-dimensional environment, and the second plane comprises a X-Y plane in the virtual three-dimensional environment.

Optionally, in the method 500, the first plane and the second plane are with respect to a virtual three-dimensional environment.

Optionally, in the method 500, the first plane is perpendicular to the second plane.

Optionally, in the method 500, the content is in a virtual three-dimensional environment, and wherein the control signal is for causing the content displayed by the image display device 101 to move closer to or further from the user when the swiping action is sensed by the assigned first area 206 while the orientation of the apparatus 200 is approximately parallel to a horizontal plane.

Optionally, in the method 500, the content is in a virtual three-dimensional environment, and wherein the control signal is for causing the content displayed by the image display device 101 to move in a vertical plane in the three-dimensional environment when the swiping action is sensed by the assigned first area 206 while the orientation of the apparatus 200 is approximately perpendicular to a horizontal plane.

Optionally, the method 500 further includes obtaining a sensor input indicating a sensed orientation of the apparatus 200, wherein the electronic signal is for changing the content displayed by the image display device 101 based on the sensor input indicating the sensed orientation of the apparatus 200.

Optionally, in the method 500, the control signal is for changing the content by expanding the content in one or more directions based on the sensor input indicating the sensed orientation of the apparatus 200.

Optionally, in the method 500, the control signal is for changing the content by rotating the content based on the sensor input indicating the sensed orientation of the apparatus 200.

Optionally, in the method 500, the control signal is for changing the content by moving the content based on the sensor input indicating the sensed orientation of the apparatus 200.

Optionally, the method 500 further includes obtaining a sensor input indicating a sensed movement of the apparatus 200, wherein the control signal is for changing the content displayed by the image display device 101 based on the sensor input indicating the sensed movement of the apparatus 200.

Optionally, in the method 500, the electronic signal is for changing the content by moving the content based on the sensor input indicating the sensed movement of the apparatus 200.

Optionally, in the method 500, the apparatus 200 is a handheld apparatus.

Optionally, the handheld apparatus comprises a cell phone, a smart phone, a personal-digital-assistant (PDA), or a tablet.

Optionally, in the method 500, the assigned first area 206 of the screen 202 has no displayed object while the assigned first area 206 of the screen 202 is sensing the finger-action of the user 50.

Optionally, the method 500 further includes operating the screen 202 to display a grid of dots in the assigned first area 206 of the screen 202.

Optionally, the method 500 further includes changing a feature of one or more of the dots in response to the user 50 touching a part of the assigned first area 206 of the screen 202 where the one or more of the dots are displayed.

Optionally, the method 500 further includes assigning a second area of the screen 202 as a first button.

Optionally, in the method 500, the first button is a "HOME" button.

Optionally, the method 500 further includes assigning a third area of the screen 202 as a second button.

Optionally, in the method 500, the second button is a "TOGGLE" button.

Optionally, the method 500 further includes assigning a fourth area of the screen 202 as a third button.

Optionally, in the method 500, the third button is a "BUMPER" button.

Optionally, the method 500 further includes: assigning a second area of the screen 202 as a keyboard activation button, and operating the screen 202 to display a keyboard in response to the user 50 touching the assigned second area of the screen.

Optionally, the method 500 further includes wirelessly communicating with the image display device 101.

Optionally, the method 500 further includes communicating with the image display device 101 via a cable.

Optionally, in the method 500, the apparatus 200 comprises a non-transitory medium storing an instruction, and wherein the act of assigning the first area 206 of the screen 202 for sensing finger-action of the user 50 is performed based on the instruction.

Optionally, in the method 500, the change in the content comprises a change in a size of the content, a change in a position of the content, a change in a shape of the content, a change in a color of the content, a replacement of information in the content, an increase or decrease in a quantity of information in the content, or any combination of the foregoing.

In some embodiments, the method 500 may further include: detecting the gestures or finger-actions, such as one finger touch move, two fingers touch move, one finger swipe, two fingers swipe, two fingers pinch, two fingers un-pinch, two fingers radial move, tap, double tap, or any combination of the foregoing; determining a command for a corresponding detected gesture or finger-action; and transmitting the command to an image display device.

Also, one or more embodiments, any feature (e.g., function, item, step, etc.) in the method 500 may be performed by the processing unit 204 of the apparatus 200, and/or the processing unit 130 of the image display device 101.

Specialized Processing System

Figure 21:
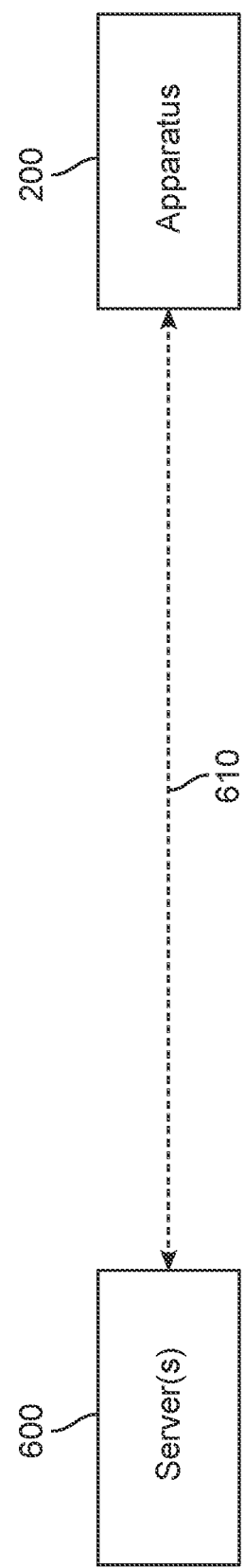
FIG. 21 illustrates the apparatus of FIG. 6 downloading an application in the form of a set of instruction from server(s).

In some embodiments, the method 500 described herein may be performed by the processing unit 204 executing an application, or by the application. The application may contain a set of instruction. In one implementation, a specialized processing system having a non-transitory medium storing the set of instruction for the application may be provided. The execution of the instruction by the processing unit 204 of the apparatus 200 will cause the processing unit 204 to perform the features described herein. As shown in FIG. 21, in some embodiments, the specialized processing system may include one or more server(s) 600. The non-transitory medium storing the instruction 610 for the application may be implemented in the server(s) 600 configured to provide the set of instruction 610 for download to the apparatus 200 through a network, such as through the Internet. The server(s) 600 may be configured to obtain a request from the apparatus 200 to download the set of instruction 610, process the request, and provide the set of instruction 610 based on the request and/or the processing of the request.

In some embodiments, the processing of the request by the server(s) 600 may include: verifying the apparatus 200, verifying the user 50 of the apparatus 200, determining the brand of the apparatus 200, determining the model of the apparatus 200, or any combination of the foregoing.

It should be noted that the server(s) 600 is a specialized processing system in that it contains instruction for execution by a processing unit of an apparatus to provide unique tangible effects in a real world. The features provided by the server(s) 600 provide improvements in the technology of image display devices and systems, as described herein.

By means of non-limiting examples, the instruction 610 provided by the server(s) 600 may include instruction for: assigning the first area 206 of the screen 202 of the apparatus 200 for sensing finger-action; assigning the second area 240 of the screen 202 of the apparatus 200 as a first button; assigning the third area 250 of the screen 202 as a second button; assigning the fourth area 260 of the screen 202 as a third button; assigning another area 270 of the screen 202 as a keyboard activation button; generating an electronic signal to cause a change in a content displayed by the image display device based on the finger-action of the user sensed by the assigned first area of the screen of the apparatus; ignoring input generated by the user using a portion of the touch-sensitive region that is not a part of the assigned first area, and that is not a part of an assigned button; generating a control signal to operate a feedback component in response to the finger-action of the user; operating the feedback component in response to a finger of the user reaching a prescribed distance from the reference location; generating different control signals to operate a feedback component to generate different respective types of feedback based on different respective spatial relationships between one or more finger(s) of the user with respect to the first area; operating a feedback component to generate the first type of feedback when one or more finger(s) of the user crosses, reaches, or moves to a location that is within a prescribed distance from, the first boundary; operating the feedback component to generate the second type of feedback when one or more finger(s) of the user crosses, reaches, or moves to a location that is within a prescribed distance from, the second boundary; operating a feedback component based on a swiping direction; generating an electronic signal for changing a size of the content displayed by the image display device in response to an input signal that is associated with a pinching or un-pinching action; obtaining an orientation of the apparatus from an orientation sensor; generating an electronic signal for changing the content displayed by the image display device based on the input signal that is associated with a pinching or un-pinching action and the orientation of the apparatus; generating an electronic signal for moving the content displayed by the image display device in response to a sensed swiping action; generating an electronic signal for changing the content displayed by the image display device based on the input signal that is associated with the swiping action and an orientation of the apparatus; generating an electronic signal to move the content in a first plane if the swiping action is sensed by the assigned first area while the apparatus is at a first orientation; generating an electronic signal to move the content in a second plane if the swiping action is sensed by the assigned first area while the apparatus is at a second orientation different from the first orientation, the second plane being different from the first plane; generating an electronic signal for causing the content displayed by the image display device to move closer to or further from the user when the swiping action is sensed by the assigned first area while the orientation of the apparatus is approximately parallel to a horizontal plane; generating an electronic signal for causing the content displayed by the image display device to move in a vertical plane in the three-dimensional environment when the swiping action is sensed by the assigned first area while the orientation of the apparatus is approximately perpendicular to a horizontal plane; generating an electronic signal for changing the content displayed by the image display device based on a sensor input indicating a sensed orientation of the apparatus; generating an electronic signal for changing the content by expanding the content in one or more directions based on a sensor input indicating a sensed orientation of the apparatus; generating an electronic signal for changing the content by rotating the content based on a sensor input indicating a sensed orientation of the apparatus; generating an electronic signal for changing the content by moving the content based on a sensor input indicating a sensed orientation of the apparatus; obtaining a sensor input indicating a sensed movement of the apparatus; generating an electronic signal for changing the content displayed by the image display device based on a sensor input indicating a sensed movement of the apparatus; generating an electronic signal is changing the content by moving the content based on a sensor input indicating a sensed movement of the apparatus; turning off pixels of the assigned first area of the screen so that the assigned first area has no displayed object while the assigned first area of the screen is sensing the finger-action of the user; operating the screen of the apparatus to display a grid of dots in the assigned first area of the screen; changing a feature of one or more of the dots in response to the user touching a part of the assigned first area of the screen where the one or more of the dots are displayed, or any combination of any of the foregoing.

Also, the instruction 610 provided by the server(s) 600 may include instruction for: detecting the gestures or finger-actions, such as one finger touch move, two fingers touch move, one finger swipe, two fingers swipe, two fingers pinch, two fingers un-pinch, two fingers radial move, tap, double tap, or any combination of the foregoing; determining a command for a corresponding detected gesture or finger-action; transmitting the command to an image display device.

In other embodiments, the apparatus 200 may also be considered as a specialized processing system. In particular, the apparatus 200 is a specialized processing system in that it contains instruction stored in its non-transitory medium for execution by the processing unit 204 to provide unique tangible effects in a real world. The features provided by the apparatus 200 (as a result of the processing unit 204 executing the instruction) provide improvements in the technology of image display devices and systems, as described herein.

Figure 22:
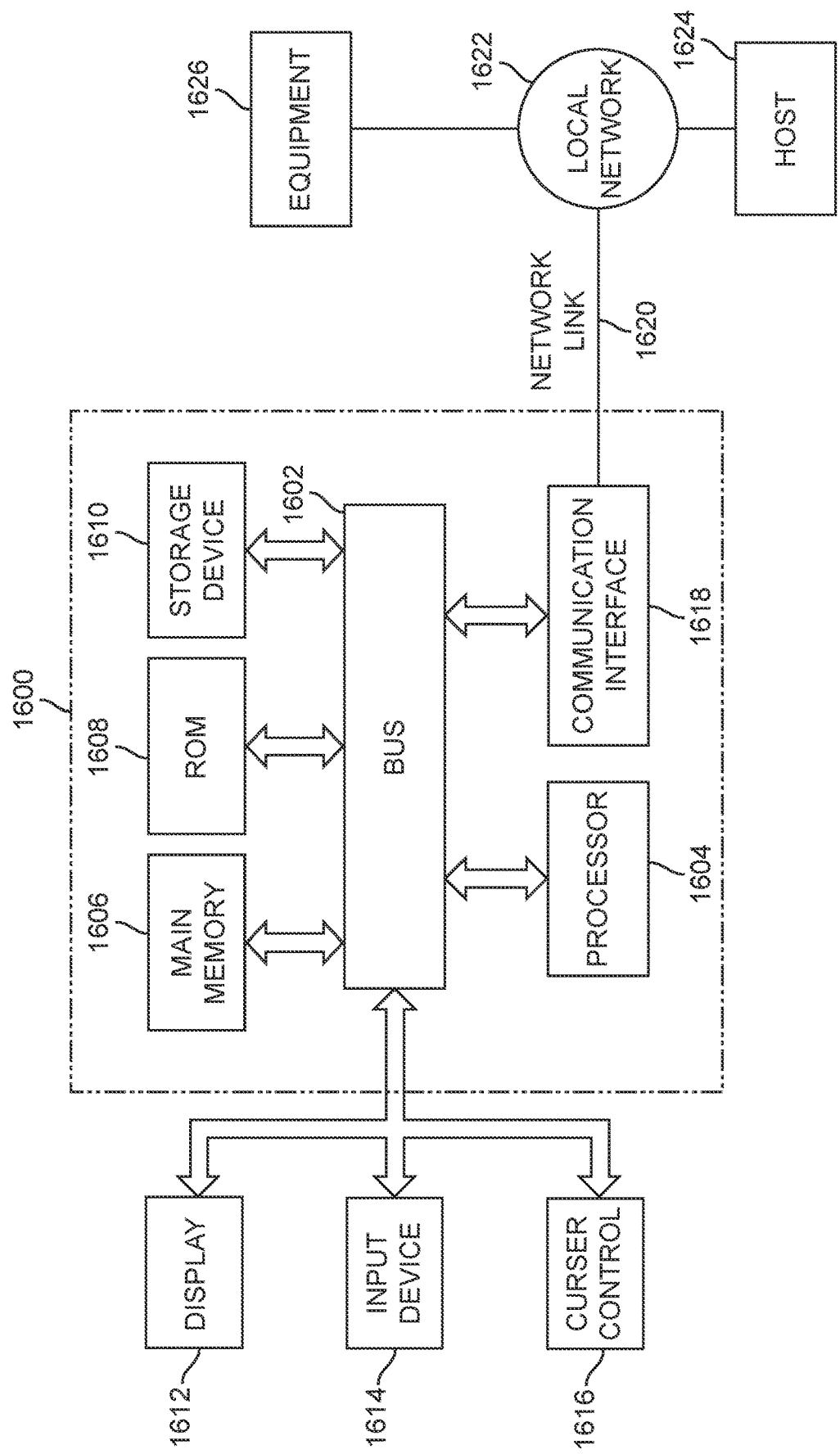
FIG. 22 illustrates a specialized processing system in accordance with some embodiments.

FIG. 22 is a block diagram illustrating an embodiment of a specialized processing system 1600 that can be used to implement various features described herein. For example, in some embodiments, the processing system 1600 may be used to implement one or more of the servers 600. In other embodiments, the processing system 1600 may be used to implement the apparatus 200. Processing system 1600 includes a bus 1602 or other communication mechanism for communicating information, and a processor 1604 coupled with the bus 1602 for processing information. The processor system 1600 also includes a main memory 1606, such as a random-access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid-state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that the apparatus 200 described herein is not limited to having the functionalities and features described, and that the apparatus 200 may be configured to provide other features for use with the image display device 101. And, as mentioned above, in some examples, some or all of such functionalities and features may be provided at least in part by way of an application (also referred to herein as an "app") that is running on the apparatus 200. By means of non-limiting examples, the apparatus 200 may be configured to allow the user 50 to: sign-up an account associated with the use of the image display device 101; log into an application using credentials set up on the account; retrieve or re-set credentials of the account; switch between user profiles; automatically sync user account data between devices; manage the account that is associated with the use of the image display device 101; manage configuration and use of the image display device 101; obtain supplemental learning and support functionalities for the image display device 101; obtain help for troubleshooting of the image display device 101 and/or the apparatus 200; access privacy, security, and data policies associated with the account; access app store to obtain applications for the image display device 101 and/or the apparatus 200; perform search queries for apps; view app detail pages; view order or purchase history; receive push notifications (e.g., application updates, etc.); perform media extraction from local device; open media files (e.g., photos, videos, etc.); select individual media files to send to the image display device 101, select individual medial files to send from the image display device 101 to the apparatus 200; receive notifications regarding the use of image display device 101 (e.g., notifications from applications for the image display device 101); receive notifications from third-party developers concerning use of the image display device 101; manage smartphone notification settings for the different apps for the image display device 101; find the image display device 101 or other image display device(s); obtain battery status of the image display device 101; mirror the image display device 101 on the apparatus 200 (wherein content displayed on the screen of the image display device 101, and/or environment surrounding the user 50 as viewed through the screen and captured by camera(s) of the image display device 101, may be sent to the apparatus 200 for display by the apparatus 200); or any combination of the foregoing. The processing unit 204 of the apparatus 200 may be configured to execute instructions to cause the apparatus 200 to provide one or more of the above features.

Exemplary aspects of the application, together with details regarding material selection and manufacture have been set forth above. As for other details of the present application, these may be appreciated in connection with the above-referenced patents and publications as well as generally known or appreciated by those with skill in the art. The same may hold true with respect to method-based aspects of the application in terms of additional acts as commonly or logically employed.

In addition, though the application has been described in reference to several examples optionally incorporating various features, the application is not to be limited to that which is described or indicated as contemplated with respect to each variation of the application. Various changes may be made to the application described and equivalents (whether recited herein or not included for the sake of some brevity) may be substituted without departing from the true spirit and scope of the application. In addition, where a range of values is provided, it is understood that every intervening value, between the upper and lower limit of that range and any other stated or intervening value in that stated range, is encompassed within the application.

Also, it is contemplated that any optional feature of the inventive variations described may be set forth and claimed independently, or in combination with any one or more of the features described herein. Reference to a singular item, includes the possibility that there is plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

The breadth of the present application is not to be limited to the examples provided and/or the subject specification, but rather only by the scope of claim language associated with this application.

In the foregoing specification, the application has been described with reference to specific embodiments thereof. It will, however, be evident that various modifications and changes may be made thereto without departing from the broader spirit and scope of the application. For example, the above-described process flows are described with reference to a particular ordering of process actions. However, the ordering of many of the described process actions may be changed without affecting the scope or operation of the application. The specification and drawings are, accordingly, to be regarded in an illustrative rather than restrictive sense.

What is claimed is:

1. An apparatus comprising:
a touch-sensitive display;
a feedback component configured to provide non-visual feedback; and
one or more processors that are operatively coupled to the touch-sensitive display and the feedback component and are communicatively coupled to a wearable device, the one or more processors configured to:
receive, from the wearable device, data indicating whether the apparatus is within a field of view of a camera of the wearable device or not; and
based on the data indicating whether the apparatus is within the field of view of the camera of the wearable device or not, switch between a first mode and a second mode, wherein in the first mode, the one or more processors are configured to convey one or more portions of a user interface to a user via the feedback component, wherein in the second mode, the one or more processors are configured to present the user interface on the touch-sensitive display of the apparatus without utilizing the feedback component of the apparatus, wherein the one or more processors are configured to switch to the second mode if the data indicates that the apparatus is within the field of view of the camera of the wearable device, and to switch to the first mode if the data indicates that the apparatus is outside the field of view of the camera of the wearable device.

2. The apparatus of claim 1, wherein the feedback component is a haptic actuator.

3. The apparatus of claim 1, wherein the feedback component is a speaker.

4. The apparatus of claim 1, wherein user interface is a graphical user interface for controlling one or more functions of the wearable device.

5. The apparatus of claim 4, wherein the graphical user interface comprises a plurality of graphical control elements.

6. The apparatus of claim 5, wherein when in the mode, the one or more processors are configured to refrain from presenting one or more of the plurality of graphical control elements on the touch-sensitive display.

7. The apparatus of claim 5, wherein when in the first mode, the one or more processors are configured to present a limited version of the graphical user interface on the touch-sensitive display.

8. The apparatus of claim 7, wherein the limited version of the graphical user interface on the touch-sensitive display is one in which one or more of the plurality of graphical control elements are not shown, one in which brightness levels of one or more of the plurality of graphical control elements are reduced, or a combination thereof.

9. The apparatus of claim 5, wherein when in the first mode, the one or more processors are configured to convey one or more locations on the touch-sensitive display at which one or more of the plurality of graphical control elements are otherwise presented in the second mode.

10. The apparatus of claim 9, wherein the one or more locations on the touch-sensitive display that are conveyed in the first mode correspond to one or more outer boundaries of the plurality of graphical control elements that are otherwise presented in the second mode.

11. The apparatus of claim 5, wherein the graphical control elements correspond to a plurality of physical user input components of a dedicated input controller that is associated with the wearable device.

12. The apparatus of claim 1, wherein the one or more processors are configured to assign an area of the touch-sensitive display to sense different finger-gliding actions of the user.

13. The apparatus of claim 12, wherein the apparatus is configured to monitor a peripheral part of the assigned area for provision of a control signal to operate the feedback component, wherein the peripheral part of the assigned area being monitored for provision of the control signal extends continuously across at least a majority of a side of the touch-sensitive display.

14. The apparatus of claim 1, wherein the data comprises camera data.

15. The apparatus of claim 1, wherein the camera is configured to view away from the user.

16. A processor-implemented method includes:
receiving, from a wearable device, data indicating whether an apparatus having a touch-sensitive display is within a field of view of a camera of the wearable device or not; and
based on the data, switching between a first mode and a second mode, wherein in the first mode, one or more portions of a user interface are conveyed to a user of the wearable device via a feedback component of the apparatus, wherein in the second mode, the user interface is presented on the touch-sensitive display of the apparatus without using the feedback component of the apparatus, wherein the second mode is switched to if the data indicates that the apparatus is within the field of view of the camera of the wearable device, and wherein the first mode is switched to if the data indicates that the apparatus is outside the field of view of the camera of the wearable device.

17. The method of claim 16, wherein the data comprises camera data.

18. The method of claim 16, further comprising assigning an area of the touch-sensitive display to sense different finger-gliding actions of the user.

19. The method of claim 18, further comprising monitoring a peripheral part of the assigned area for provision of a control signal to operate the feedback component, wherein the peripheral part of the assigned area being monitored for provision of the control signal extends continuously across at least a majority of a side of the touch-sensitive display.

20. The method of claim 16, wherein the camera is configured to view away from the user.

\* \* \* \* \*